United States Patent
Yamamoto et al.

(10) Patent No.: US 7,490,872 B2
(45) Date of Patent: Feb. 17, 2009

(54) CORNER PIECE-LESS DUCT, METHOD OF PRODUCING THE SAME, AND DUCT-FORMING MACHINE

(75) Inventors: Toshio Yamamoto, Osaka (JP); Mitsuru Marukawa, Osaka (JP); Yoshimasa Yoshimoto, Osaka (JP); Shozo Iizuka, Himeji (JP); Takashi Hara, Himeji (JP)

(73) Assignee: Air System Kabushiki Kaisha, Himeji-shi (JP)

( * ) Notice: Subject to any disclaimer, the term of this patent is extended or adjusted under 35 U.S.C. 154(b) by 385 days.

(21) Appl. No.: 10/532,312

(22) PCT Filed: Oct. 22, 2003

(86) PCT No.: PCT/JP03/13458

§ 371 (c)(1),
(2), (4) Date: Oct. 3, 2005

(87) PCT Pub. No.: WO2004/038301

PCT Pub. Date: May 6, 2004

(65) Prior Publication Data

US 2006/0048835 A1 Mar. 9, 2006

(30) Foreign Application Priority Data

Oct. 22, 2002 (JP) .............................. 2002-307314

(51) Int. Cl.
*F16L 25/00* (2006.01)
(52) U.S. Cl. .................. 285/424; 138/162; 138/163
(58) Field of Classification Search .................. 285/424; 138/155, 157, 158, 162, 163, 166, 168
See application file for complete search history.

(56) References Cited

U.S. PATENT DOCUMENTS 1,103,988 A * 7/1914 Murray ....................... 285/424
1,484,491 A * 2/1924 Gutermann ................. 285/424

(Continued)

FOREIGN PATENT DOCUMENTS

JP 61-072319 4/1986

(Continued)

OTHER PUBLICATIONS

International Search Report for International Application No. PCT/JP03/13458 dated Jan. 27, 2004 from the Japanese Patent Office.

*Primary Examiner*—David E Bochna
(74) *Attorney, Agent, or Firm*—Marshall, Gerstein & Borun LLP

(57) ABSTRACT

A cornerplate-less duct includes plate members joined to each other at side end portions by a seam joint to form a tubular duct having a rectangular cross-section. Two end portions of a plate are bent perpendicular to a longitudinal direction of the plate to form flange forming portions. Corner forming portions protrude from side ends of the flange forming portions in a width direction to form corner portions at the end portions of the duct. In an expanded shape of the plate, a cut portion is provided close to a longitudinal center of the plate member such that the cut portion extends in a width direction of the plate member and has a depth substantially equal to an overlapping portion of the corner forming portion.

13 Claims, 59 Drawing Sheets

U.S. PATENT DOCUMENTS

| | | | |
|---|---|---|---|
| 1,664,885 A | | 4/1928 | Huenefeld |
| 2,131,804 A | * | 10/1938 | Holub ........................ 138/158 |
| 2,498,753 A | * | 2/1950 | Deitsch ....................... 138/158 |
| 2,750,211 A | * | 6/1956 | Curtis ......................... 285/424 |
| 2,956,587 A | * | 10/1960 | Fisher ......................... 138/158 |
| 3,636,984 A | * | 1/1972 | Rauhauser ................... 138/155 |
| 4,328,981 A | * | 5/1982 | Greene et al. ................ 285/424 |
| 4,466,641 A | * | 8/1984 | Heilman et al. ............. 285/424 |
| 4,579,375 A | * | 4/1986 | Fischer et al. ............... 285/424 |
| 5,784,915 A | | 7/1998 | Allemann et al. |
| 6,957,670 B1 | * | 10/2005 | Kajino ......................... 138/157 |

FOREIGN PATENT DOCUMENTS

| | | |
|---|---|---|
| JP | 61-72319 U | 5/1986 |
| JP | 04-084627 | 3/1992 |
| JP | 4-84627 A | 3/1992 |
| JP | 05-172281 | 9/1993 |
| JP | 3023127 U | 1/1996 |
| JP | 10-047741 | 2/1998 |
| JP | 10-47741 A | 2/1998 |
| JP | 2000-117359 A | 4/2000 |
| JP | 2001-355906 A | 12/2001 |
| WO | WO-01/84058 A1 | 8/2001 |

* cited by examiner (a)

(b)

(c)

(d)

(e)

(f)

(g)

(h)

(i)

(j)

(a)

(b)

(c)

(d)

(e)

CORNER PIECE-LESS DUCT, METHOD OF PRODUCING THE SAME, AND DUCT-FORMING MACHINE

The present application claims the benefit of priority of International Patent Application No. PCT/JP03/013458 filed on Oct. 22, 2003, which application claims priority of Japanese Patent Application No. 2002-307314 filed Oct. 22, 2002. The entire text of the priority application is incorporated herein by reference in its entirety.

TECHNICAL FIELD

The present invention relates to a cornerplate-less duct which is a duct used for air-conditioning, ventilation, or smoke emission in the case of fire, which is one type of construction equipment, a method of manufacturing the duct, and an apparatus for manufacturing the duct.

BACKGROUND ART

With regard to a traditional duct for air-conditioning or ventilation, which has been conventionally employed for more than 100 years, one of the inventors of the present invention has proposed, a novel duct which can be assembled without generation of a noise, stored and transported with significantly increased efficiency, and can be suspended easily and at a free position, and a suspending member that suspends the duct from a ceiling or the like (Japanese Unexamined Patent Application Publication No. 10-47741, International Publication No. WO01/84058).

The novel duct and the suspending member attract attention from duct industries overseas including those of U.S. and Europe because of the above described features, as well as Japan.

One of the inventors made an innovative invention which can eliminate corner plates (corner members) which have been essential members in the prior art, by providing corner forming portions in corner portions of starting end and terminal end portions of the duct integrally with four plate members which are assembled by "seam joints" to form the duct having rectangular cross-section (Japanese Patent Application No. 2001-355906).

However, the corner forming portions are formed by another members and these members are integrally spot-welded to the plate members with these members positioned to protrude from end portions of the flange forming portions of the plate members. This construction reduces the number of assembly steps but significantly increases the number of parts and the number of producing steps.

Four plates (material in an expanded state before a forming process) forming the duct by joining seat joint portions at both ends are cut from a roll-shaped metal plate by a plasma cutter or the like. In a current manufacturing method, both end portions (corner portions) at a starting end portion and a terminal end portion of the plate are cut into scraps because they obstruct placement of the corner plates (corner members).

Various attempts have been made to manufacture "cornerplate-less duct" by improving the conventional duct manufacturing apparatus. However, in such a construction, if the portion to be unprocessed is positioned not to interfere with a roll portion (roll forming process region), then a roll diameter increases. As a result, the pitch (pitch at which the forming rolls are arranged) between forming rolls of adjacent forming roll pairs arranged along a flow of a forming process (forming process line or forming process step in substantially a direction in which the plate is traveled) increase.

If the dimension of the pitch of the forming rolls increases, it is difficult to process the plate with the plate positioned precisely with respect to the forming roll pairs which are going to perform the forming process. More specifically, since the plate is positioned at fewer locations and the pitch of arrangement of the forming rolls increases, the position of the plate which is to be processed may be displaced, or deformed. As a result, a plate member having a predetermined shape (dimension) cannot be manufactured.

Since the seam joint portions may become non-uniform, for example, it is difficult to manufacture the plate member having the predetermined shape (dimension) stably and with higher yield. The inventor has manufactured the plate member with trial and error, thereby resulting in only a yield of about 30 to 40%.

The present invention has been made under the circumstances. Attention has been focused on scraps which have been traditionally discarded. An object of the present invention is to provide a cornerplate-less duct having a rational construction, which enables the number of parts and forming steps to be significantly reduced by effectively utilizing the scraps, and enables a shape of an assembled duct to be maintained, a duct manufacturing method thereof, and a duct manufacturing apparatus (seam forming apparatus).

DISCLOSURE OF THE INVENTION

In order to solve the above mentioned technical problems, a cornerplate-less duct which has a tubular shape with a rectangular cross-section, according to a first invention, comprises a plurality of plate members joined to each other at side end portions thereof by seam joints, in which flange portions which are connecting faces adapted to connect adjacent ducts are formed integrally at a starting end portion and a terminal end portion of a plate formed into each plate member by bending the plate in a direction substantially perpendicular to a longitudinal direction of the plate, corner forming portions are formed to protrude outward from side ends of the flange portions in a width direction of the plate, and the corner forming portions of adjacent plate members are overlapped with each other to form corner portions of the flange portions of the duct in an assembled state; wherein the plate is structured such that a first cut portion is formed in a portion which is closer to a center in the longitudinal direction of the plate than a starting end or a terminal end of the plate such that the first cut portion extends in the width direction of the plate and has a depth substantially equal to an overlapping portion of the corner portion.

In accordance with the cornerplate-less duct according to the first invention constructed above, it is possible to produce the plate member having the seam joint portion formed at a location which is closer to the center than the first cut portion in the longitudinal direction on both sides of the plate, the flange portion and the corner portions on both sides of the flange portion which are formed at a location closer to the starting end or the terminal end than the first cut portion, by the manufacturing method according to the second invention. In addition, the plate member is mechanically formed by the seam forming apparatus according to a third or fourth invention.

By joining the seam joint portions at both side ends of the plate member to the seam joint portions of another plate member, i.e., by joining the seam joint portions at both ends of four plate members, the duct having the rectangular cross-section is assembled. The flange portion which becomes a connecting portion between ducts is formed at the starting end portion or the terminal end portion of the duct, and the corner forming portions are formed to protrude from both side ends of the flange portion and become the corner portions of the duct by overlapping with the corner portion of its adjacent plate member in a plate thickness direction.

In assembling of the duct, corner plates, i.e., another members for joining the corner portions of adjacent plate members, which have been conventionally prepared, for example, by spot welding, may be omitted. In addition, an attaching process for attaching the corner plates to the plate members to protrude from the flange portion may be omitted.

As s result, it is not necessary to manufacture and store the corner plates, and to attach the corner plates to the plate members. Thus, the duct with a rectangular cross-section, which has the corner portions is constructed very simply. In addition, since the both side end portions of the starting end portion or the terminal end portion which have been cut away and discarded are effectively utilized to form the corner forming portions (corner portions), the plate members are produced from the metal plate without wastes.

Further, since the corner portions are integral with the plate member, labor and time required for attaching the corner plates become unnecessary, and even a non-skilled person can assemble the duct quickly and easily.

It is preferable that in the cornerplate-less duct, a dimension in a width direction of a portion of the plate which is closer to the center than the first cut portion is substantially equal to a sum of a dimension of a wall forming portion of the duct and a dimension of seam forming portions on both sides of the wall forming portion, and a dimension in a width direction of a portion of the plate which is closer to the starting end or the terminal end than the first cut portion is substantially equal to a sum of a dimension in a width direction of a flange forming portion formed into the flange portion and a protruding dimension of the corner forming portions.

Also, it is preferable that, in the cornerplate-less duct, the protruding dimension of the corner forming portions is substantially equal to a width of the connecting faces of the flange portions of the adjacent plate members in an assembled state of the duct. In this structure, the corner portions desirably conform to each other in an overlapped state.

Also, it is preferable that in the cornerplate-less duct, the corner forming portions of plates are provided with fixing holes at a location where the corner portions of adjacent plate members overlap with each other to allow the fixing holes to conform to each other in an assembled state of the duct. Since the fixing holes serve as a guide for assembling the plate members to be joined to each other, the duct can be precisely assembled into a predetermined shape.

In the cornerplate-less duct, an engagement portion which is bendable may be provided integrally with the fixing hole. The engagement portion is inserted into the opposite fixing hole and is bent in an assembled state so that the adjacent plate members engage with each other, i.e., the assembled state is maintained.

In the cornerplate-less duct, the plate may have a second cut portion which is closer to the center in the longitudinal direction than the first cut portion. When the flange forming portion is formed into the flange portion by the apparatus, a portion between the second cut portion and the first cut portion is held between the rollers of the apparatus, so that the flange portion is processed easily.

A method of manufacturing a cornerplate-less duct according to a second invention, for manufacturing the cornerplate-less duct of the first invention, comprises: (a) temporarily bending the corner forming portion of the plate by a predetermined angle in an opposite direction to bending of a seam forming portion located closer to the center than the first cut portion; (b) forming the seam joint portion at a seam forming portion using a seam forming apparatus; (c) returning the temporarily bent corner forming portion to an original state after the seam joint portion has been formed; and (d) processing the starting end portion or the terminal end portion in the longitudinal direction of the plate using a seam forming apparatus, thereby forming the flange portions of the duct and the corner forming portions protruding laterally from the flange portions.

In accordance with the duct manufacturing method comprising the above mentioned steps, it is possible to form the plate member having the seam joint portion at the portion closer to the center than the first cut portion in the longitudinal direction, the flange portion formed closer to the starting end or the terminal end than the first cut portion and the corner portions formed integrally on both sides of the flange portion.

A seam forming apparatus (duct manufacturing apparatus) of a cornerplate-less duct according to a third invention comprises: plural forming roll pairs arranged in a flow of a forming process, the apparatus being configured to sequentially pass a plate between forming rolls of each of the plural forming roll pairs to form seam joint portions at side end portions adapted to connect plate members forming the cornerplate-less duct having a rectangular cross-section, the plate having corner forming portions at both side end portions of a wall forming portion (corresponding to one of four wall faces forming the duct) of the duct, the corner forming portion being a corner portion in the assembled state of the duct and being located with a cut portion interposed between the seam forming portion and the corner forming portion in a direction in which the plate is traveled, wherein rotation shafts of at least the forming roll pair which is located at an upstream end in the flow of the forming process are oriented in X-direction which is perpendicular to the direction in which the plate is traveled, and the forming rolls of the forming roll pair are cantilever-mounted to the rotation shafts; press rolls each of which is disposed such that an outer peripheral face of the press roll makes contact with an end face on a free end side of one of the forming rolls of each forming roll pair, the press rolls having rotation shafts extending in a Y-axis direction perpendicular to the rotation shafts of the forming rolls and the direction in which the plate is traveled, wherein a non-forming process region is formed in a space ranging from a free end of an opposite forming roll of the forming roll pair to a position apart from the free end, and a plate support face on which the plate is supported is provided on upstream side of the forming roll pair such that a boundary face between the press roll and the corresponding forming roll is an upper face of the plate support face; and a guide member configured to guide a side end portion of the plate placed on the plate support face, which is to be subjected to a seam joint forming process, along the direction in which the plate is traveled.

In accordance with the seam forming apparatus according to the third invention constructed above, the corner forming portion of the plate is positioned in the non-forming process region ranging from the free end of the opposite forming roll of the forming roll pair to the position apart from the free end, and the seam forming portion is formed into the seam joint portion by the forming roll pair. In addition, when the seam joint portion is being formed in the plate by the forming roll pair, a portion adjacent the portion of the plate being processed is held between one of the forming rolls of the forming roll pair and the corresponding press roll. Further, on an upstream side of the portion adjacent the portion of the plate being processed, the plate is supported on the plate support face in which the boundary face between the press roll and the corresponding forming roll is an upper face, and is guided by the guide member in the direction in which the plate is traveled. Therefore, the forming process is stably carried out while the corner forming portion is positioned in the non-forming process region. Since the forming process is thus carried out while the corner forming portion is positioned in the non-processing region, the pitch of arrangement of the forming rolls can be reduced.

As a result, the seam joint portion can be formed at the side end portion of the plate having the corner forming portion with a higher yield without interfering with the corner forming portion.

In the seam forming apparatus of the third invention, the guide member may be placed such that a clearance is formed between the guide member and the plate support face to allow the plate member to be inserted therebetween, the guide member has an edge-shaped end portion which is located closer to a center of the plate to be guided, and the seam forming portion of the plate is adapted to be positioned in the clearance formed between the guide member and the plate support face and the corner forming portion of the plate is adapted to be positioned on an opposite side of the clearance with respect to the guide member. Thereby, in the forming roll pair on downstream side in the flow of the forming process, the corner forming portion is positioned in the non-forming process region so as not to interfere with the forming process of the seam joint portion. The edge-shaped portion of the guide member guides an inner end of the cut portion (end on the duct wall forming side) between the corner forming portion and the seam forming portion of the duct to allow the plate to be stably moved in the direction in which the plate is traveled.

The seam forming apparatus according to the third invention, may further comprise a bending device mounted in the vicinity of the guide member and configured to bend both of or one of the corner forming portion and the seam forming portion of the plate so as to form different angles with respect to the wall forming portion of the duct to allow the corner forming portion to pass through the non-forming process region ranging from the free end of the opposite roll of the forming roll pair to the location apart from the free end. Since the bending device is capable of bending the plate by a predetermined angle stably and without an operator, the forming process is carried out stably and with higher yield, and labor of the operator can be reduced.

The seam forming apparatus of the third invention may further comprise: a corner forming portion separating device mounted adjacent an upstream side of the guide member with a clearance between the separating device and the plate support face to allow the plate to pass therethrough, wherein the separating device is structured such that an upstream end portion and an end portion closer to a center of the plate are edge-shaped and have a width smaller than a depth of a cut portion between the corner forming portion and the seam forming portion, and the separating device is mounted such that the upstream end portion is substantially in contact with the plate support face when the plate is not positioned in the clearance and the upstream end portion is located above the plate support face when the plate is positioned in the clearance. Since the corner forming portion located at a downstream end in the flow of the forming process of the plate is automatically separated from the seam forming portion on downstream side of the corner forming portion, the duct manufacturing apparatus can achieve high efficiency.

In the seam forming apparatus according to the third invention, the bending device may be positioned downstream of the guide member and is positioned upstream of the forming roll pair. Such a seam forming apparatus has a rational construction.

A duct manufacturing apparatus according to a fourth invention comprises: plural forming roll pairs arranged in a flow of a forming process, the apparatus being configured to sequentially pass a plate between forming rolls of each of plural forming roll pairs to form seam joint portions at side end portions adapted to connect plate members forming a cornerplate-less duct having a rectangular cross-section; wherein the forming roll pairs are each composed of forming rolls having rotation shafts and are mounted on a base such that the rotation shafts are oriented in X-axis direction perpendicular to a direction in which the plate is traveled; a press roll mounted for one of the forming rolls of at least one forming roll pair, which is adapted to make contact with a duct wall forming portion of the plate such that a rotation shaft of the press roll is oriented to have a crossing angle with respect to the direction in which the plate is traveled and the X-axis direction, the plate being held between the press roll and an end face of the forming roll with which the press roll is substantially in surface contact; and a drive feed roll pair mounted at a location apart from the press roll in a direction from a portion of the plate which is being processed toward the duct wall forming portion and configured to forcibly feed the plate in the flow of the forming process with the plate sandwiched from both sides.

In accordance with the duct manufacturing apparatus of the fourth invention, the plural forming roll pairs arranged such that the rotation shafts are oriented in X-axis direction are configured to form the seam joint portions (female seam joint portions or the male seam joint portions) at the side end portions of the plate. In the forming process, the press roll is disposed such that the rotation shaft forms a crossing angle to hold the plate between the press roll and the end face of the forming roll with which the duct wall forming portion of the plate makes contact, and the drive feed roll pair is disposed at the location apart from the press roll in the direction from the portion of the plate being processed toward the wall forming portion to feed the plate in the flow of the forming process with the plate held. In other words, while the plate is forcibly fed in the flow of the forming process, the plate is held from different directions, at different positions, i.e., by the forming roll pair, between the forming roll and press roll, and by the feed roll pair. So, the plate is reliably positioned between the rolls when the seam joint portion is being formed on the side end portion of the plate or otherwise the plate is being fed between the forming rolls. Therefore, it is possible to stably manufacture the plate member having a predetermined shape (dimension). As a result, product (plate member) can be manufactured with higher yield.

Further, in accordance with the duct manufacturing apparatus of the fourth invention, in the forming process of the plate for the "novel duct" (cornerplate-less duct), since the rotation shafts of the forming roll pairs are oriented in X-axis direction perpendicular to the direction in which the plate is traveled, the non-forming process region is formed from an end face of the forming roll which is opposite to the forming roll with which the duct wall forming portion of the plate makes contact, i.e., forming roll with which the duct forming portion of the plate does not make contact, to its extended line, and a part of the corner forming portion can be positioned in the non-process forming region. Therefore, in the seam forming apparatus for processing the plate of the cornerplate-less duct, the pitch of arrangement of the forming roll pairs can be reduced, and as a result, the plate member having the predetermined shape (predetermined dimension) can be reliably and stably formed.

In accordance with the duct manufacturing apparatus according to the fourth invention, the plate member having the predetermined shape (predetermined dimension) is stably mass-produced, and the plate members of the novel cornerplate-less duct is stably mass-produced.

The duct manufacturing apparatus according to the fourth invention, may further comprise: a drive means configured to drive the rotation shafts of the forming rolls of at least one forming roll pair and the press roll mounted to correspond to the forming roll. Since the plate is fed forcibly in the flow of the forming process while being held at plural different positions, the plate is processed and fed stably. Therefore, deformation of the plate from the predetermined shape which may be due to distortion or relief, does not occur.

In the duct manufacturing apparatus of the fourth invention, the rotation shaft of the press roll may be oriented in Y-axis direction substantially perpendicular to the direction in which the plate is traveled and the X-axis direction. Since the plate being processed is held from plural directions uniformly in a three-dimensional direction, the forming process can be carried out more stably.

The duct manufacturing apparatus according to the fourth invention may, further comprise: a drive means configured to drive rotation shafts of the forming rolls of the forming roll pairs and the press rolls respectively mounted to correspond to the forming roll pairs. Since the plate is fed forcibly in the flow of the forming process while being held at plural apart positions, the duct manufacturing apparatus can carry out the forming process without deformation of the plate from the predetermined shape which may occur due to distortion or relief.

In the duct manufacturing apparatus of the fourth invention, the rotation shaft of one of the forming rolls of the forming roll pair may be fixed on the base, and the apparatus may further comprise: an elastic pressing means configured to elastically press an opposite forming roll toward the one forming roll. Thereby, it is not necessary to adjust the clearance between the forming rolls forming each forming roll pair to process the plates having different thicknesses. So, when the plates having different thicknesses are processed continuously, the apparatus can be configured for them easily and quickly. In addition, the plate being processed or fed is elastically pressed stably. The elastic pressing means may include various types of springs, including mechanical springs such as a coil spring, a disc spring or a leaf spring, fluidically-powered spring such as an air spring or a liquid spring, an electromagnetic spring, etc.

In the duct manufacturing apparatus according to the fourth invention, an end face on a press roll side of the rotation shaft of the forming roll adapted to contact a portion of the plate to be unprocessed may be substantially as high as or lower than an end face of the forming roll which is adapted to contact the press roll. In this structure, the roll face of the press roll is made flat, and the unprocessed portion of the plate is held over a wide region between the press roll and the corresponding forming roll of the forming roll pair. As a result, the plate can be fed along the flow of the forming process while being processed stably.

It is preferable that in the duct manufacturing apparatus of the fourth invention, an end face of the rotation shaft corresponding to the forming roll which is opposite to the forming roll adapted to contact the wall forming portion of the duct, the end face being located on a side where the forming roll is attached, may be configured not to substantially protrude from an end face of the forming roll. Since the non-forming process region is formed to have a sufficient space above the forming roll, the forming process is carried out while the corner forming portion is positioned in the non-forming process region when manufacturing the cornerplate-less duct.

The duct manufacturing apparatus of the fourth invention may further comprise an elastic pressing means configured to elastically press the press roll toward the forming roll adapted to contact the duct wall forming portion of the plate. When plates having different thicknesses are processed in an elasticity range of the elastic pressing means, it is not necessary to adjust a clearance between the press roll and the forming roll substantially in contact with the press roll. So, when the plates having different thicknesses are processed continuously, the apparatus can be configured for them easily and quickly. In addition, since the plate being processed or fed is elastically pressed by the elastic pressing means, it is held stably by an elastic force of the elastic pressing means.

In the duct manufacturing apparatus of the fourth invention, the plurality of forming roll pairs arranged in the flow of the forming process may include a punch forming roll pair configured to advance to a plate processing region to punch the seam forming portion of the plate to form an engagement portion. By using the duct manufacturing apparatus, an engagement protrusion which is an essential element for the seam joint portion of the plate member of button punch type is formed while the forming process of the plate is carried out. Since the punch forming roll pair is adapted to advance to the processing region of the plate, the punching is selectively performed. Therefore, the forming process for the plate member of the button punch type and plate members of other configuration may be carried out. As a matter of course, the punch roll pair may be used for the plates other than the plate of the button punch type.

Since one duct manufacturing apparatus is capable of the punching process, a space is saved in duct manufacturing factories with a limited space located in urban area.

In addition, since the engagement protrusion is formed during the forming process, the manufacturing steps can be simplified. Especially, the punching process for long plates forming a long duct is performed efficiently, because handling of the long plates becomes unnecessary.

BRIEF DESCRIPTION OF THE DRAWINGS

FIGS. 18(a) and 18(b) are views showing a state in which the plate members engage with each other by the fixing holes using the engagement portion, wherein FIG. 18(a) is a partially enlarged perspective view of the corner portion showing a state in which adjacent plate members engage with each other by the fixing holes using the engagement portions integrally provided on the fixing holes, and FIG. 18(b) is a cross-sectional view showing a structure surrounding the fixing holes in an engagement state of FIG. 18(a);

FIGS. 19(a) and 19(b) are views showing a state in which the plate members engage with each other by fixing holes using engagement portions according to an embodiment different from that of FIGS. 18(a) and 18(b), wherein FIG. 19(a) is a partially enlarged perspective view showing a state in which the adjacent plate members engage with each other by the fixing holes using the engagement portions integrally provided on the fixing holes, and FIG. 19(b) is a cross-sectional view showing a structure surrounding the fixing holes in an engagement state;

BEST MODE FOR CARRYING OUT THE INVENTION

Hereinafter, embodiments of a cornerplate-less duct of the present invention will be described with reference to the drawings. Also, a method of manufacturing the duct and a seam manufacturing apparatus therefor.

EMBODIMENT 1

A cornerplate-less duct (hereinafter also referred to as a duct) according to an embodiment of the present invention will be described.

Figure 1:
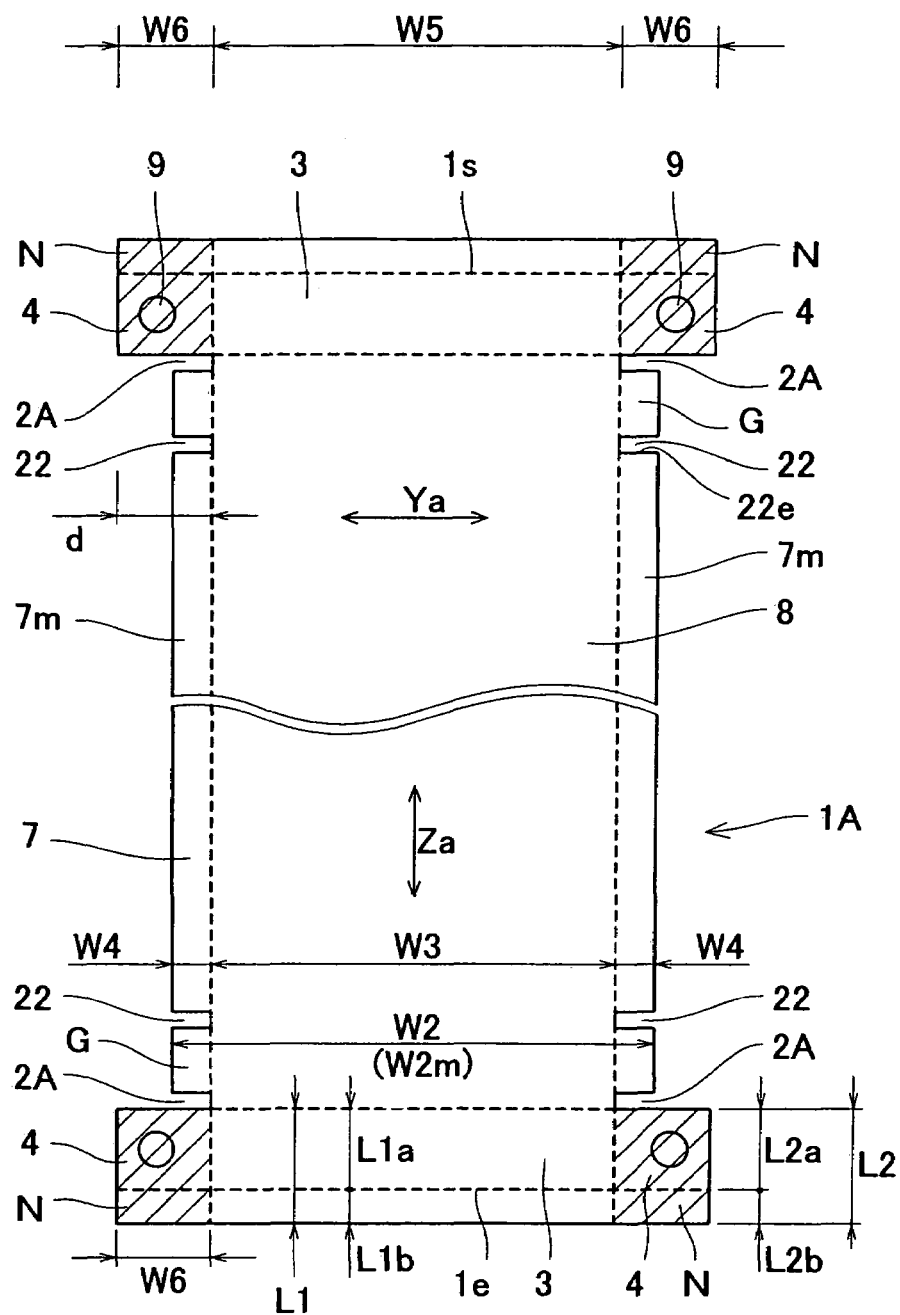
FIG. 1 is a view showing a shape of a plate having male seam forming portions at side end portions thereof.

FIG. 1 is a view showing a shape of a plate before a forming process, corresponding to a plate member having male seam joint portions at side end portions thereof, which is one of adjacent plate members forming a duct. Likewise, FIG. 2 is a view showing a shape of plate having female seam joint portions at side end portions thereof.

A plate 1A having male seam forming portions 7m at side end portions for forming male seam joint portions 17m (see FIG. 6) is, as shown in an expanded shape shown in a plan view of FIG. 1, provided with cut portions (first cut portions) 2A at locations which are spaced apart from a starting end 1s and a terminal end 1e in a longitudinal direction (see an arrow Za in FIG. 1) of the plate 1A so as to be closer to a center (center in a vertical direction of FIG. 1) such that the cut portions 2A extend in a width direction (see an arrow Ya in FIG. 1) of the duct 1A. It will be appreciated that, although the starting end 1s and the terminal end 1e are not physical ends of the plate 1A of the embodiment having a folded portion 14b (see FIG. 6), ends of the plate member excluding the folded portion 14b (see FIG. 6) are called the starting end 1s and the terminal end 1e of the plate member, for the sake of convenience, because the folded portion (see FIG. 6B) is not necessarily an essential portion.

Figure 8:
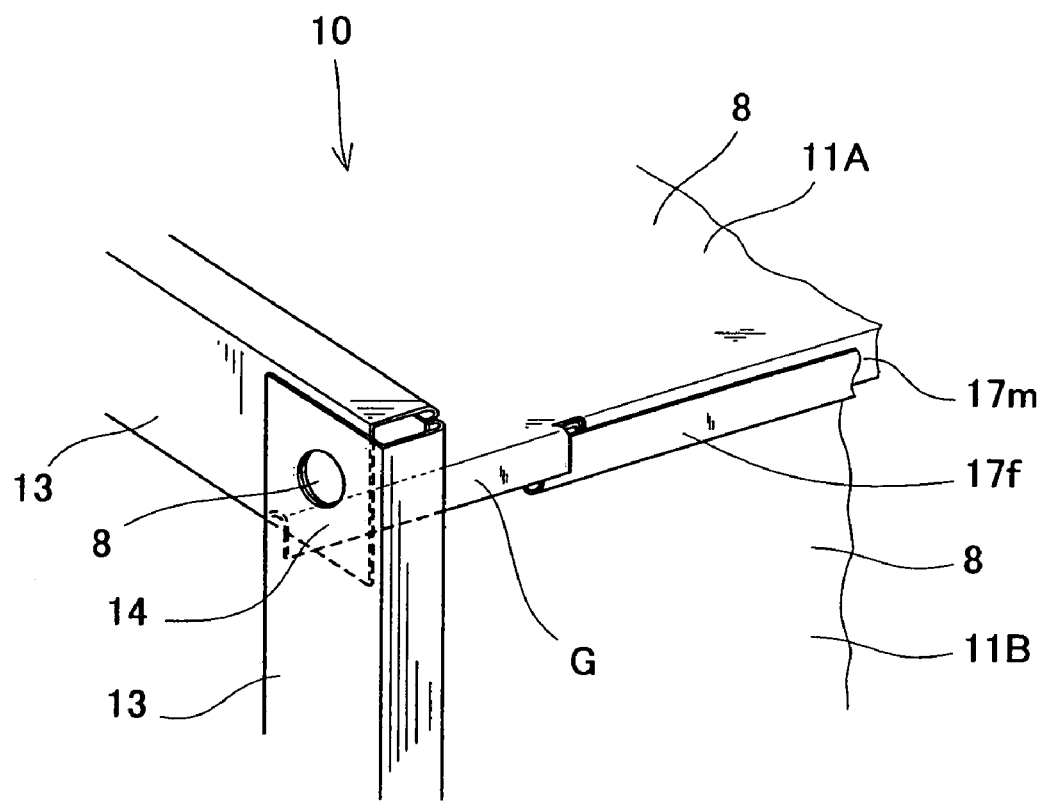
FIG. 8 is a perspective view showing a state of a corner portion and a seam joint portion of the duct, in which the plate members of FIG. 6 or FIG. 7 have been assembled.
Figure 9:
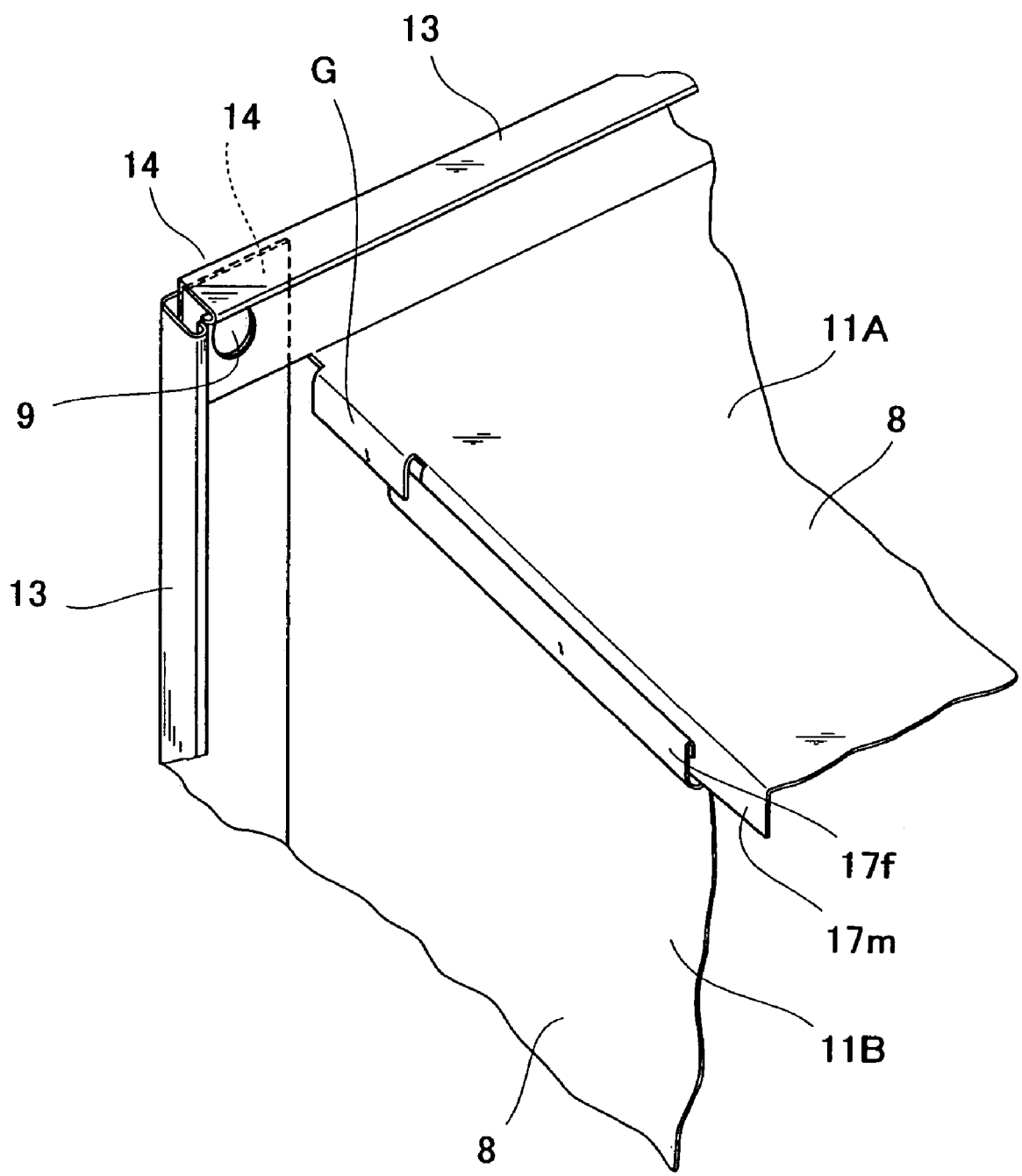
FIG. 9 is a perspective view showing a state in which seam joint portions have been joined to each other and assembled, as seen from a perspective different from that of FIG. 8.

In addition, second cut portions 22 are formed at locations closer to the center in the longitudinal direction than the first cut portions 2A. The dimension from the first cut portion 2A to the second cut portion 22 is set to a dimension for allowing the plate 1A to be retained by a roller of a forming machine when a flange forming portion 3 is formed into a flange portion 13 (see FIG. 6), or set larger than that dimension. Specifically, the dimension is preferably 3 cm to 6 cm. As shown in FIGS. 8 and 9, a portion G from the first cut portion 2A to the second cut portion 22 is, after the flange portion 13 is formed, bent toward an opposite plate member 11B when assembled into the duct, and serves to close the corner portion of the duct 10. In addition, the portion G serves to fix an end portion of the seam joint portion.

Figure 2:
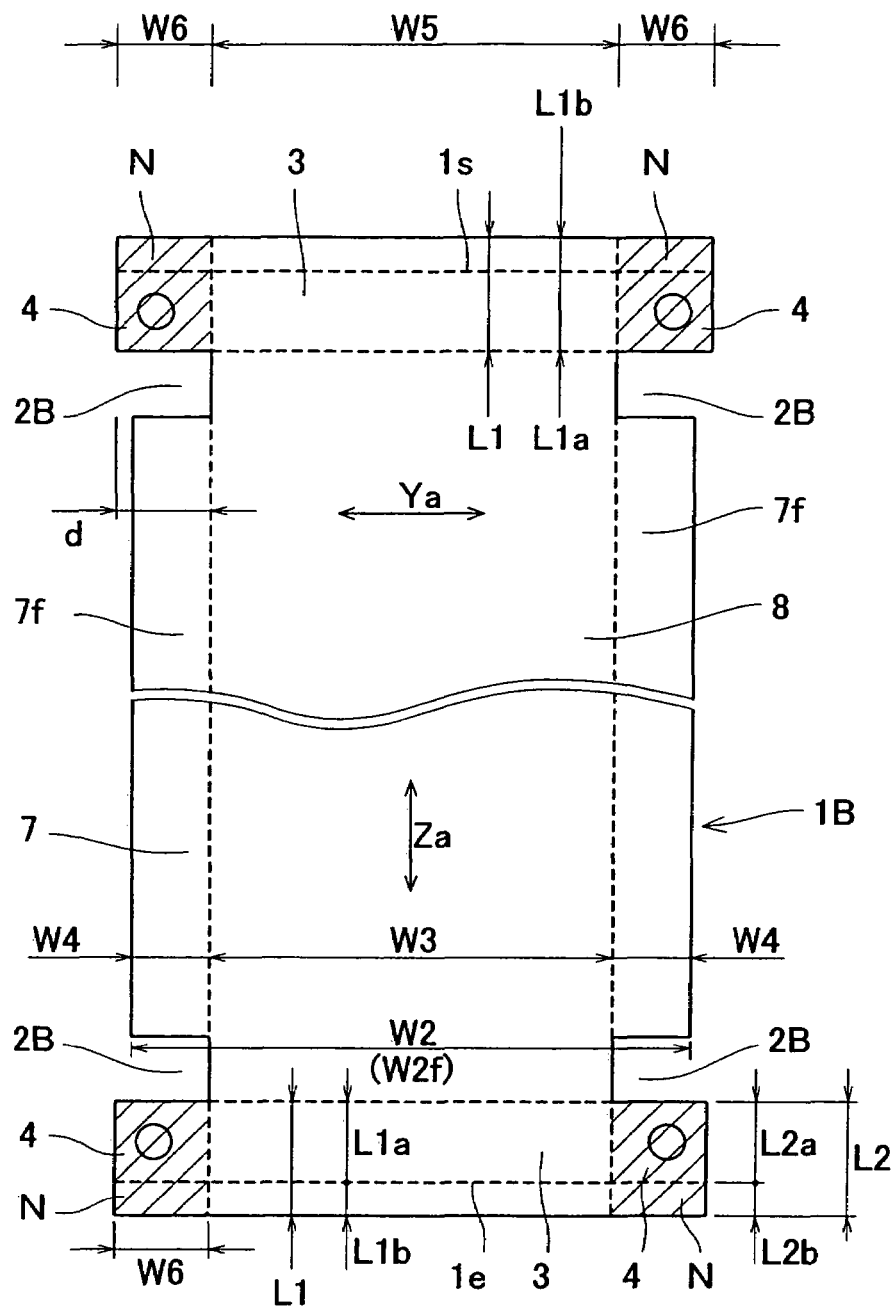
FIG. 2 is a view showing a shape of a plate having female seam forming portions at side end portions thereof.

The plate 1B having female seam forming portions 7f forming female seam joint portions 17f (see FIG. 6) is, as shown in an expanded shape of FIG. 2, provided with cut portions (first cut portions) 2B at locations which are spaced apart from a starting end 1s and a terminal end 1e in a longitudinal direction (see an arrow Za in FIG. 2) of the plate 1B so as to be closer to a center such that the cut portions 2B extend in a width direction (see an arrow Ya in FIG. 2). In this embodiment, the longitudinal dimension of the cut portion 2B is smaller than the dimension from the starting end 1s (or terminal end 1e) of the plate 1A in FIG. 1 to the second cut portion 22. However, the longitudinal dimension of the cut portion 2B may be equal to or larger than the dimension from the starting end 1s (or terminal end 1e) of the plate 1A to the second cut portion 22 (to be precise, the dimension from the starting end is 1s (or terminal end 1e) to an end portion 22e on the centre side of the second cut portion 22). The position (dimension) of the cut portion 2B on the starting end 1s side (or terminal end 1e side) from the starting end 1s (or terminal end 1e) is set equal to the position (dimension) of the first cut portion 2A on the starting end 1s side (or terminal end 1e side) from the starting end 1s (or terminal end 1e). The end of the cut portion 2B on the center side in the longitudinal direction (Za direction of FIG. 2) is located closer to the center in the longitudinal direction than the end of the first cut portion 2A on the starting end is side (or on the terminal end 1e side).

The depth (dimension) d of each of the cut portions 2A and 2B is substantially equal to an overlapping portion W1 (see FIG. 6) of a corner forming portion 4. In other words, the dimension of the depth d is equal to a width v of the flange portion 13 of each of the processed plates 1A and 1B. The plates 1A and 1B have the cut portions 2 with an equal depth d.

Figure 10:
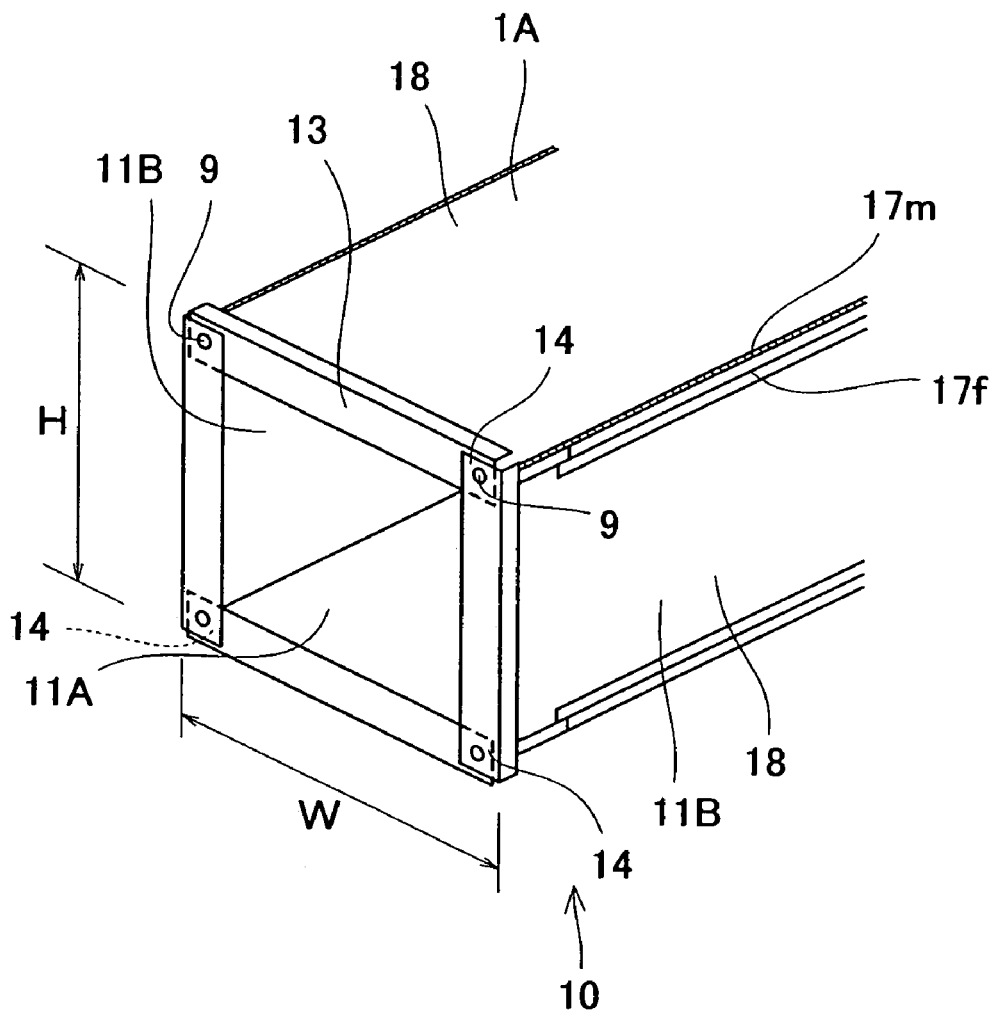
FIG. 10 is a perspective view showing a schematic structure of one end portion of a cornerplate-less duct.

In expanded shapes of the plates 1A and 1B, a dimension W2 in a width direction of a portion which is closer to the center in the longitudinal direction than the cut portions 2A and 2B is the sum of a dimension W3 of a wall forming portion 8 which becomes a wall 18 (see FIG. 10) of the duct 10 and dimensions W4 of seam forming portions 7(7m, 7f) formed on both side ends (both ends in the width direction of the plates 1A and 1B), with the plates 1A and 1B assembled into the duct 10 (see FIG. 10).

Figure 6:
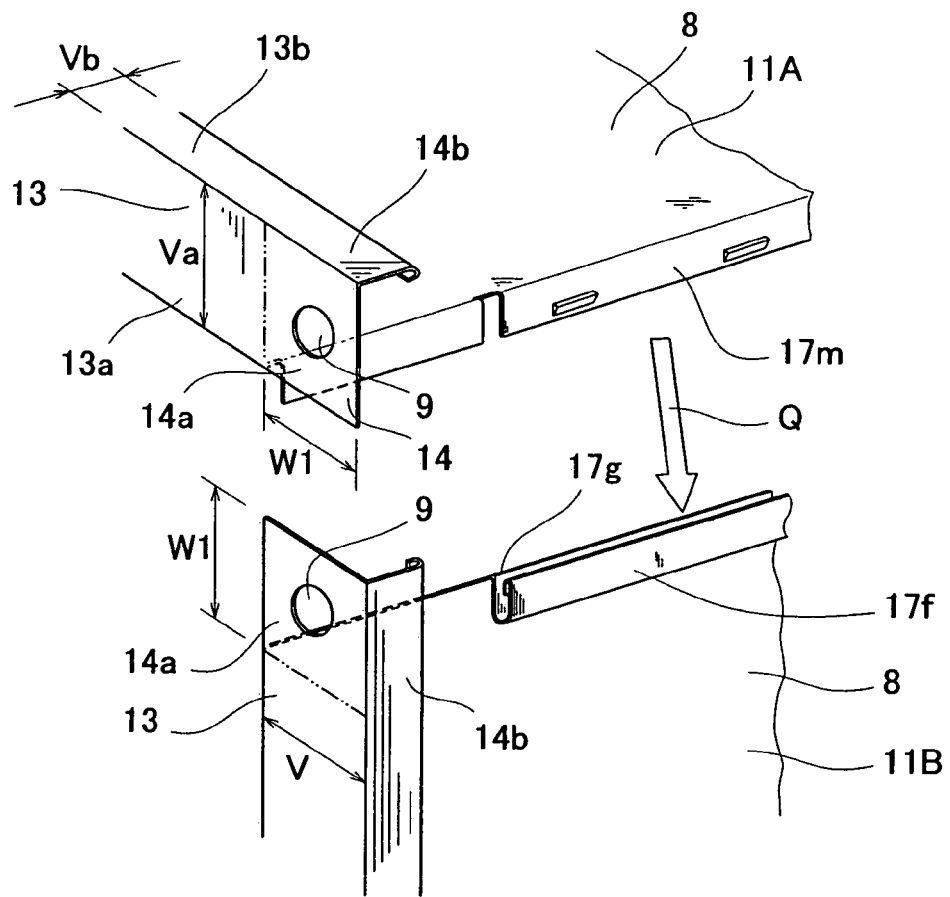
FIG. 6 is a perspective view showing a state before plate members manufactured through the forming process of FIGS. 3, 4, and 5 are joined to each other.

The plate 1A having the male seam forming portions 7m differs from in the dimension W2 in the width direction from the plate 1B having the female seam forming portions 7f due to the difference in the dimension W4 in the width direction of the seam forming portions 7m and 7f. Specifically, a dimension W2m of the plate 1A having the male seam forming portions 7m is smaller than a dimension W2f of the plate 1B having the female seam forming portions 7f. This dimensional difference is, as shown in FIG. 6, caused by the fact that the male seam joint portion 17m is formed merely by bending the male seam forming portions 7m (see FIG. 1) substantially 90 degrees, while the female seam joint portion 17f is formed by bending the female seam forming portions 7f (see FIG. 2) plural times (three times in the first embodiment).

While the duct 10 of this embodiment is structured such that the width W and the height H are equal (i.e., the duct 10 has a square cross-section) as shown in FIG. 10, there is a difference in the dimension W3 of the wall forming portion 8 between the plates 1A and 1B in the case of a duct having a width and a height which are different from each other, as a matter of course.

As shown in FIGS. 1 and 2, in the planar shapes of the plates 1A and 1B, a dimension W5 in the width direction of portions (flange forming portions 3) which are closer to the ends (starting end 1s and terminal end 1e) in the longitudinal direction than the cut portions 2A and 2B is equal to the dimension W3. A dimension L1 in the longitudinal direction of these portions (flange forming portions 3) is a sum of a dimension L1a and a dimension L1b. The dimension L1a becomes a width va of joint faces 13a of the flange portion 13 (see FIG. 6). And, the dimension L1b becomes a width vb of the folded portion 13b of the flange portion 13.

The flange forming portions 3 are each formed by a region having the dimension W5 and the dimension L1. Following the flange forming portions 3, corner forming portions 4 (see FIGS. 1 and 2) protrude in the width direction (arrow Ya direction in FIGS. 1 and 2) in the width direction of the plates 1a and 1B to form the corner portions 14 of the duct 10 shown in FIG. 10. A dimension L2 in the longitudinal (arrow Za direction of FIGS. 1 and 2) of the corner forming portions 4 is equal to a dimension L1 in the longitudinal direction of the flange forming portions 3. The dimension L2 in the longitudinal direction is a sum of a dimension L2a and a dimension L2b. The dimension L2a becomes an overlapping portion 14a (see FIG. 6) of the corner portion 14 (see FIG. 6) and the dimension L2b becomes the folded portion 14a (see FIG. 6) of the corner portion 1.

A dimension W6 in the width direction of the corner portions 14 is substantially equal to the dimension L2a in the longitudinal direction. Also, the dimension W6 in the width direction is equal to the overlapping portion W1 (see FIG. 6) of the corner portion 14.

The plates 1A and 1B having the planar shapes shown in FIG. 1 or FIG. 2 are cut out from metal thin plates generally supplied as roll materials by a plasma processor (plasma cutter). Alternatively, as a matter of course, the plates 1A and 1B may be cut out manually by an operator using other cutters or "tin scissors".

In contrast to the conventional plate, the plates 1A and 1B having the above-described planar shapes are structured such that the corner forming portions 4 are integral with and protrude from the flange forming portions 3 in the width direction of the plates 1A and 1B. In other words, portions (see hatched portions represented by N in FIGS. 1 and 2) which have been conventionally cut out as being discarded can be used as the corner forming portions 4.

The plate 1A (or 1B) having the above described planar shape becomes a plate member to be assembled into the duct 10 through steps described below.

Figure 3:
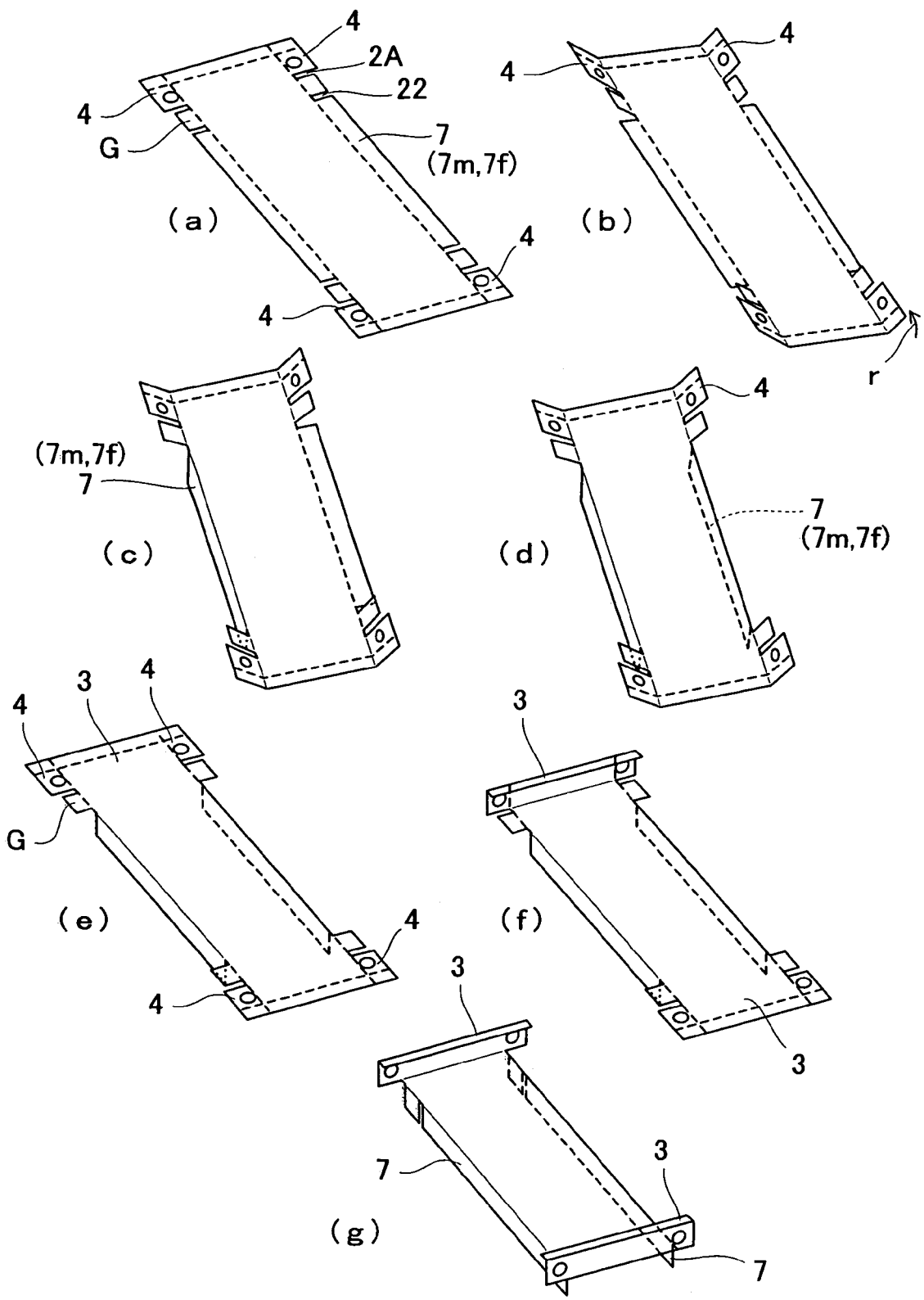
FIGS. 3(a) to 3(g) are perspective views showing a procedure of a forming process of seam forming portions and flange forming portions of the plates in FIGS. 1 and 2.

With reference to FIG. 3 which illustrates the plate 1A along manufacturing steps (forming process), the corner forming portions 4 located at four corners (the corner forming portions 4 and their adjacent portions G in the case of the plates 1A) which are shown in FIG. 3(a), are temporarily bent a predetermined angle in the opposite direction to the bending of the seam forming portions 7 (7m, 7f), i.e., as indicated by an arrow r of FIG. 3(b). Specifically, the corner forming portions 4 are temporarily bent at an angle approximately 30 degrees or more (approximately 45 degrees) (see FIG. 3(b) which illustrates the plate 1A after temporal forming process). The corner forming portions 4 are temporarily bent so as not to interfere with seam forming regions.

The corner forming portions 4 may be temporarily bent manually using an instrument tool by an operator, or automatically by a temporal forming machine installed continuously with the seam forming machine. Alternatively, this may be done using a seam forming machine shown in FIG. 50.

Figure 4:
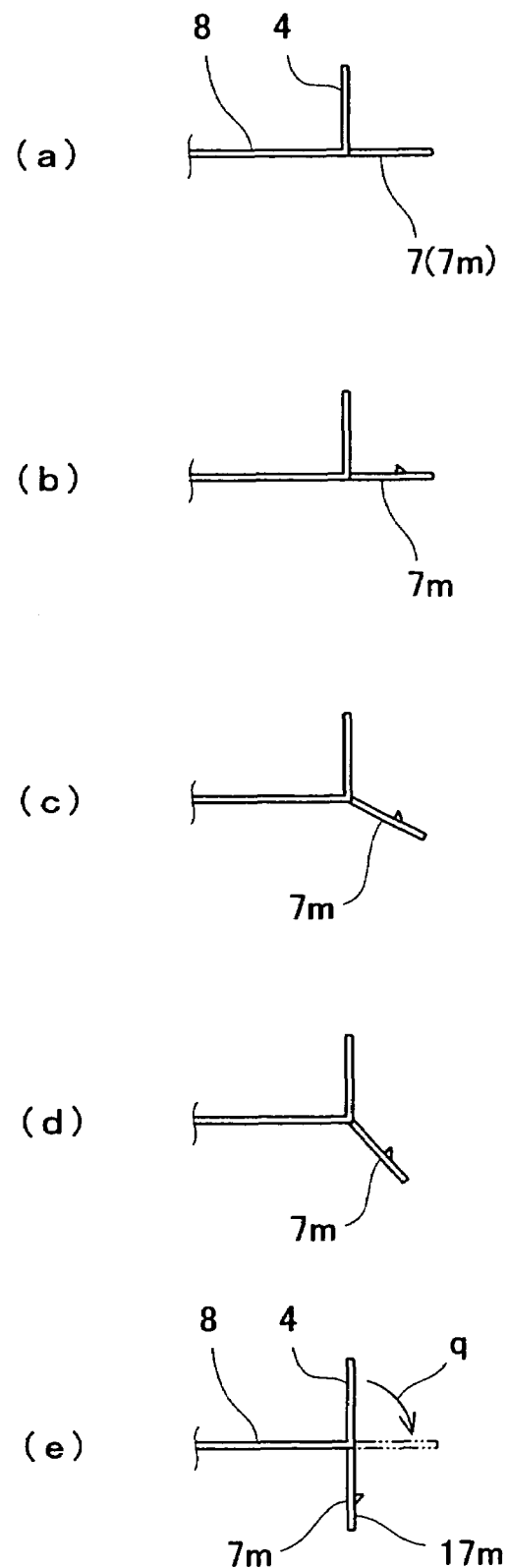
FIGS. 4(a) to 4(e) are cross-sectional views of a plate member as seen in a direction substantially perpendicular to the longitudinal direction of the plate, showing a procedure for forming the male seam forming portion of FIGS. 3(a) to 3(g)
Figure 5:
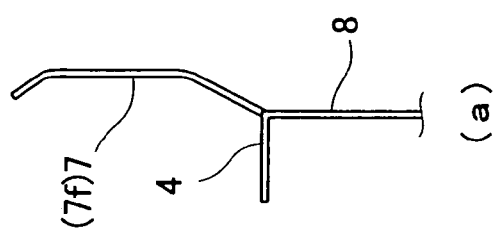
FIGS. 5(a) to 5(j) are cross-sectional views of the plate as seen in a direction substantially perpendicular to the longitudinal direction of the plate, showing a procedure for forming the female seam forming portion of FIGS. 3(a) to 3(g)
Figure 5:
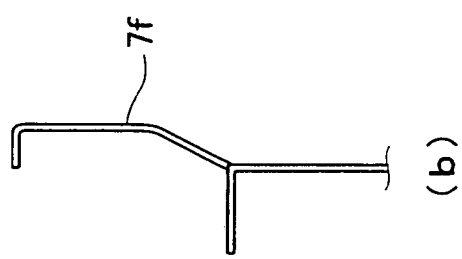
Figure 5:
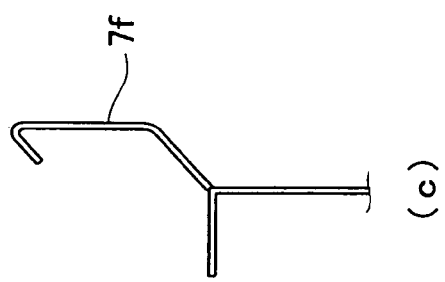
Figure 5:
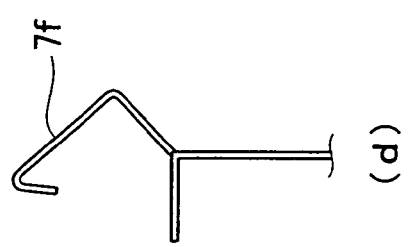
Figure 5:
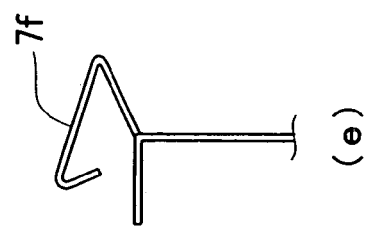
Figure 5:
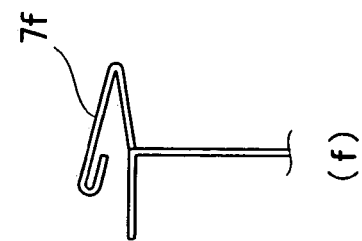
Figure 5:
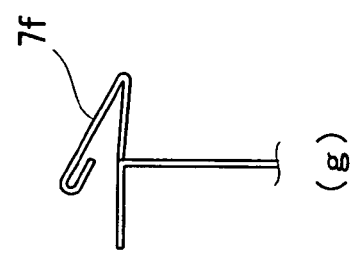
Figure 5:
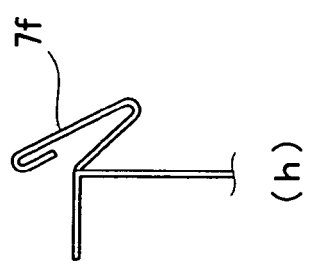
Figure 5:
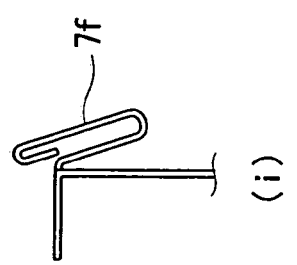
Figure 5:
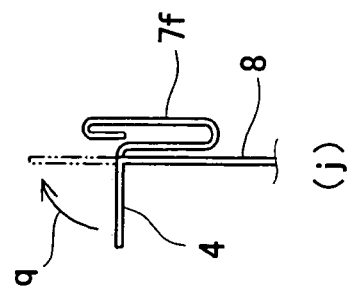

Subsequently, the temporarily formed plate 1A (or 1B) is, as shown in FIG. 3(c), formed by the seam forming apparatus in such a manner that the seam forming portion 7 (7m or 7f) which is one side end portion (left side end portion in FIG. 3) of the plate 1A (or 1B) is formed into a seam joint portion and then, the seam forming portion 7 (7m or 7f) which is an opposite side end portion (right end portion in FIG. 3) is, as shown in FIG. 3(d), formed into a seam joint portion. Through this process, the seam joint portions (17m, 17f) are formed on both sides of the plate members 11A and 11B. The seam joint portions, to be specific, the male seam joint portions are formed through steps shown in FIGS. 4(a) to 4(e) and the female seam joint portions are formed through steps shown in FIGS. 5(a) to 5(j). In this embodiment, as shown in FIGS. 4 and 5, the corner forming portions 4 (and the adjacent portions G in the case of the plate 1A) are desirably temporarily bent again to form 90 degrees so as not to interfere with the seam forming regions (see FIGS. 4 and 5).

After the seam joint portions 17 (specifically, the male seam joint portions 17m in the case of the plate member 11A and the female seam joint portion 17f in the case of the plate member 11B as shown in FIG. 6) have been formed from the seam forming portions 7 (7m, 7f), the temporarily bent corner forming portions 4 (and the adjacent portions G in the case of the plate 1A) are returned to their original states, that is, made substantially flush with the flange forming portions 3 (see FIG. 3(e), and two-dotted lines and an arrow q indicating a return direction in FIGS. 4(e) and 5(j)).

The corner forming portions 4 may be returned to be substantially flush with the flange forming portions 3 manually or using an instrument tool by an operator, or automatically by a temporal forming machine installed continuous with the seam forming machine.

Subsequently, as shown in FIG. 3(f) or 3(g), the flange forming portion 3 provided at the starting end 1s (or terminal end 1e) of the plate 1A (or 1B) is formed into the flange portion 13 (see FIG. 6). Through this process, the corner forming portion 4 is formed into the corner portion 14 which is formed integrally with the flange portion 13 to protrude from both sides thereof.

The flange forming portion 3 can be formed into the flange portion 13 using a forming machine basically having the same construction as that of the forming machine generally used to form the seam joint portion, more specifically, a forming machine equipped with a plurality of forming rollers.

A procedure for assembling the cornerplate-less duct using the plate member 11A having the male seam joint portions 17m and the plate member 11B having the female seam joint portions 17f, and the cornerplate-less duct will be described below.

Figure 7:
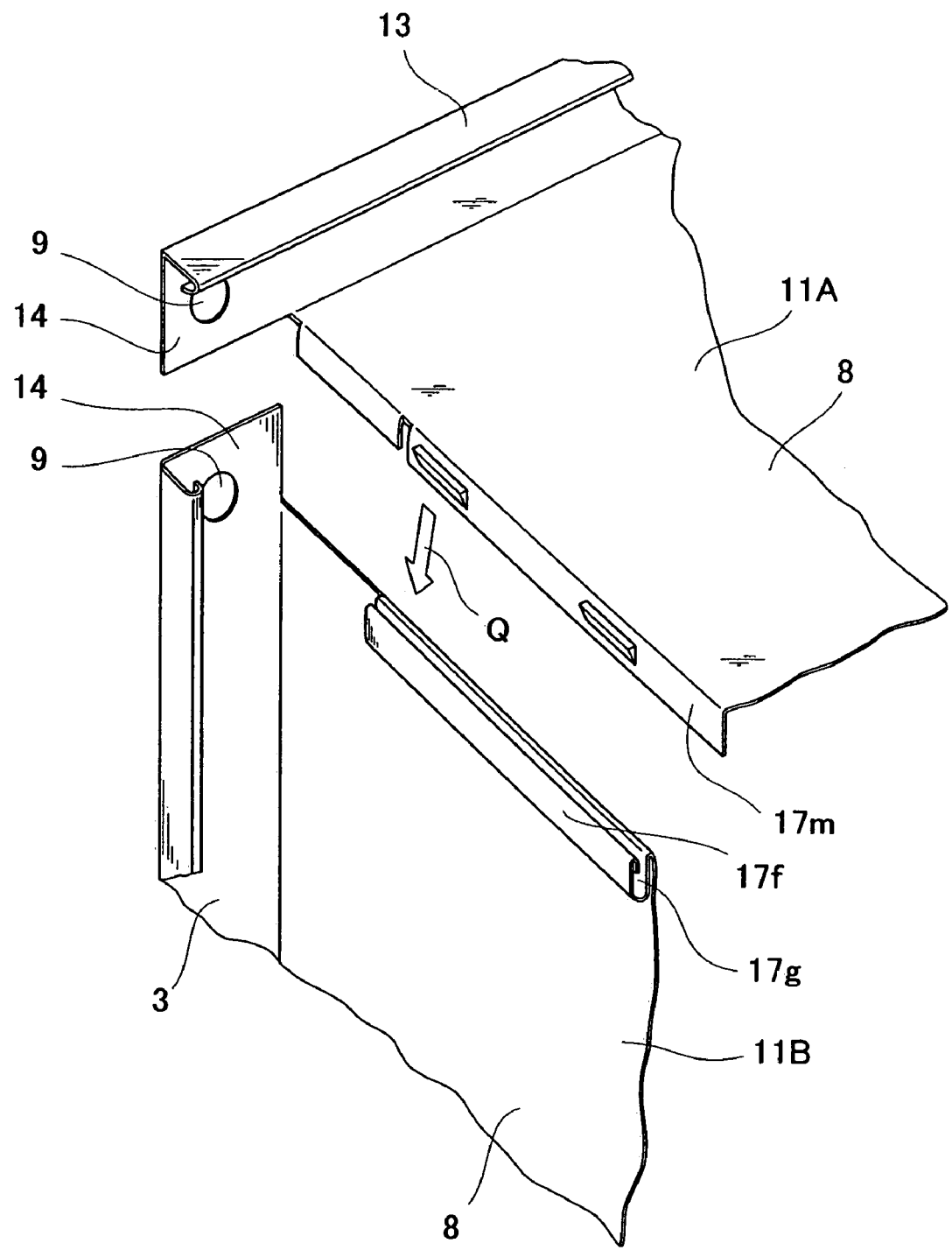
FIG. 7 is a perspective view of the state before the plate members are joined to each other, as seen from a perspective different from that of FIG. 6.

As shown in FIG. 6 or 7, four, i.e., two pairs of plate members 11A and 11B are assembled in the duct 10 shown in FIG. 10 in such a manner that the male seam joint portion 17m of each of the plate members 11A is inserted into a seam groove 17g of the female seam joint portion 17f of each of the plate members 11B (see arrow Q of FIGS. 6 and 7). In this case, the portion G is bent in the direction in which the male seam joint portion 17m is bent. In this embodiment, since a center-side end of the portion G in the longitudinal direction is closer to the center than a center-side end of the cut portion 2B, a center-side end portion of the portion G covers the seam joint portion to fix the seam joint portion (see FIG. 8).

While the portion G is bent manually by the operator using a tool, it may be bent using a machine as a matter of course.

In the structure of the seam joint, as shown in FIGS. 8 and 9, the corner portions 14 of the adjacent plate members 11A and 11B overlap with each other in a plate thickness direction, thus forming the corner portion 14 of the duct 10.

By forming holes 9 in the corner portions 14 of the plate members 11A and 11B to allow these holes 9 to conform to each other with the plate members 11A and 11B assembled into the duct 10, positioning of the plate members 11A and 11B is facilitated, and precise positioning is confirmed.

In addition, the holes 9 for fixing serve as holes through which joint bolts (not shown) are inserted when the ducts 10 (see FIG. 16) are joined. The corner portions 14 joined by the joint bolts are made rigid.

Figure 16:
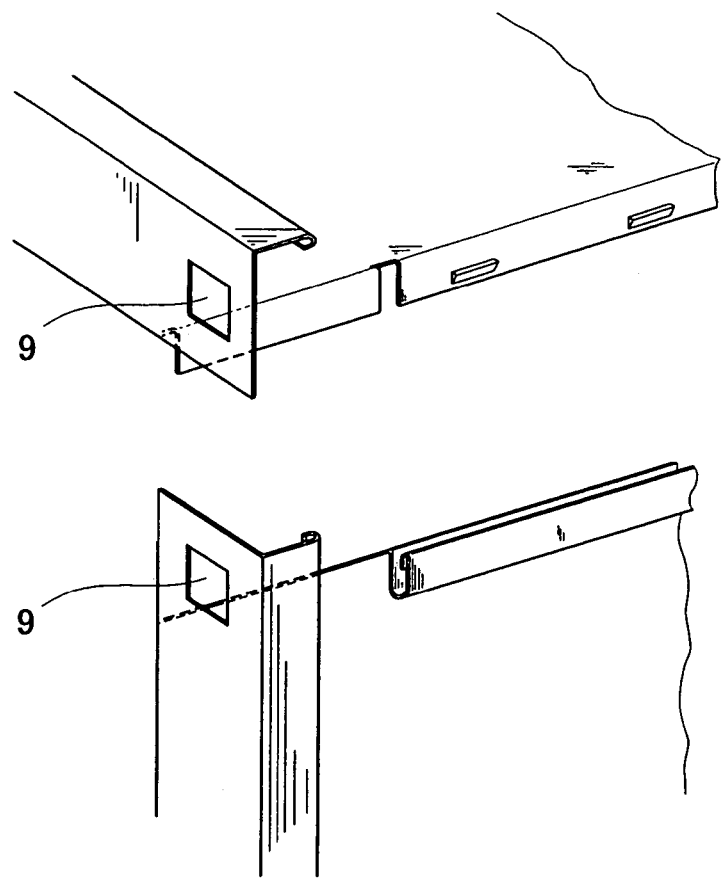
FIG. 16 is an enlarged perspective view of portions of adjacent plate members having fixing holes of a different shape, which become a corner portion of the duct.

Instead of the fixing holes 9 which are circular, rectangular holes 9 shown in FIG. 16 may be used or holes having other shapes may be used.

Figure 17:
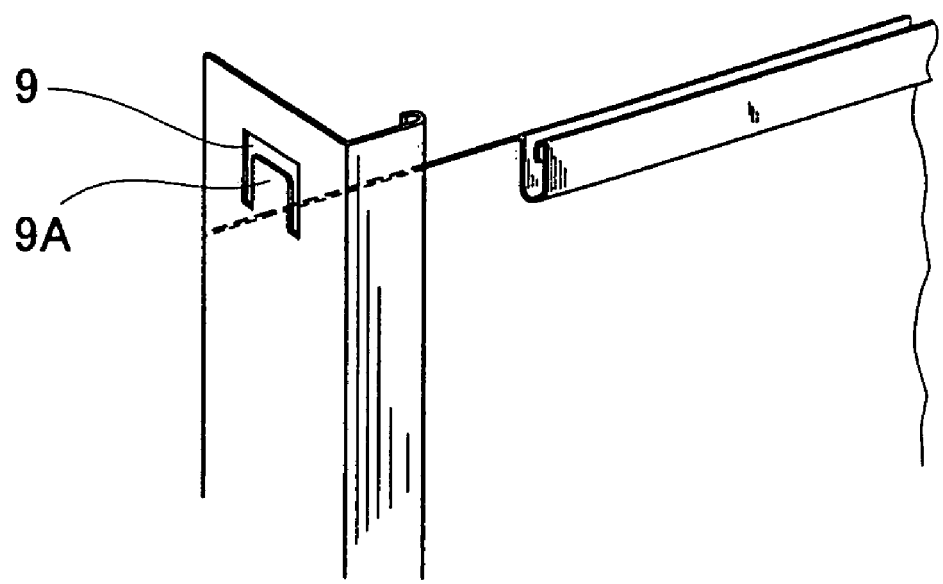
FIG. 17 is a partially enlarged perspective view of the corner portion in which an engagement portion is provided integrally on a fixing hole.
Figure 18:
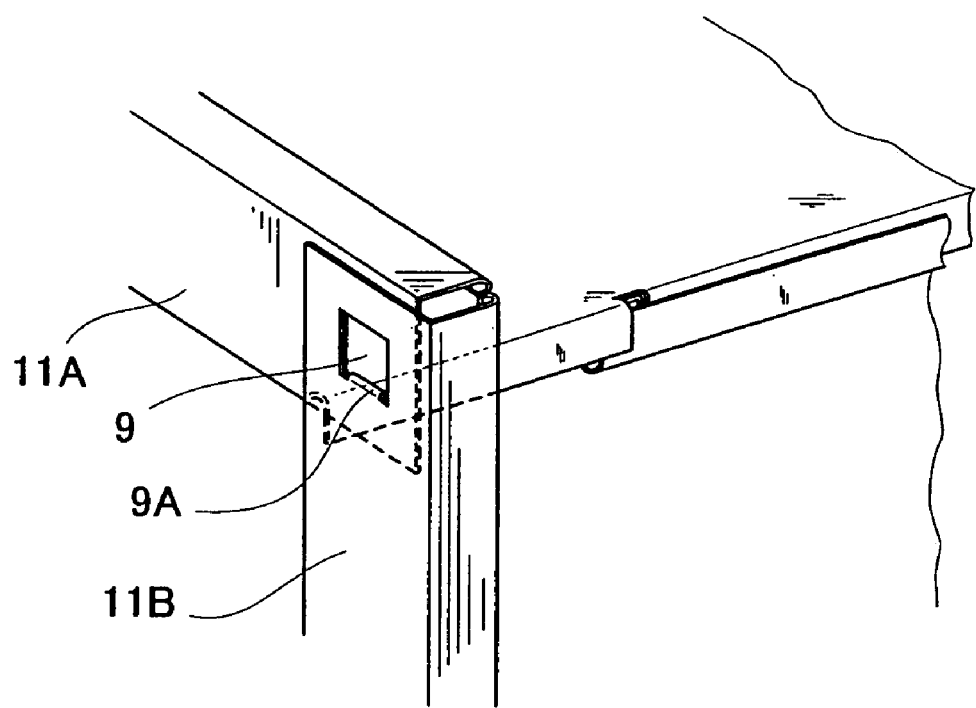
Figure 18:
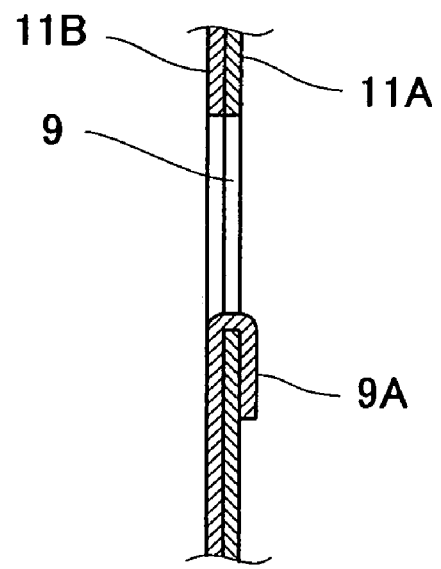

When the fixing holes 9 are formed, an engagement portion 9A may be formed within at least one of the holes 9 as shown in FIG. 17, and the engagement portion 9A is inserted through an opposite hole 9 and bent toward the back side of the plate member 11A to allow the adjacent plate members 11a and 11B to be fixed as shown in FIGS. 18(a) and 18(b). Alternatively, the engagement portion 9A may be formed at a different location of the rectangular hole 9, for example, at a side portion or an upper portion. In particular, by providing the engagement portion 9A at the upper portion of the rectangular hole 9, the plate 1A can be engaged in an opposite direction to a direction of engagement of the seam joint portion, the duct 10 can be held in a predetermined state.

Figure 15:
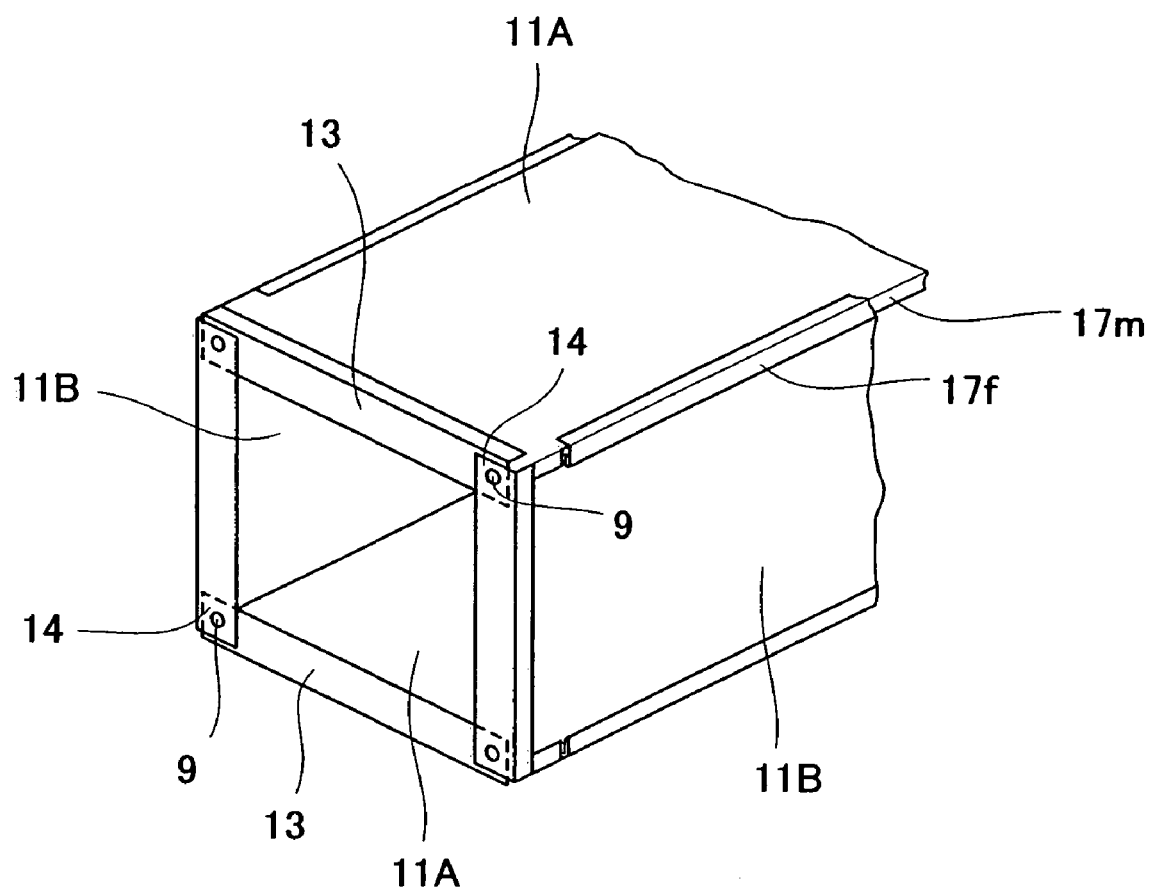
FIG. 15 is a perspective view showing a structure of one end portion of the duct assembled using the plate members having the Pittsburgh type seam joint portion shown in FIGS. 11 and 12.

In addition, by engaging the plate members 11A and 11B in the hole 9 by the engagement portion 9A, the duct 10 can be held in the predetermined state (tubular shape state), and hence operation becomes easier when the duct 10 assembled in FIGS. 10 and 15 is fed or suspended at a predetermined location, or the ducts 10 are joined.

Figure 19:
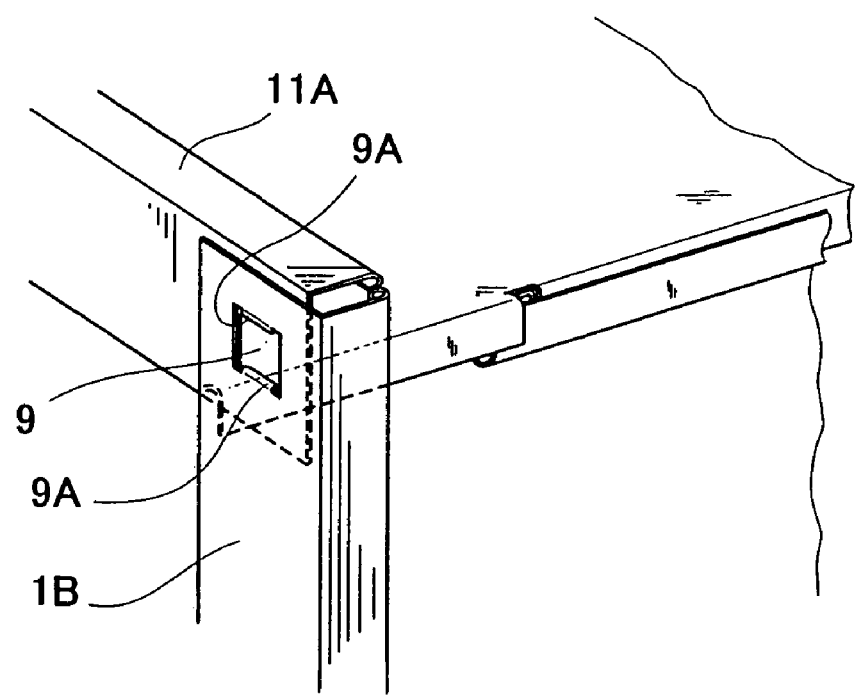
Figure 19:
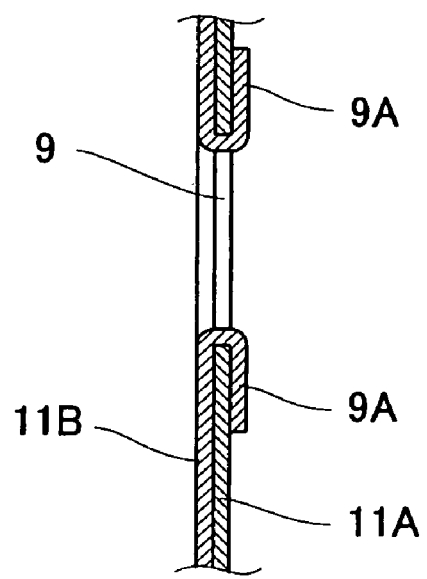
Figure 20:
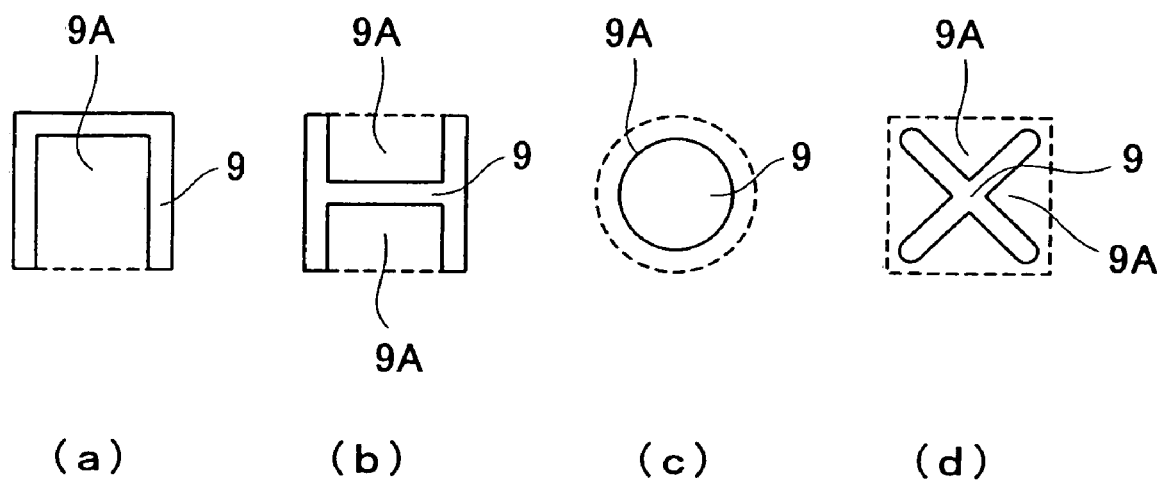
FIGS. 20(a) to 20(d) are partially enlarged views showing engagement portions which are formed on the fixing holes and have various shapes, as seen from the direction perpendicular to the holes.

In an alternative embodiment of the engagement portion 9A, as shown in FIGS. 19(a) and 19(b), the engagement portion 9A may be formed on each of upper and lower sides of the hole 9 to enable engagement between the plate members 11A and 11B by the upper and lower sides of the hole 9. In such a structure, the plate members 11A and 11B can be vertically fixed. In a further alternative, as shown in FIGS. 20(a) to (d), engagement portions 9A of various shapes may be formed on the hole 9. Instead of the engagement portion 9A in the embodiments of FIGS. 20(a) and 20(b), a circular engagement portion 9A capable of engaging the plate members 11A and 11B entirely in a circumferential direction of the hole 9, or an engagement portion 9A provided with a triangular portion, which is capable of engagement between the plate members 11A and 11B in upward and downward directions and in rightward and leftward directions.

Figure 11:
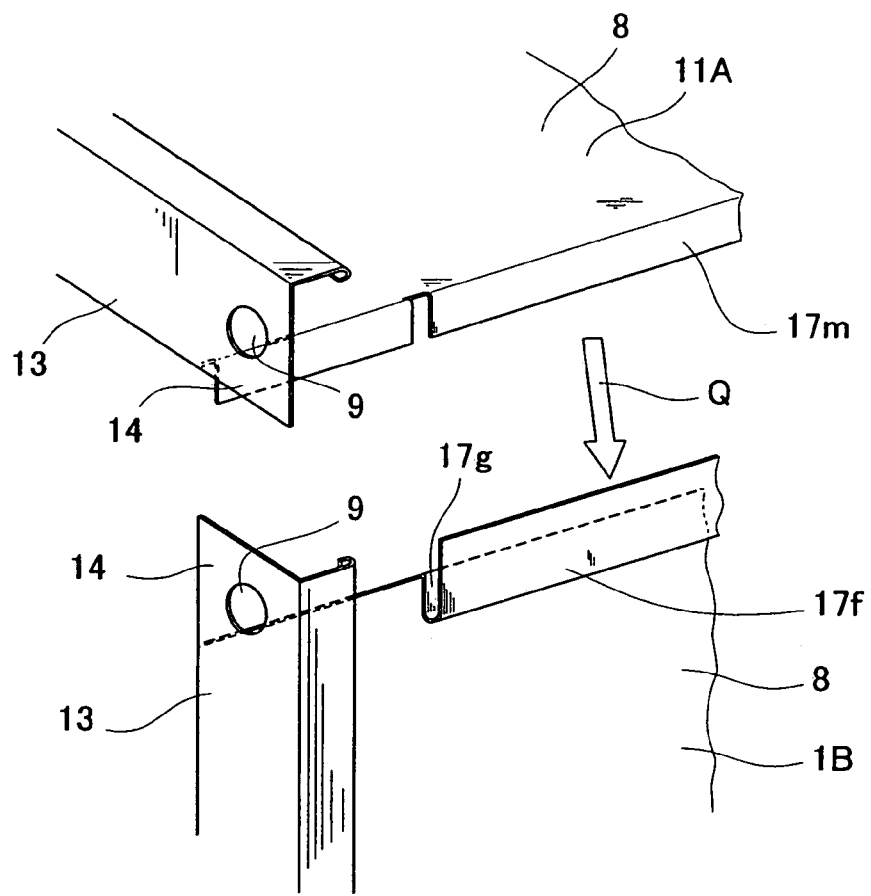
FIG. 11 is a perspective view showing a structure of the plate members having Pittsburgh type seam joint portions in a state before being seam-joined.
Figure 12:
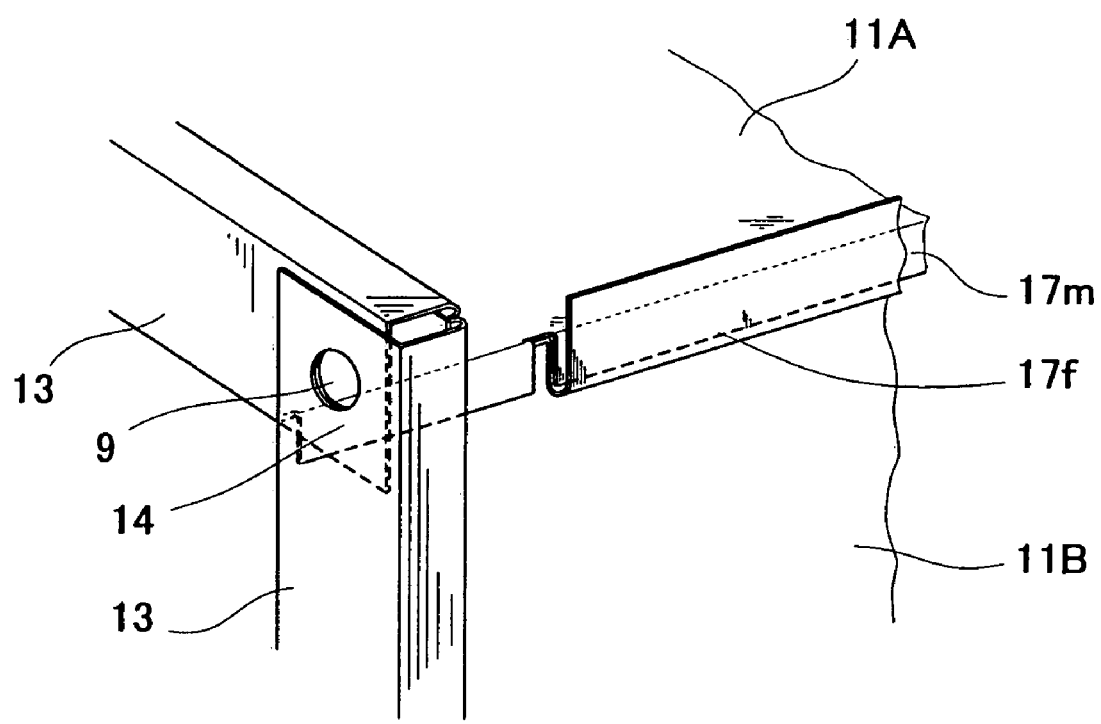
FIG. 12 is a perspective view showing a state of a final assembly step for seam-joining the plate members of FIG. 11.
Figure 13:
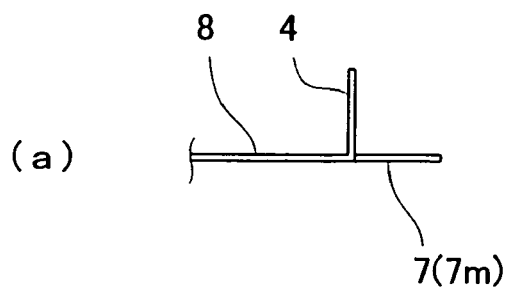
FIGS. 13(a) to 13(e) are cross-sectional views of the plate as seen in a direction perpendicular to the longitudinal direction of the plate, showing a procedure for forming the male seam joint portion of the Pittsburgh type seam joint portion shown in FIGS. 11 and 12.
Figure 13:
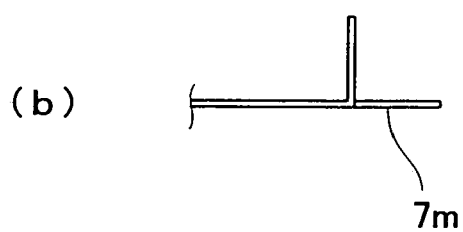
Figure 13:
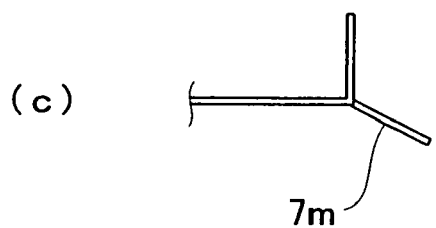
Figure 13:
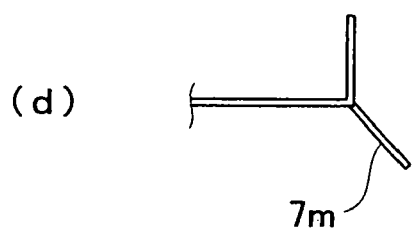
Figure 13:
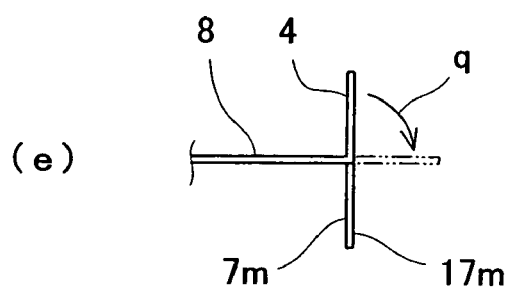
Figure 14:
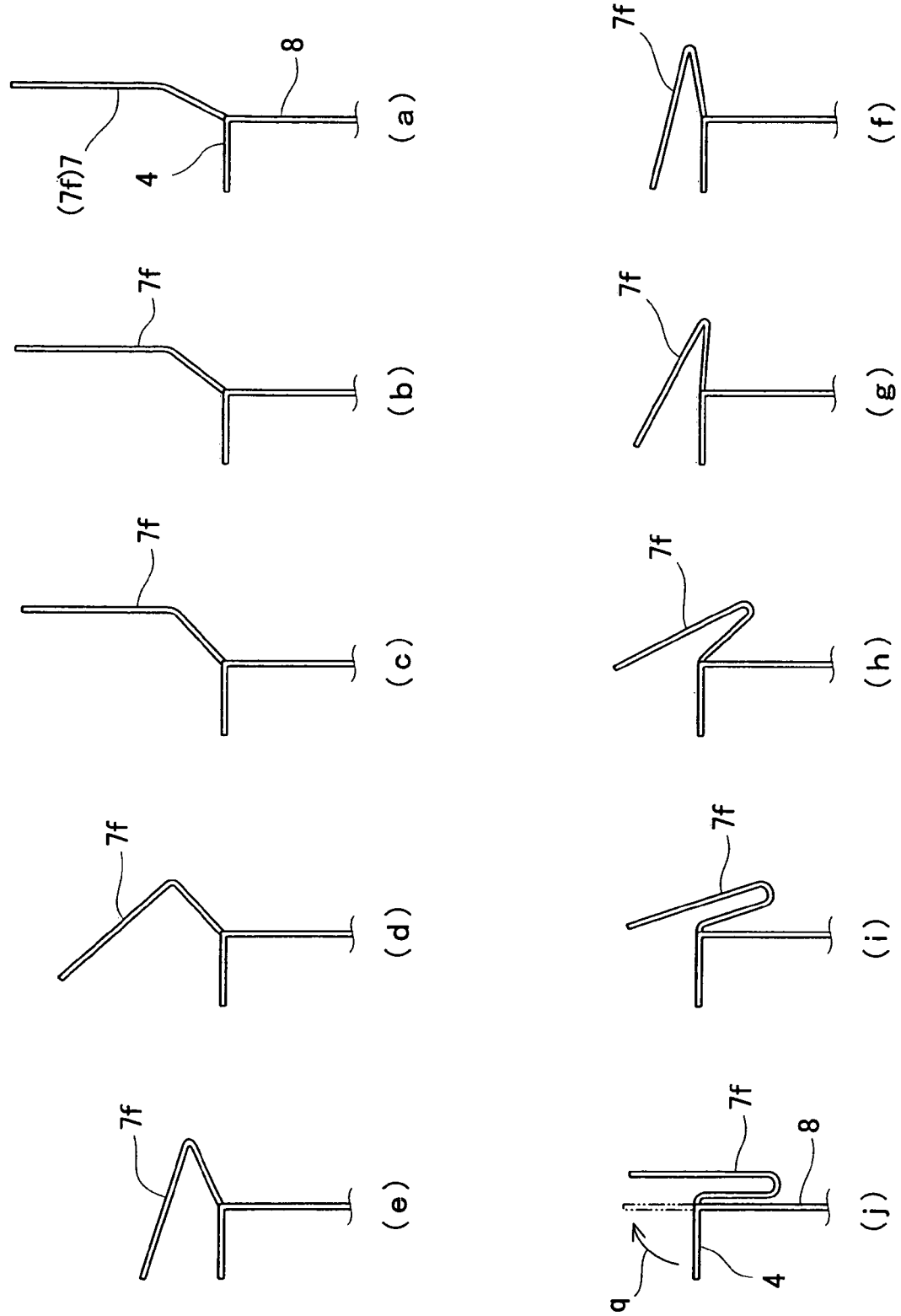
FIGS. 14(a) to 14(j) are cross-sectional views of the plate as seen in a direction perpendicular to the longitudinal direction of the plate, showing a procedure for forming the female seam joint portion of the Pittsburgh type seam joint portion shown in FIGS. 11 and 12.

While description has been given of the duct assembled by the plate members having the seam joint structure of button punch type, the cornerplate-less duct of the present invention is not limited to have the seam joint structure of the button punch type, but may be applied to a duct assembled by plate members 11A and 11B having Pittsburgh type seam joint structures shown in FIGS. 11 and 12, as a matter of course. The plate members 11A and 11B having the Pittsburgh type seam joint structures can be manufactured through steps in FIG. 13 which illustrates forming steps of the male seam joint portion and in FIG. 14 which illustrates forming steps of the female seam joint portion, i.e., through substantially the same steps as those through which the plate members having the button punch type seam joint portions.

As in the duct having the above mentioned seam joint structure, in the duct 10 assembled by the Pittsburgh type seam joint structure, the corner portions 14 of the duct 10 are formed by overlapping the corner portions 14 of the plate members 11A and 11B in the plate thickness direction as shown in FIG. 15, and thus, a cornerplate-less duct is formed.

In FIGS. 11 through 15, the same reference designators as those in FIGS. 1 through 10 denote the same or corresponding components.

Figure 21:
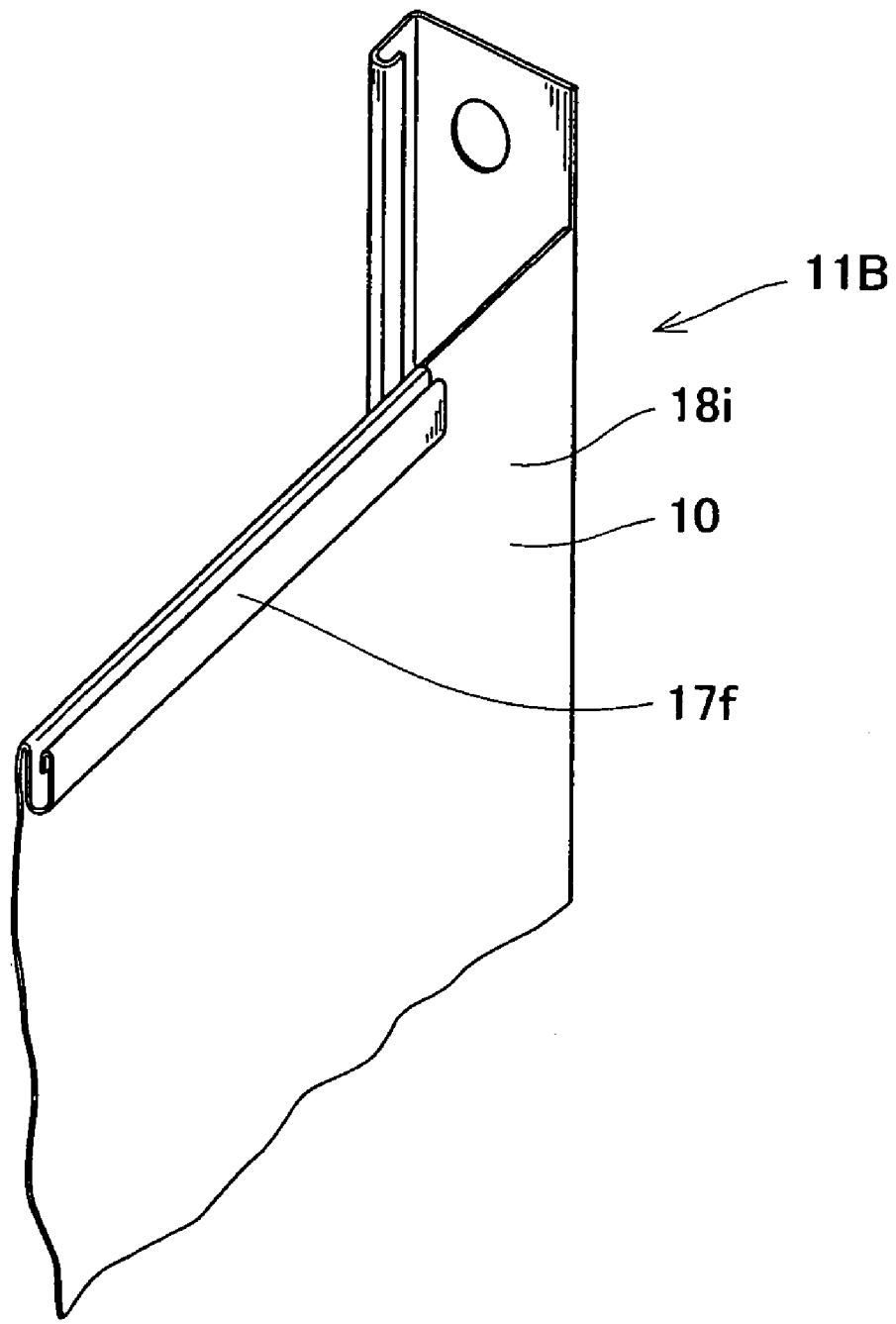
FIG. 21 is a perspective view showing an embodiment in which a cornerplate-less duct is applied to a duct structured such that the female seam joint portion of the seam joint portion is located on an inner wall side of the duct in an assembled state of the duct.

While the description has been given of the duct structured such that the female seam joint portion is exposed to an outer wall side of the duct 10 in this embodiment, the cornerplate-less duct of the present invention may be applicable to a duct provided with a female seam joint portion on an inner wall side thereof (conventionally used duct). Specifically, this may be accomplished by bending the flange portion 13 of the plate member 11B provided with female seam joint portions 17f on both sides (only one side is shown in FIG. 21) in the opposite direction to an inner wall 18i of the duct 10.

Subsequently, a seam forming machine of the present invention will be described.

Figure 22:
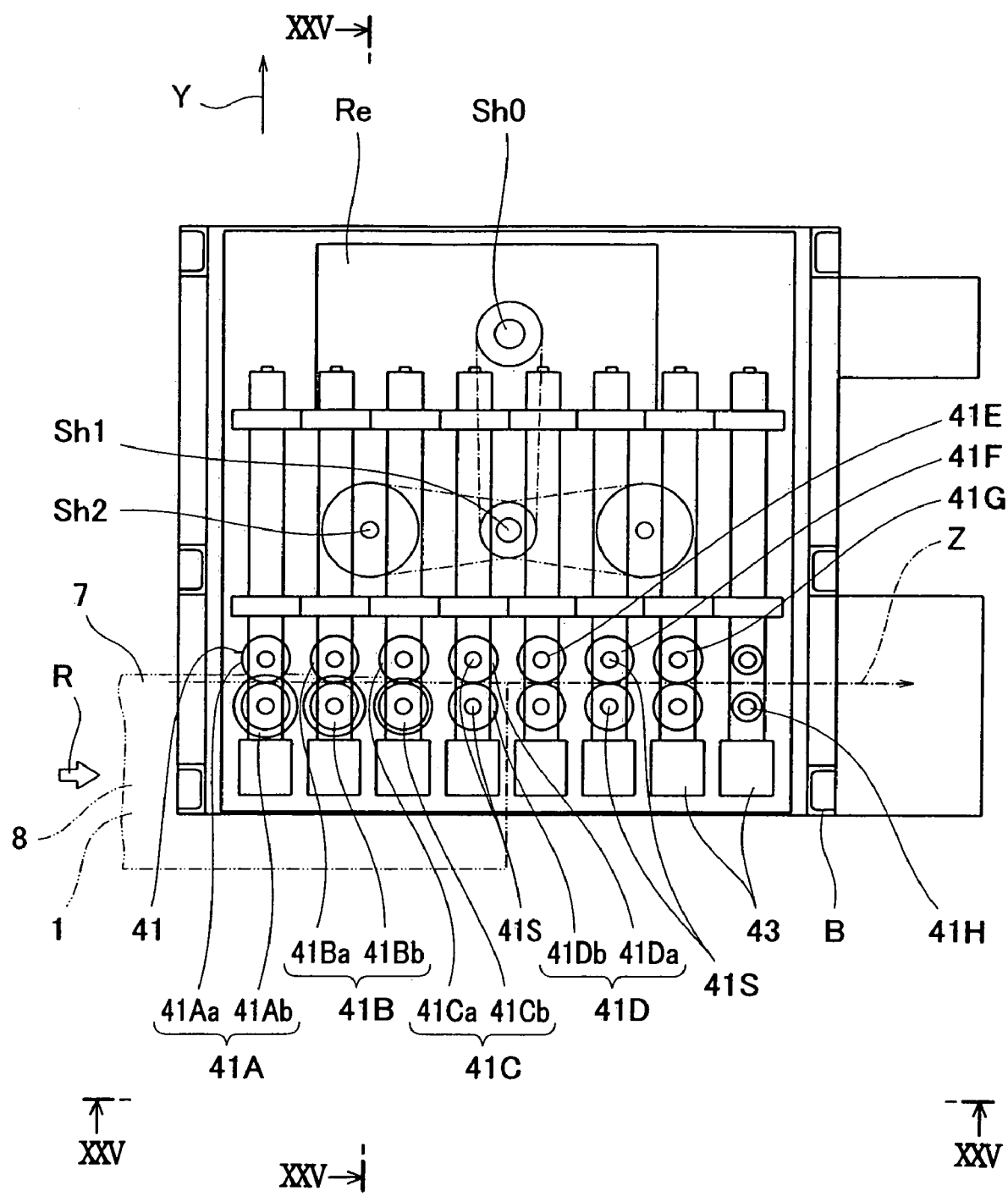
FIG. 22 is a plan view showing a schematic construction of an entire seam forming apparatus according to an embodiment of the present invention.
Figure 23:
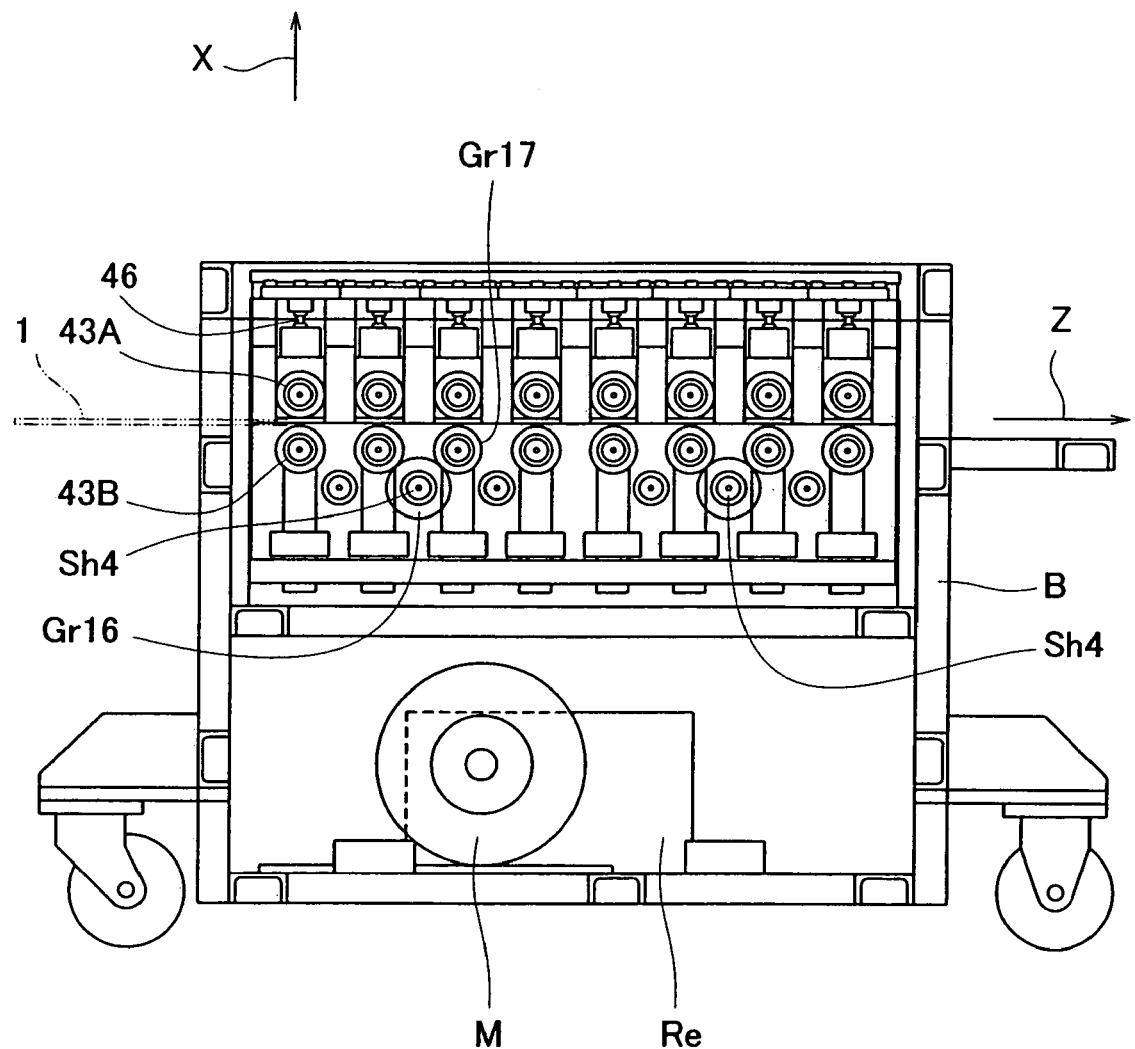
FIG. 23 is a side view (view taken in direction substantially along line XXIII-XXIII) of the seam forming apparatus of FIG. 22.

FIG. 22 is a plan view schematically showing an entire structure of a seam forming machine according to the embodiment of the present invention and FIG. 23 is a side view schematically showing an entire construction of the seam forming machine of FIG. 22.

The seam forming machine shown in FIG. 22 is constructed such that plural forming roll pairs 41 (41A to 41L: only 41A to 41H are shown in FIG. 22), each pair including right and left rolls, are arranged on a base B, along a flow of the forming process, i.e., from the left side to the right side in FIG. 22 (in this embodiment, in the direction represented by an arrow Z, indicating the direction of the passage of the material in FIG. 22). In this embodiment, 12 pairs of forming rolls 41 are arranged. The number of forming rolls is not limited, and may be more than or less than twelve depending on the configuration of the plate members to be formed, extendability of the plate to be formed into the plate member. In FIG. 22 (view showing arrangement of the plural forming roll pairs and the like), eight pairs of forming rolls, included in twelve forming rolls, are illustrated, for the sake of convenience. The eight pairs of forming rolls in FIG. 22 are formed by two units each including four forming roll pairs. Therefore, in the case of twelve forming roll pairs, three units may be provided.

Figure 28:
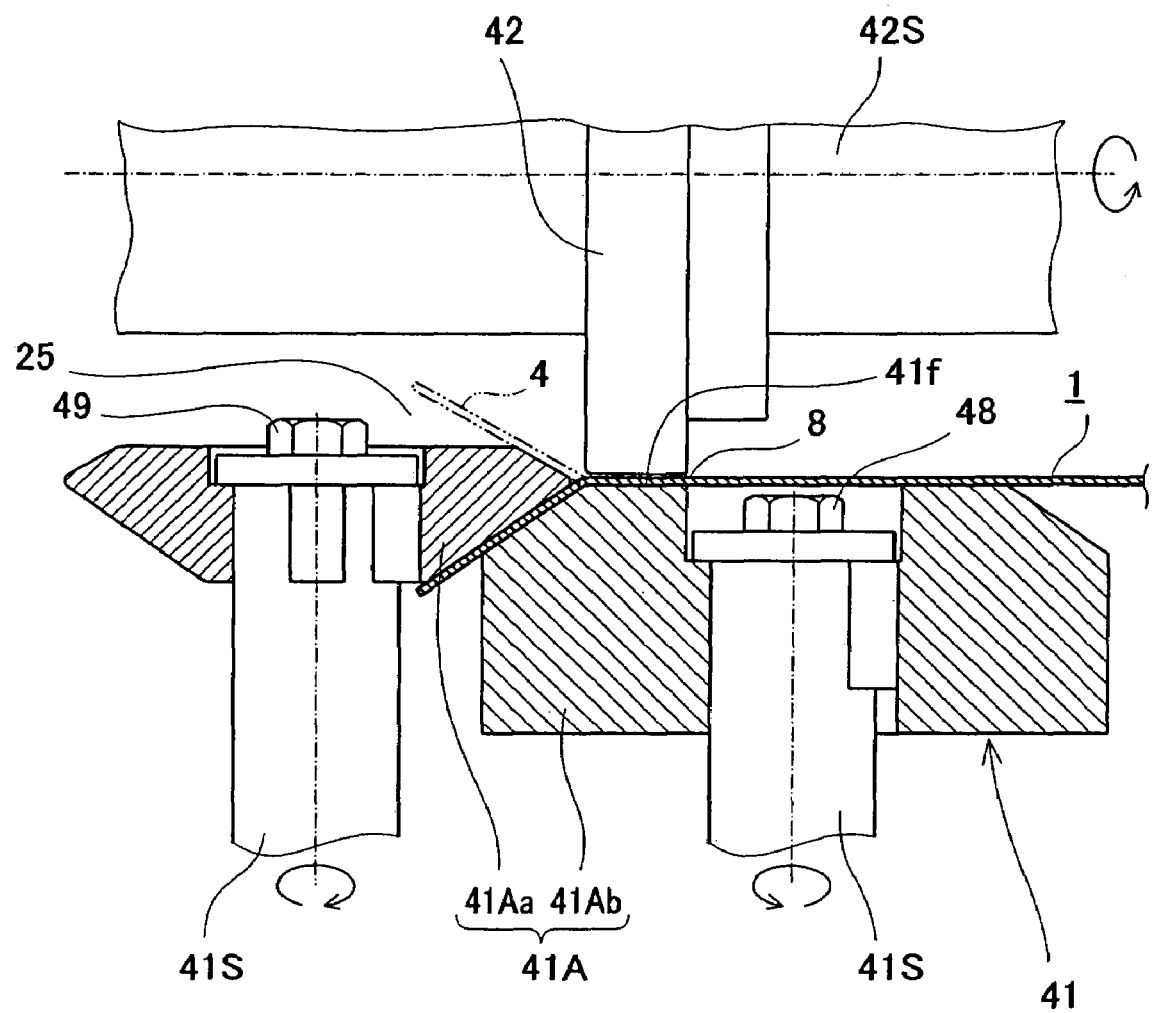
FIG. 28 is a partially enlarged cross-sectional view of a forming roll pair at an upstream end, which performs a forming process first as shown in FIG. 22.
Figure 29:
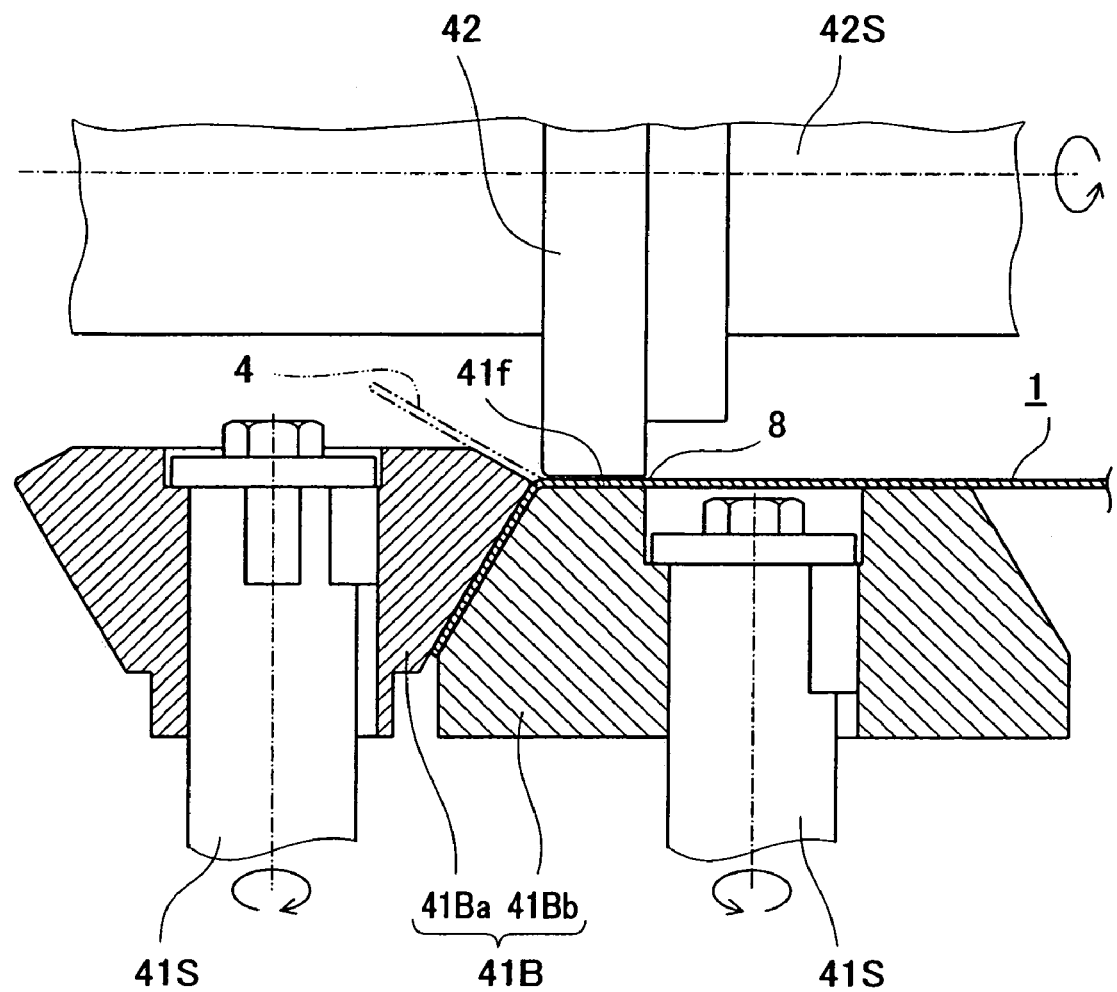
FIG. 29 is a partially enlarged cross-sectional view of a forming roll pair which is disposed next to the forming roll pair of FIG. 28.
Figure 30:
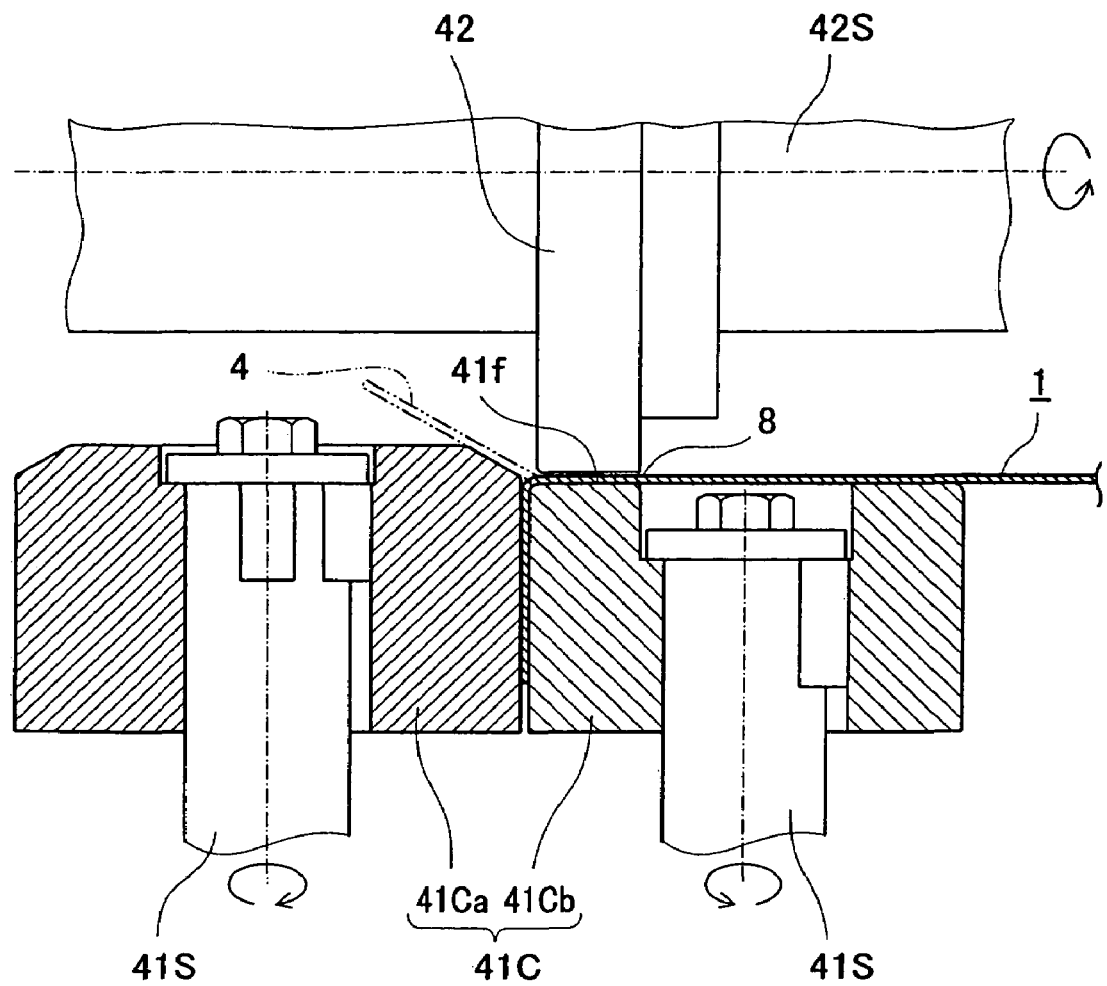
FIG. 30 is a partially enlarged cross-sectional view of a forming roll pair which is disposed next to the forming roll pair of FIG. 29.
Figure 31:
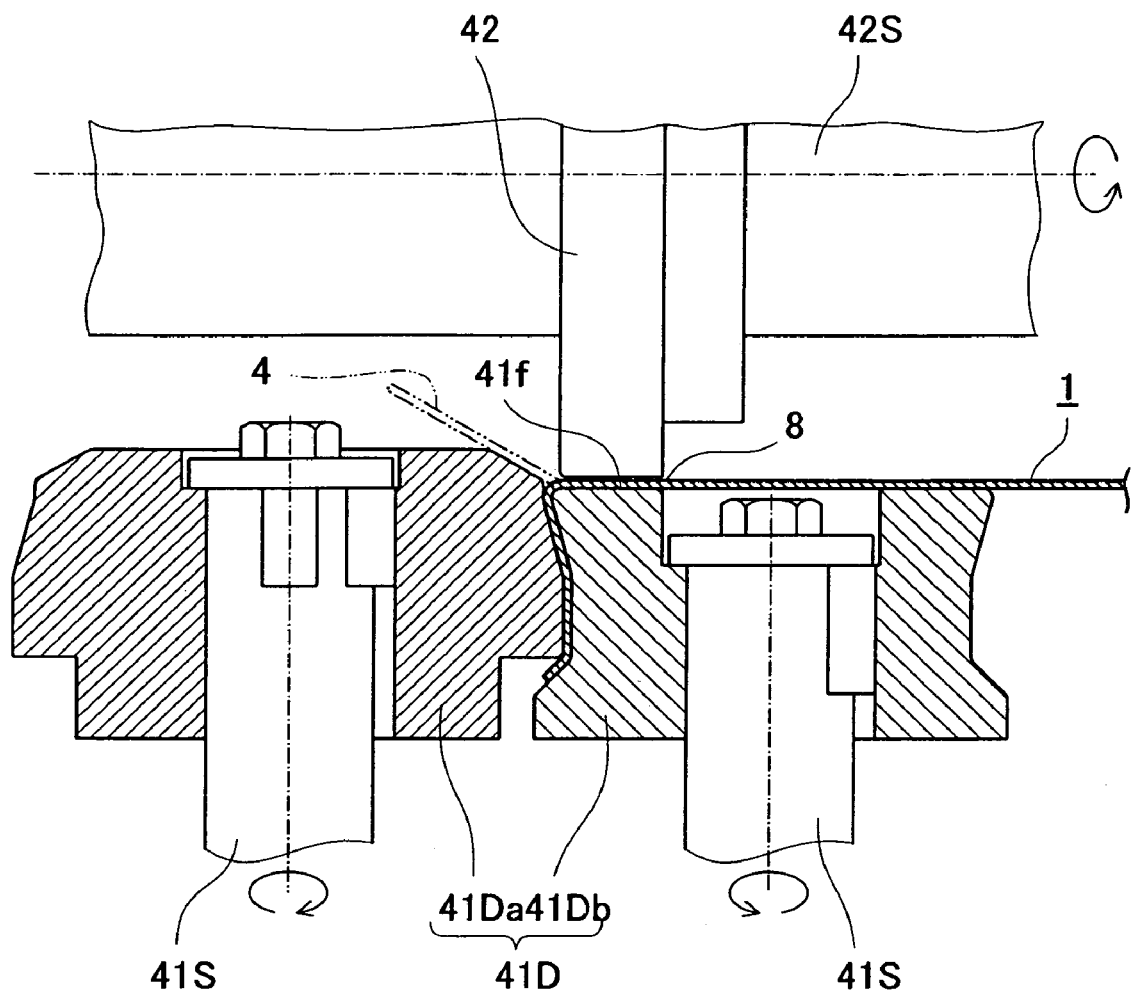
FIG. 31 is a partially enlarged cross-sectional view of a forming roll pair which is disposed next to the forming roll pair of FIG. 30.
Figure 32:
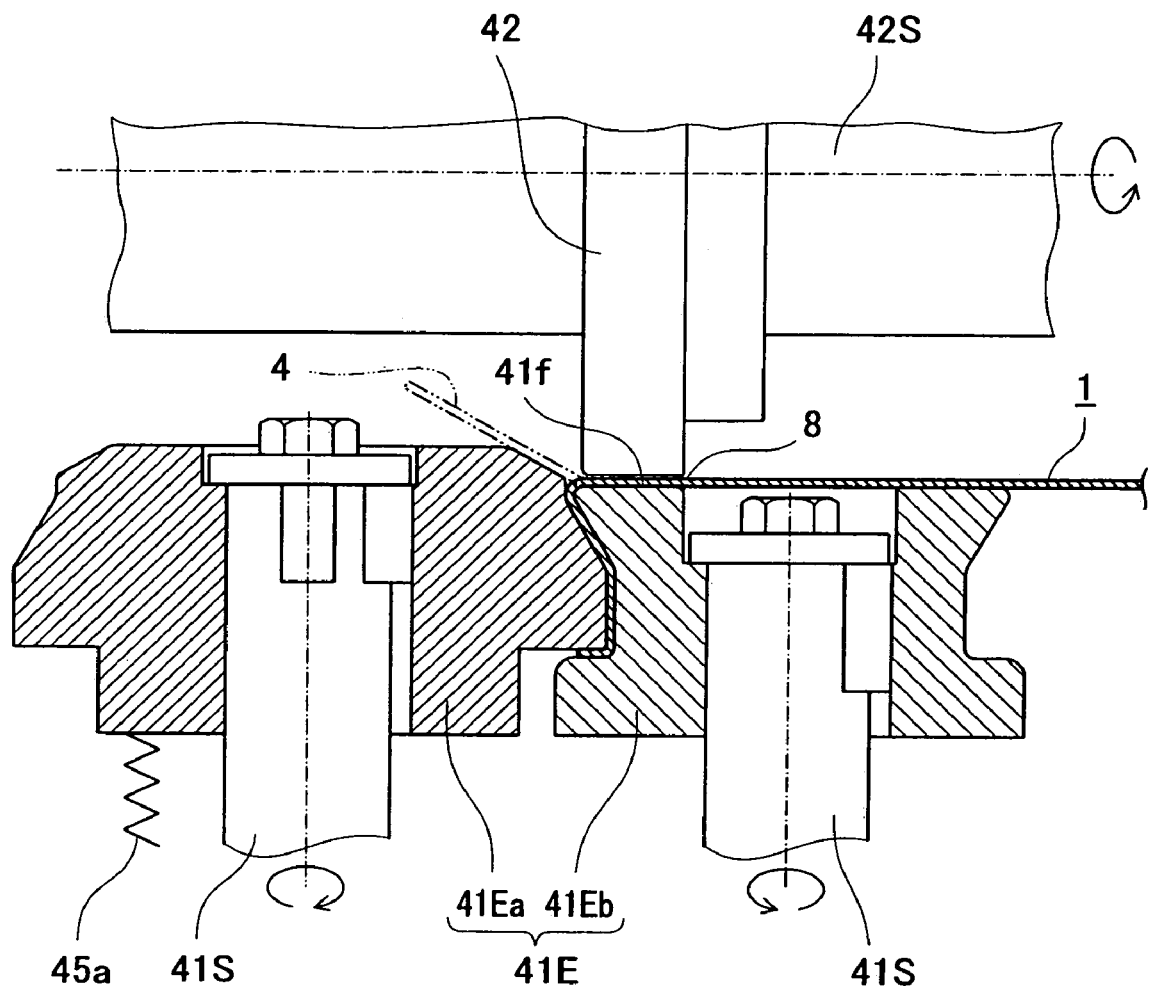
FIG. 32 is a partially enlarged cross-sectional view of a forming roll pair which is disposed next to the forming roll pair of FIG. 31.
Figure 33:
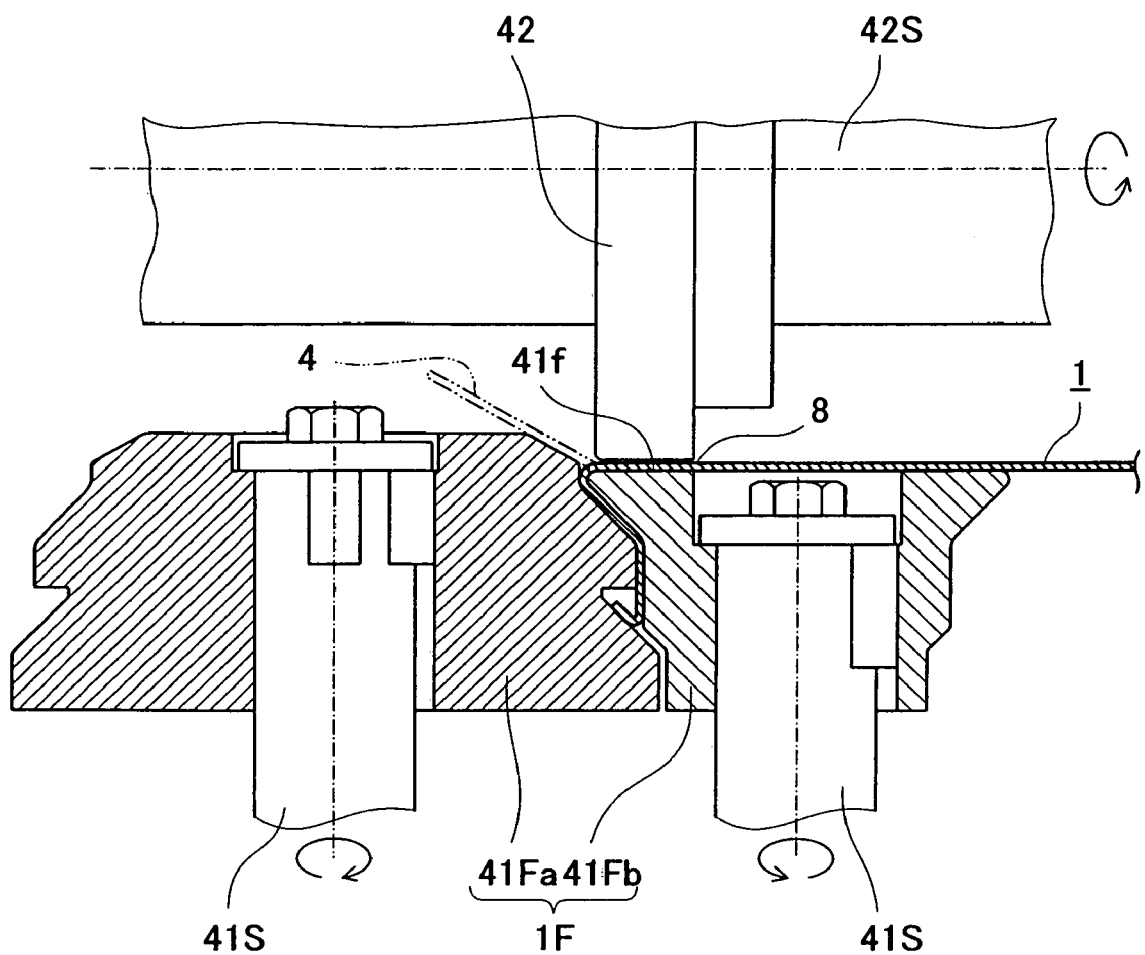
FIG. 33 is a partially enlarged cross-sectional view of a forming roll pair which is disposed next to the forming roll pair of FIG. 32.
Figure 34:
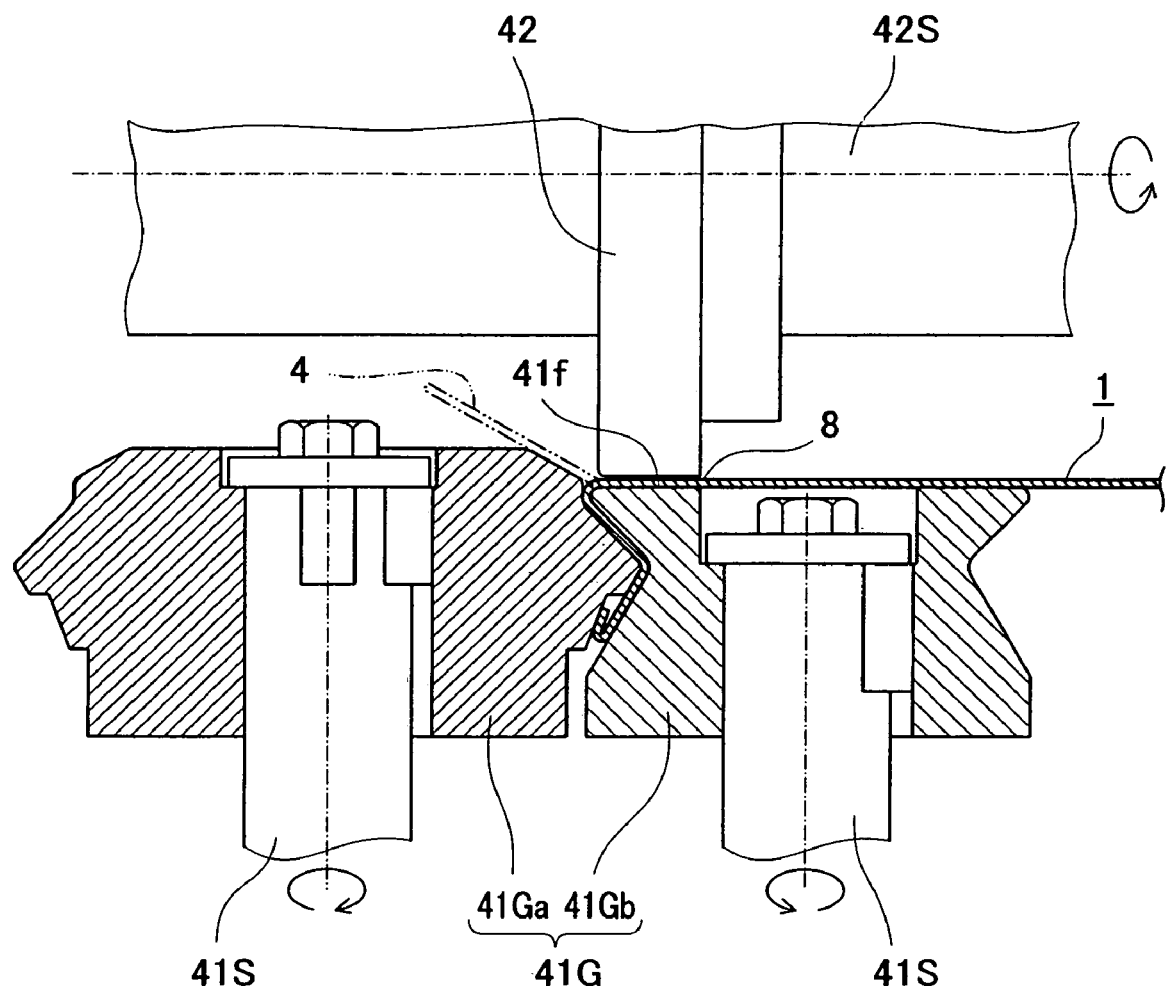
FIG. 34 is a partially enlarged cross-sectional view of a forming roll pair which is disposed next to the forming roll pair of FIG. 33.
Figure 35:
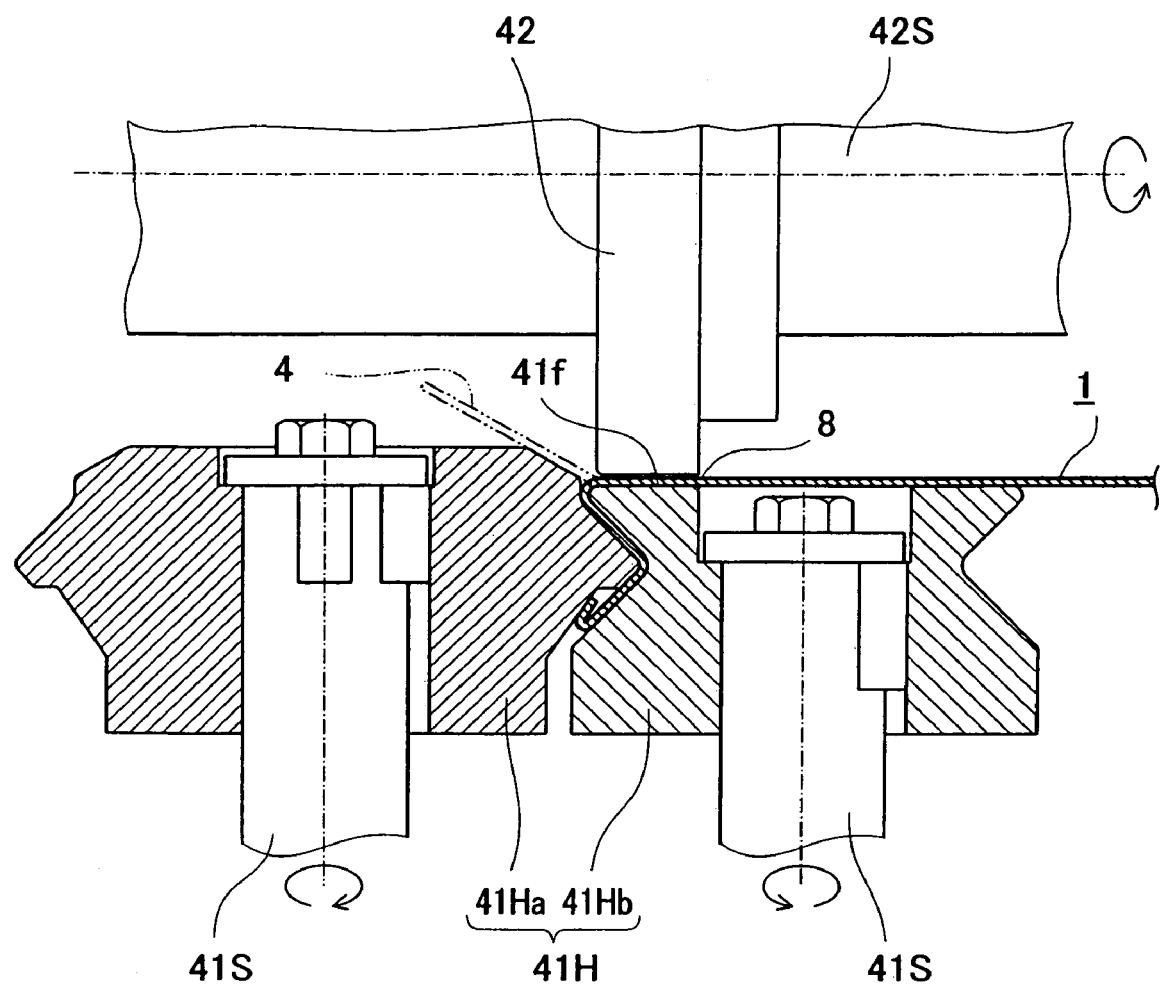
FIG. 35 is a partially enlarged cross-sectional view of a forming roll pair which is disposed next to the forming roll pair of FIG. 34.
Figure 36:
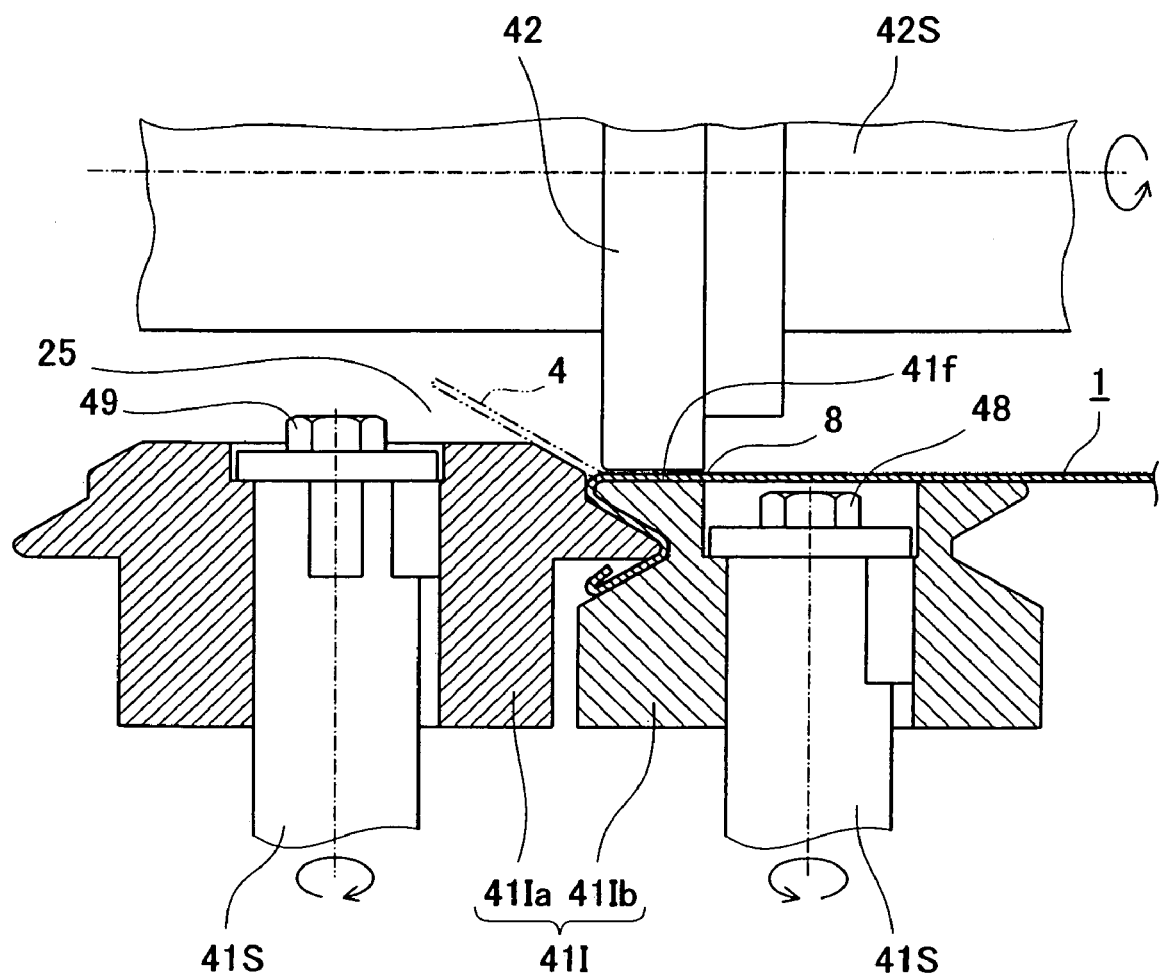
FIG. 36 is a partially enlarged cross-sectional view of a forming roll pair which is disposed next to the forming roll pair of FIG. 35.
Figure 37:
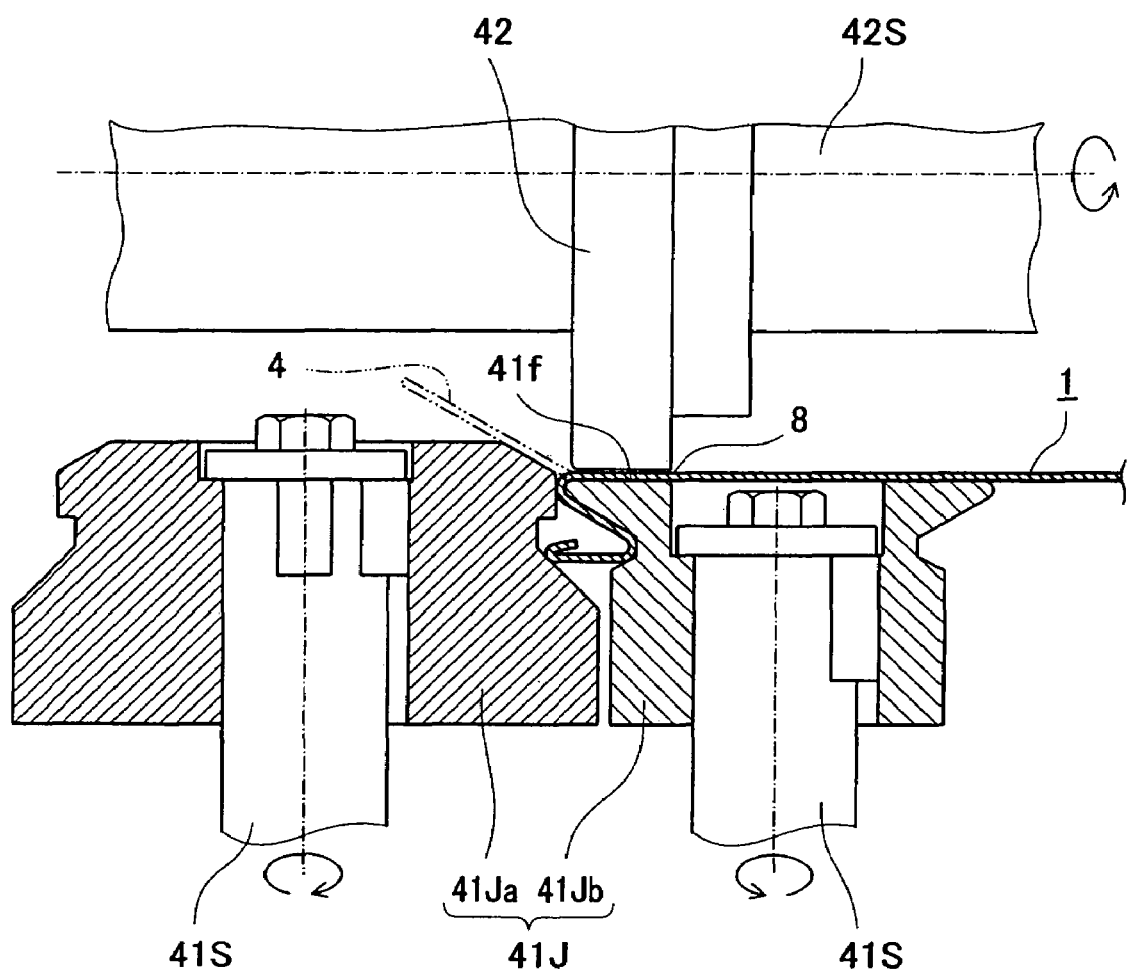
FIG. 37 is a partially enlarged cross-sectional view of a forming roll pair which is disposed next to the forming roll pair of FIG. 36.
Figure 38:
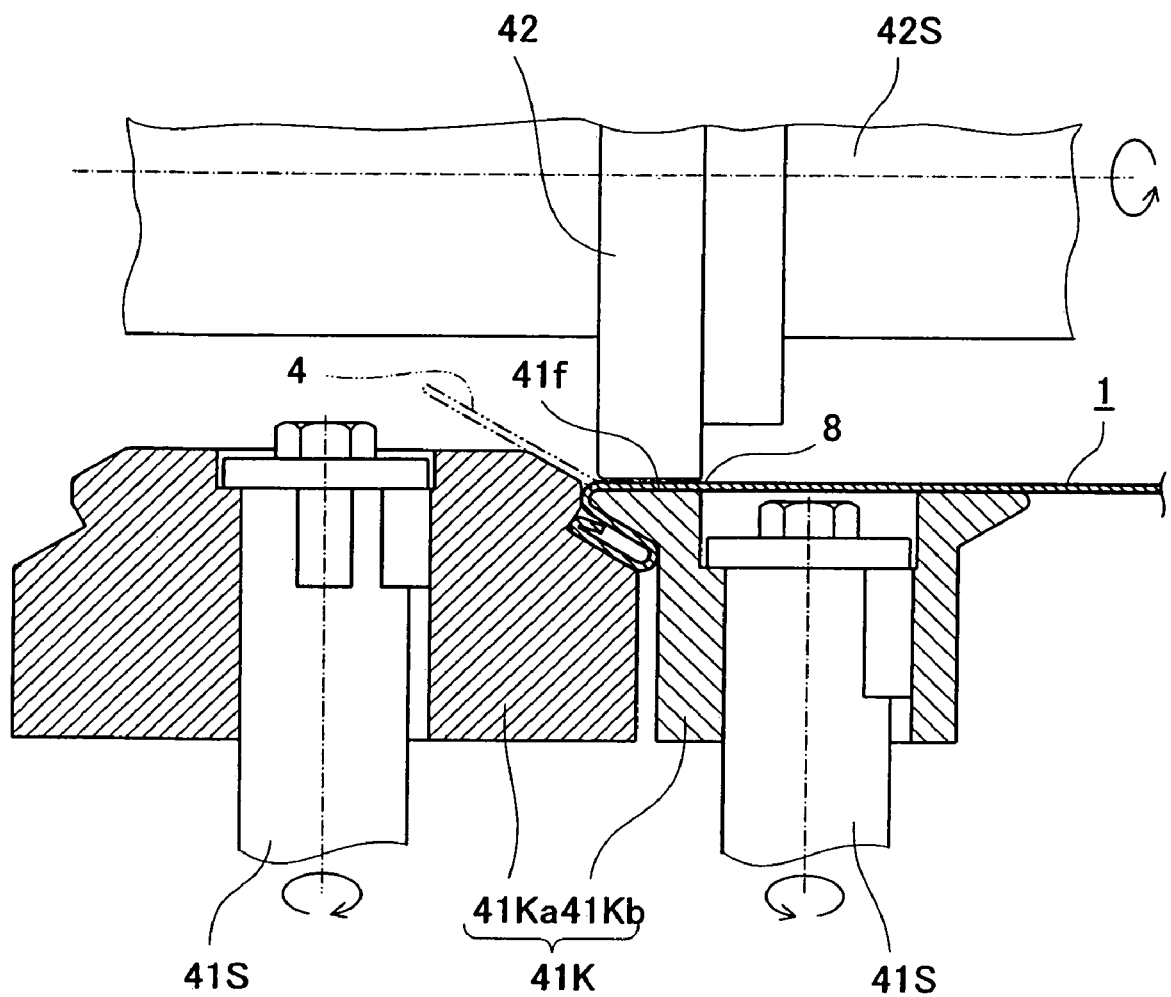
FIG. 38 is a partially enlarged cross-sectional view of a forming roll pair which is disposed next to the forming roll pair of FIG. 37.
Figure 39:
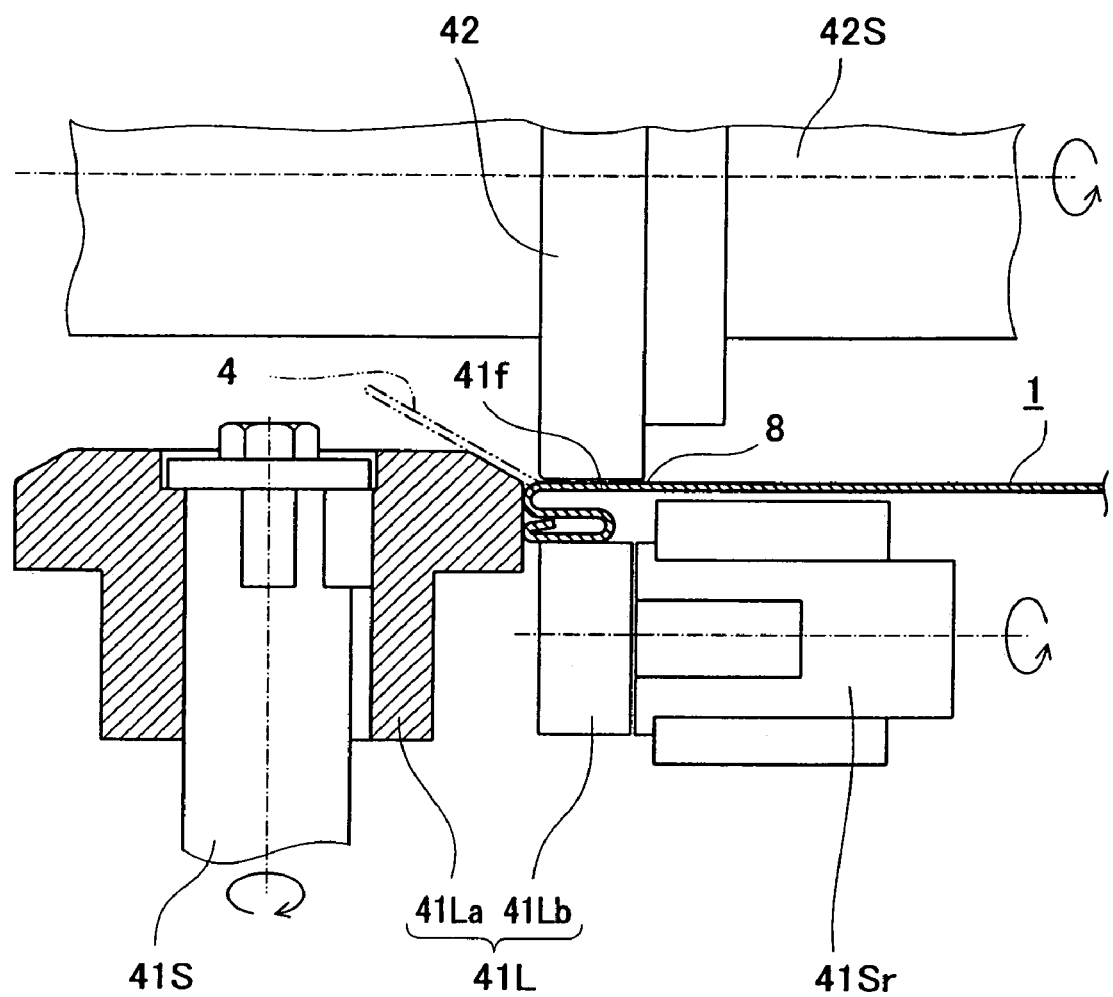
FIG. 39 is a partially enlarged cross-sectional view of a forming roll pair which is disposed next to the forming roll pair of FIG. 38 and performs a final step of the forming process.

In this embodiment, each of the forming roll pairs 41 corresponds to its associated process state as follows: the forming roll pair 41A which is the first process pair and forms the shape of FIG. 41(*a*) is illustrated in FIG. 28, the second forming roll pair 41B which forms the shape of FIG. 41(*b*) is illustrated in FIG. 29, the third forming roll pair 41C which forms the shape of FIG. 41(*c*) is illustrated in FIG. 30, the fourth forming roll pair 41D which forms the shape of FIG. 41(*d*) is illustrated in FIG. 31, the fifth process pair 41E which forms the shape of FIG. 41(*e*) is illustrated in FIG. 32, the sixth process pair 41F which forms the shape of FIG. 41(*f*) is illustrated in FIG. 33, the seventh process pair 41G which forms the shape of FIG. 41(*g*) is illustrated in FIG. 34, the eighth process pair 41H which forms the shape of FIG. 41(*h*) is illustrated in FIG. 35, the ninth process pair 41I which forms the shape of FIG. 41(*i*) is illustrated in FIG. 36, the tenth process pair 41J which forms the shape of FIG. 41(*j*) is illustrated in FIG. 37, the eleventh process pair 41K which forms the shape of FIG. 41(*k*) is illustrated in FIG. 38, and the twelfth process pair 41L which forms the shape of FIG. 41(*l*) is illustrated in FIG. 39.

Figure 25:
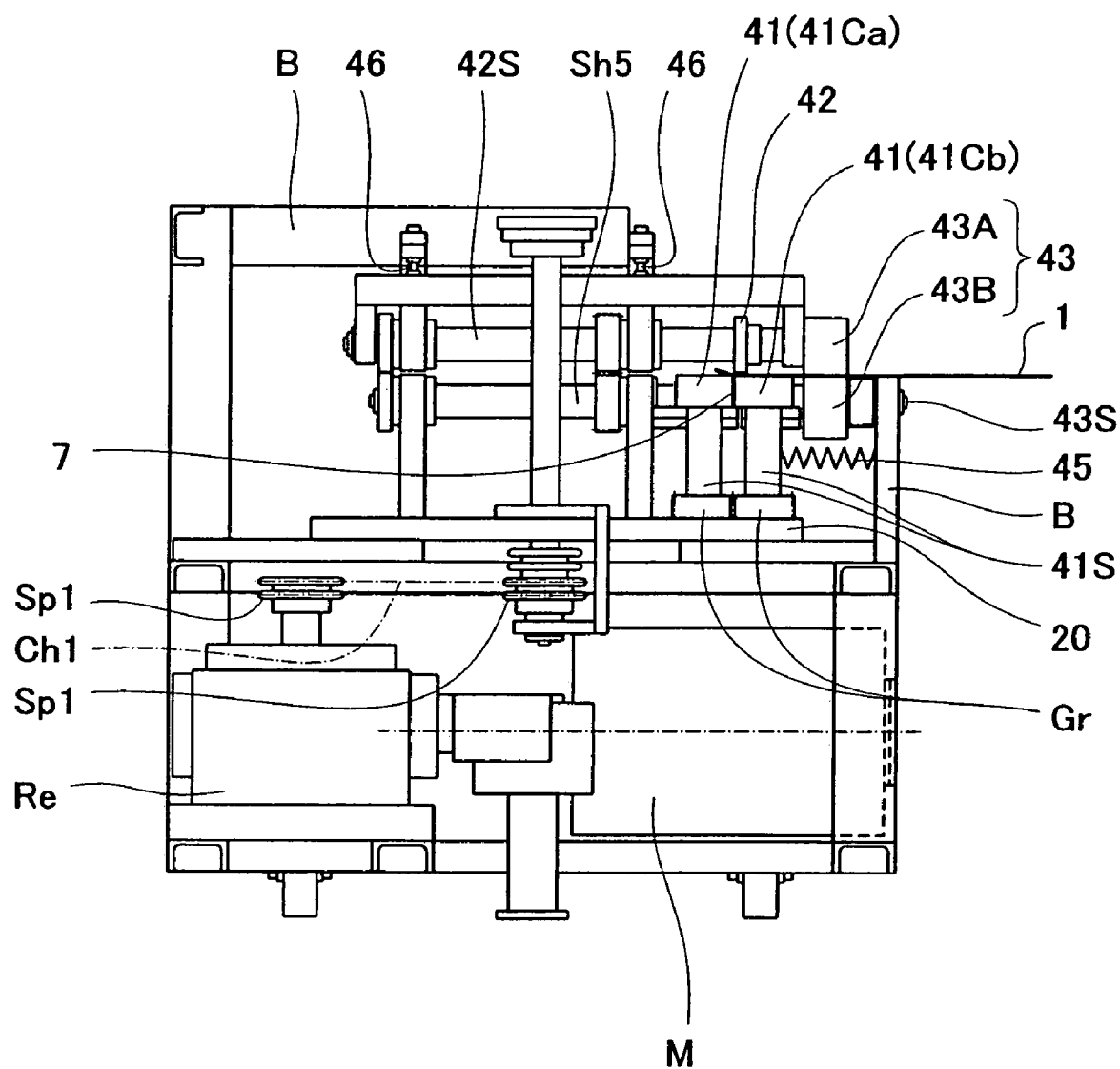
FIG. 25 is a view taken in the direction of arrows substantially along line XXV-XXV in FIG. 22, showing arrangement of the rolls and power transmission.
Figure 40:
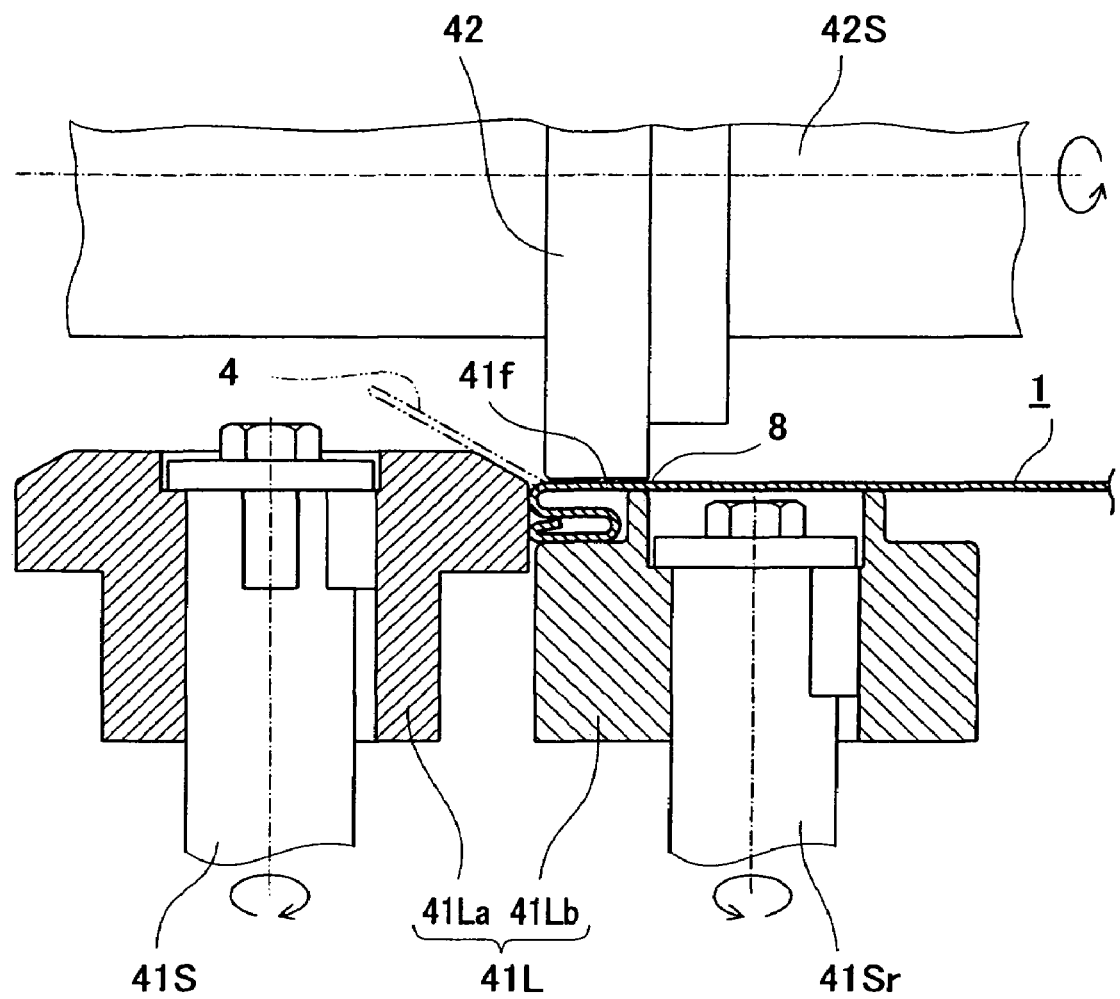
FIG. 40 is a partially enlarged cross-sectional view of a forming roll pair different from that of FIG. 39, which is disposed next to the forming roll pair of FIG. 38 and performs the final step of the forming process.

As shown in FIG. 25, a rotation shaft 41S of each roll of the forming roll pairs 41 (41A to 41K) and a rotation shaft 41S of the forming roll 41La of the forming roll pair 41L are oriented in X-axis direction (vertical direction in FIG. 25) which is perpendicular to the direction (see Z direction in FIG. 21) of the travel of the material, for example, "longitudinal direction" in this embodiment. In addition, in this embodiment, as shown in FIG. 39, only a rotation shaft 41Sr of the forming roll 41Lb of the forming roll pair 41L is oriented in the direction (Y-axis direction of FIG. 22) perpendicular to the rotation shaft 41S, i.e., "horizontally." Nonetheless, as shown in FIG. 40, an upper portion of an outer peripheral portion of the forming roll 41Lb is changed to have a step portion so that the rotation shaft 41Sr is oriented in X-axis direction, for example, "vertical direction" as in the rotation shafts 41S.

FIG. 25 is a view taken in the direction of arrows substantially along line XXV-XXV of FIG. 22, representing the forming roll portion 41C. The forming roll pairs 41, excluding the forming roll pair 41L, have the same construction. As shown in FIG. 25 which illustrates the forming rolls 41Ca and 41Cb and the rotation shafts 41S, the forming rolls (41Aa, 41Ab to 41Ka, 41Kb, 41Ka, and 41La) are provided on upper end portions of the rotation shafts 41S to be rotatable integrally with the rotation shafts 41S (see FIGS. 28 to 39).

As in this embodiment, reference portions (portions having an average rotational speed value of circumferential directions of respective positions of contact faces of the rolls) have a substantially equal diameter. Therefore, the rotation shafts 41S of the rotation rolls of the forming roll pairs 41A to 41K and the rotation roll 41La are driven at an equal speed to rotate at an equal rotation speed (angular speed). The rotation shaft 41Sr is driven such that circumferential speed of an outer peripheral face of the forming roll 41Lb is equal to circumferential speed of an outer peripheral surface of the forming roll 41La.

Press rolls 42 are mounted substantially in contact with upper end surfaces 41*f* of the forming rolls 41Ab to 41Kb with which the wall forming portion 8 of the duct of the plate 1 (1B) shown in FIGS. 28 to 38, among the forming rolls of the forming roll pairs 41 (41A to 41K). In other words, in this embodiment, the forming rolls 42 are mounted for the forming rolls 41Ab to 41Kb which contact the wall forming portion 8 of the duct 10. In addition, the press roll 42 is mounted for the forming roll 41Lb to be spaced apart from the peripheral face of the forming roll 41Lb. The press rolls 42 are set as many as the forming roll pairs 41A to 41L to correspond to the forming roll pairs 41A to 41L. That is, in this embodiment, the number of the press rolls 42 is twelve.

Rotation shafts 42S of the press rolls 42 are driven to rotate at an equal speed such that the circumferential speeds of the outer peripheral faces of the press rolls 42 mounted to the rotation shafts 42S become equal to the circumferential speed of the reference portions of the forming rolls 41Ab to 41Kb. The press roll 42 is provided for the forming roll 41Lb so as to press the seam joint portion 17*f* from above into a predetermined dimension (thickness).

The rotation shafts 42S are disposed to have a crossing angle with respect to the X-axis direction (see arrow X of FIG. 23) and the direction in which the plate is traveled (see arrow Z of FIGS. 22 and 23). In this embodiment, the rotation shafts 42S are disposed to have the crossing angle of 90 degrees and are oriented horizontally (see arrow Y of FIG. 22). In another embodiment, the rotation shafts 41S may be oriented horizontally and the rotation shafts 42S may be oriented in the vertical direction. The rotation shafts 42S may be oriented to cross the rotation shafts 41S at 90 degrees or otherwise other angle (e.g., 60 degrees with respect to the rotation shaft 41S).

Figure 26:
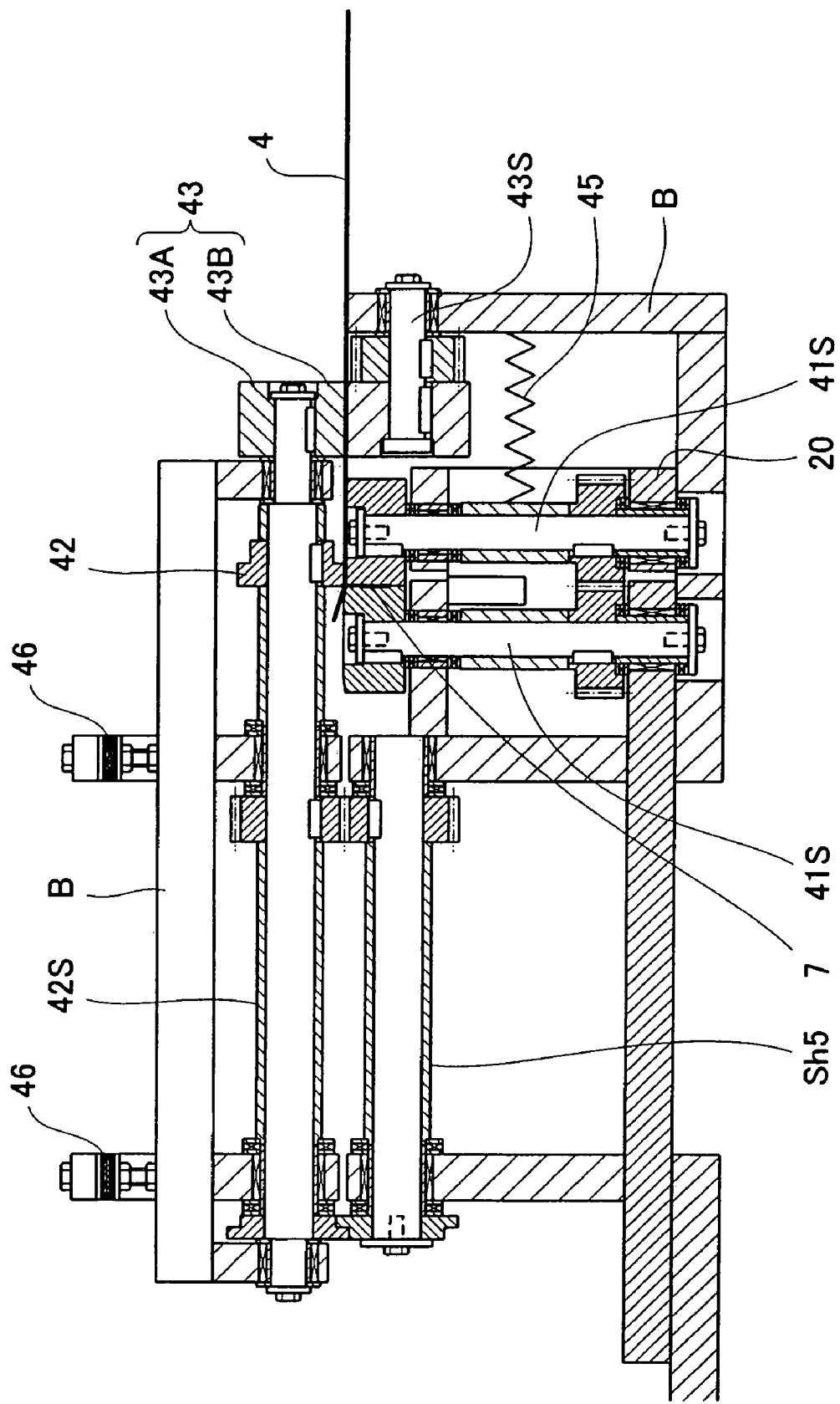
FIG. 26 is an enlarged view of a forming process portion of the plate member in FIG. 25.

As shown in FIGS. 25 and 26, a feed roll 43A is disposed at a portion which is apart in an opposite direction to an end portion of the rotation shaft 42S to which the press roll 42 is attached, i.e., the portion apart from the position where the press roll 42 is in contact with the rotation shaft 42S toward the wall forming portion 8 (outer side: to the right in FIGS. 25 and 26) to form a feed roll pair with the feed roll 43B in the vertical direction. Although not shown, the feed roll pair 43 is disposed to correspond to the forming roll pair 41L.

The feed roll pair 43 is comprised of the feed roll 43A positioned on upper side and the feed roll 43B positioned on the lower side to be opposed to the feed roll 43A such that peripheral faces of these feed rolls 43A and 43B are substantially in contact with each other.

The feed roll 43A is driven by the rotation shaft 42S and the feed roll 43B is driven by the rotation shaft 43S disposed under and in parallel with the rotation shaft 42S. In this embodiment, therefore, the rotation shafts 42S and 43S are oriented horizontally (Y direction).

The feed roll 43A and the feed roll 43B form a drive feed roll pair configured to feed the plate 1 while retaining the plate 1 between outer peripheral faces of the feed rolls 43A and 43B.

The rotation shafts 41S and 43S rotate at an equal rotation speed. Since the feed rolls 43A and 43B have an equal outer diameter, the outer peripheral faces rotate at an equal circumferential speed.

The circumferential speed of the outer peripheral faces of the feed rolls 43A and the roll 43B is configured to be equal to the circumferential speed of the reference portions of the forming rolls 41Ab to 41Kb and the outer peripheral faces of the forming rolls 42. The plate 1 being reliably fed along the process line, is held between the pair of forming rolls 41, between the forming rolls 42 and the forming rolls 41Ab to 41Kb substantially in contact with the press rolls 42, and between the upper and lower feed rolls 43A and 43B.

As shown in FIGS. 25 and 26, a spring 45 (coil spring in this embodiment) is adapted to press one of the forming rolls of the forming roll pairs 41 (41A to 41K), in this embodiment, the forming rolls (41Ab to 41Kb) to cause them to move toward the corresponding opposite forming rolls 41Aa to

41La. In this embodiment, a group of the forming rolls (41Ab to 41Lb) is placed on a movable base 20, and the spring 45 presses the movable base 20 to cause it to move toward the group of the forming rolls (41Aa to 41ka) from a base B.

A spring 46 (plural disc springs in this embodiment) presses the press rolls 42 to cause them to move toward the forming rolls (41Ab to 41Kb), i.e., downward. In addition, the spring 46 press the feed roll 43A to cause the feed roll 43A to be movable toward the feed roll 43B. In this embodiment, the press roll 42 and the feed roll 43A are disposed on the rotation shaft 42S, which is pressed downward by the spring 46 with respect to the base B.

In this construction, even when the plates 1 (1A and 1B) to be formed are different in thickness, they are fed along the process line with the plates 1 surely sandwiched between the rolls without adjusting a clearance between the rolls under an elastic pressure exerted by the springs 45 and 46. As a result, the plates 1 are formed appropriately.

Figure 24:
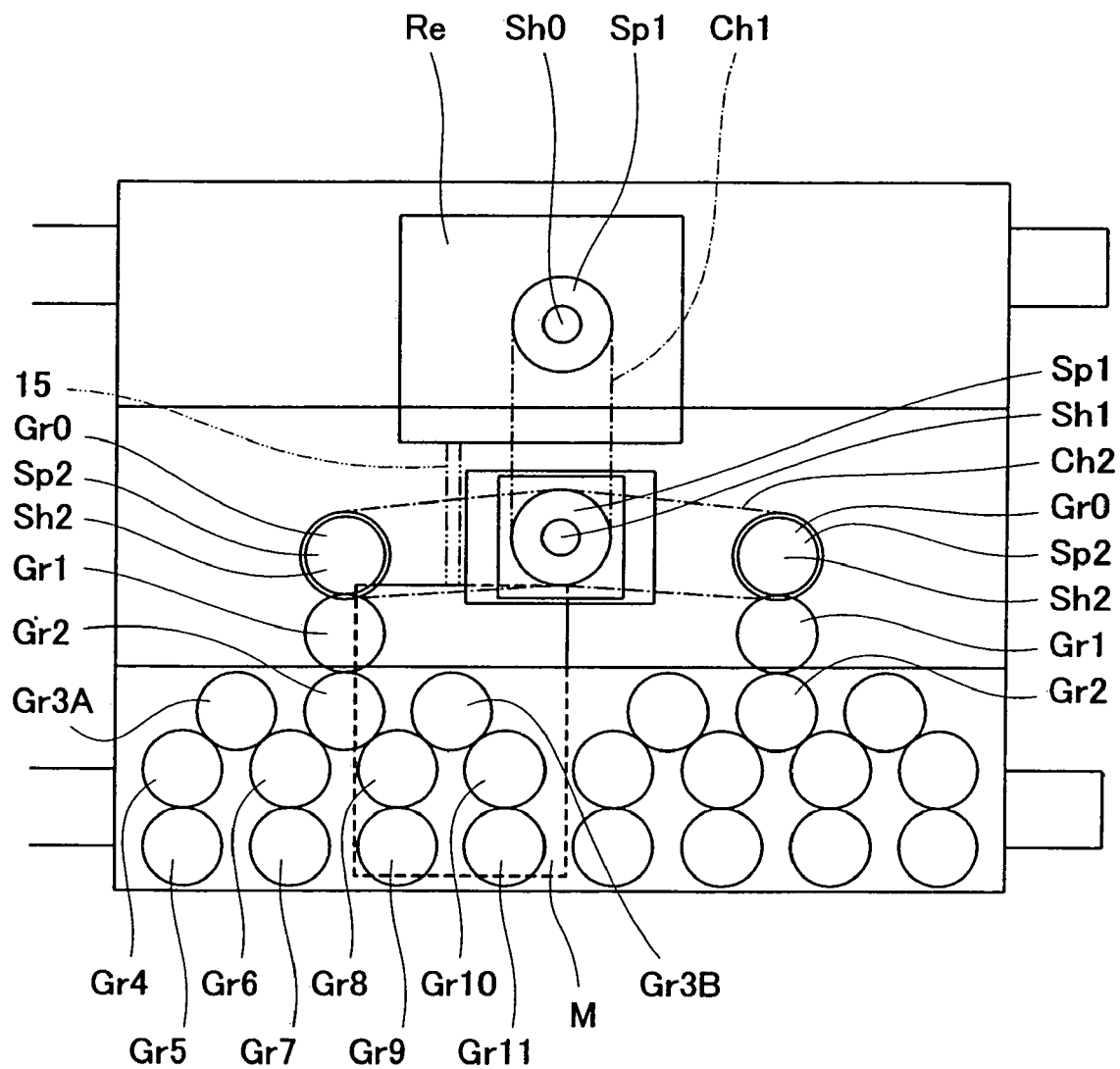
FIG. 24 is a plan view showing a state in which a power is transmitted from an electrically-powered motor to the forming rolls in the seam forming apparatus in FIGS. 22 and 23.

The forming roll pairs 41A to 41L, the press rolls 42, and the feed roll pairs 43 are driven by an electrically-powered motor M in this embodiment. Specifically, as shown in FIG. 24 schematically showing the flow of the driving force, the driving force is transmitted from the electrically-powered motor (driving means) M to a reduction gear Re through a coupling 15, from a rotation shaft Sh0 of the reduction gear Re to a vertically provided intermediate shaft Sh1 through a pair of sprockets Sp1 and a chain Ch1, and from the intermediate shaft Sh1 to second intermediate shafts Sh2 provided on both side through a pair of sprockets Sp2 and a pair of chains Ch2. In this embodiment, the second intermediate shaft Sh2 is provided for each unit having four process pairs and is configured to drive the rolls in each unit. So, when the number of the forming rolls 41 is twelve as in this embodiment, the second intermediate shafts Sh2 are disposed at three positions. However, such a construction should not be interpreted as a limiting, but the driving force can be transmitted in various ways.

Then, the driving force is transmitted from a gear Gr0 mounted on each intermediate shaft Sh2 to a first intermediate gear Gr1 and from the first intermediate gear Gr1 to a second gear Gr2. Thereafter, the driving force is transmitted from the second intermediate gear Gr2 to gears Gr6 and Gr8 mounted on the rotation shafts 41S of the forming rolls 41Ba and 41*ca* (see FIG. 22). Then, the driving force is transmitted from the gear Gr6 (see FIG. 24) mounted on the rotation shaft 41S of the forming roll 41Ba (see FIG. 22) to a gear Gr7 (see FIG. 24) mounted on the forming roll 41Bb (see FIG. 22) and a third intermediate gear Gr3A. Thereafter, the driving force is transmitted from the third intermediate gear Gr3A to a gear Gr4 mounted on the rotation shaft 41S of the forming roll 41Aa (see FIG. 22). Then, the driving force is transmitted from the gear Gr4 mounted on the rotation shaft 41S of the forming roll 41Aa (see FIG. 22) to a gear Gr5 mounted on the rotation shaft 41S of the forming roll 41Ab (see FIG. 22).

Meanwhile, the driving force is transmitted from a gear Gr8 mounted on the rotation shaft 41S of the forming roll 41Ca (see FIG. 22) to a gear Gr9 mounted on the rotation shaft 41S of the forming roll 41Cb (see FIG. 22) and a fourth intermediate gear Gr3B. Thereafter, the driving force is transmitted from the fourth intermediate gear Gr3B to a gear Gr10 mounted on the rotation shaft 41S of the forming roll 41Da (see FIG. 22). Then, the driving force is transmitted from a gear Gr10 mounted on the rotation shaft 41S of the forming roll 41Da (see FIG. 22) to a gear Gr11 mounted on the forming roll 41Db (see FIG. 22).

Likewise, the driving force is transmitted to the forming roll pairs 41E to 41H (see FIG. 22) which is a right half portion corresponding to a second unit in FIG. 24. So, when twelve forming roll pairs are provided, the driving force is transmitted to the forming rolls 41I to 41K and 41La corresponding to a third unit, which is not shown in FIG. 22. The forming roll 41Lb is disposed coaxially with the feed roll 43B and is driven integrally with the feed roll 43B to be described later.

Figure 27:
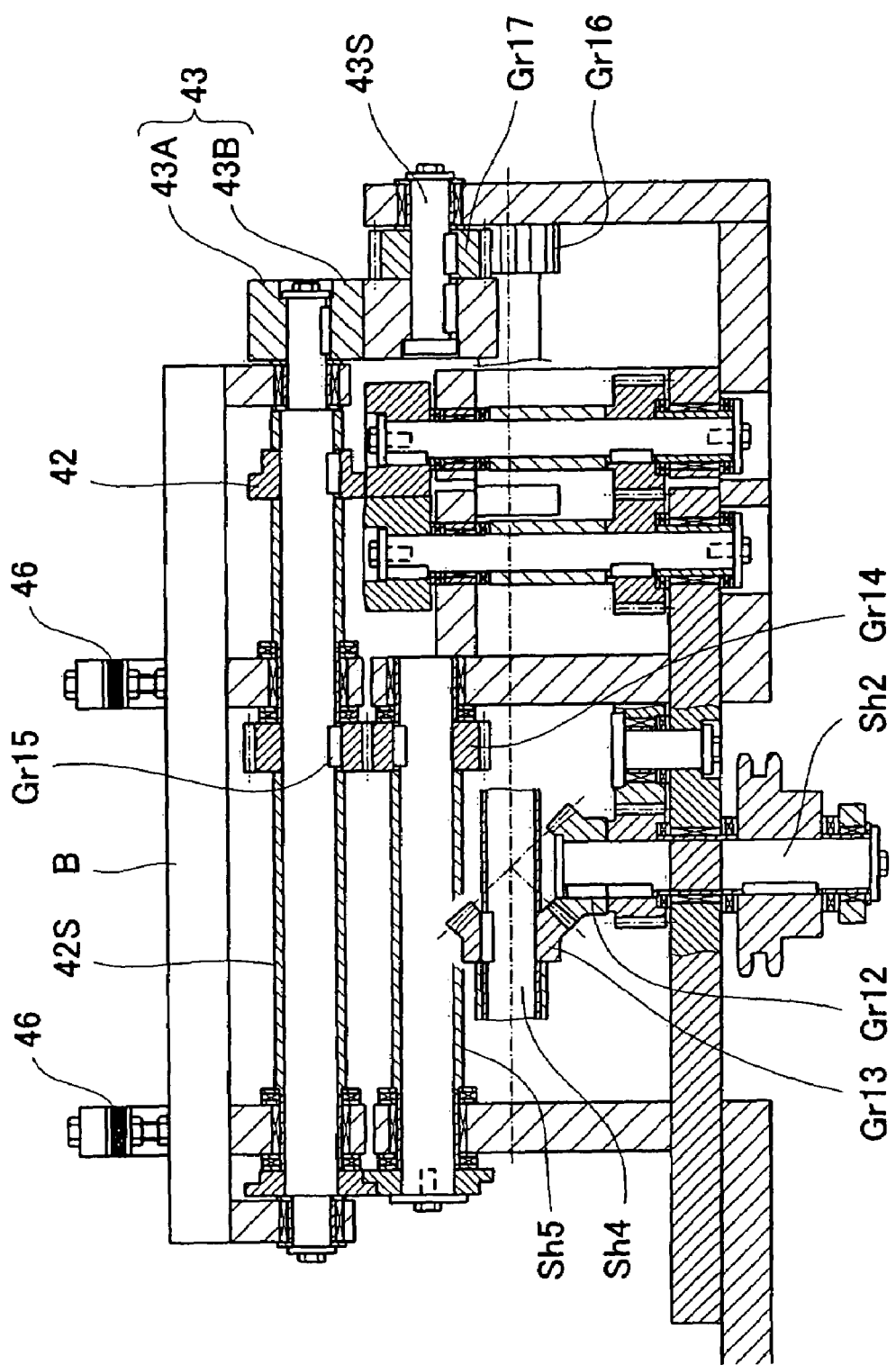
FIG. 27 is a cross-sectional view of a portion different from that of FIG. 25, showing power transmission.

The driving force is transmitted from the reduction gear Re side to the press roll 42 and the feed rolls 43A and 43B which are different from the forming roll pairs 41 in orientation of the rotation shafts 42S and 43S as described below. As shown in FIG. 27, the driving force from the reduction gear Re side, is transmitted through the second intermediate shaft Sh2 and a pair of bevel gears Gr12 and Gr13, to an intermediate shaft Sh4 provided thereabove to be oriented horizontally. Then, the driving force is transmitted from the intermediate shaft Sh4 to an intermediate shaft Sh5 located thereabove through a pair of gears (only gear mounted on the intermediate shaft Sh5 side is shown), and from the intermediate shaft Sh5 to the rotation shaft 42S located thereabove through a pair of gears Gr14 and Gr15. As a result, the press roll 42 and the feed roll 43A which are fixed on the rotation shaft 42S to be spaced apart from each other are driven.

The feed roll 43B is driven by the force transmitted through a gear pair comprising a gear Gr16 mounted on a side end (right end in FIG. 27) of the intermediate shaft Sh4 and a gear Gr17 which is mounted on the rotation shaft 43S located above and is configured to mesh with the gear Gr16. The intermediate shaft Sh4 is provided for each unit. The driving force is transmitted from the rotation shaft 43S provided with the gear Gr17 to its adjacent rotation shaft 43S through an intermediate shaft (not shown) extending in parallel with the rotation shaft 43S and provided with a gear, and a gear mounted on the rotation shaft 43S and driven in mesh with the gear.

It shall be appreciated that, in FIG. 27, one end portion (left end portion in FIG. 27) and an intermediate portion of the intermediate shaft Sh4 are omitted for the sake of convenience to represent the rotation shafts 41S to which the forming roll pairs 41 are attached.

As shown in FIGS. 28 to 39, in this embodiment, upper end faces of the rotation shafts 41S corresponding to the forming rolls 41Ab to 41Lb are configured be lower than upper end faces of the forming rolls 41Ab to 41Lb. In particular, a top portion of the head of the bolt 48 mounted on each of the upper end faces of the rotation shafts 41*s* is configured to be lower than the upper end faces of the forming rolls 41Ab to 41Lb. In addition, in this embodiment, the upper end faces of the rotation shafts 41S of the forming rolls 41Aa to 41La are configured to be lower than the upper end faces of the forming rolls 41Aa to 41La. A head of the bolt 49 mounted on each of the upper end faces of the forming rolls 41Aa to 41*la* is configured not to protrude greatly from the upper end face of each of the forming rolls 41Aa to 41*la*. Non-forming process regions 25 are formed above the forming rolls 41Aa to 41La so that the corner forming portion 4 of the plate 1 which become the corner portion 24 does not contact the rolls. The non-forming process regions 25 form a continuous space in the direction in which the plate 1 is traveled.

In this embodiment, the forming roll 41Ea of FIG. 32 is biased to move downward together with the rotation shaft 41S by a spring 45*a* from the state in FIG. 32 by a very small dimension. When the plate 1 with a small thickness is formed, the forming roll 41Ea moves downward relative to the opposite forming roll 41Eb to allow the side end 1*e* of the side end portion 1E of the plate 1 and its vicinity to be surely sandwiched between the forming roll pairs 41E and to be surely bent at a desired angle (90 degrees in this embodiment), regardless of the variation in the thickness of the plate 1. The forming process plays an important roll to surely engage a protrusion 101*e* of the male seam joint portion 17 shown in FIG. 48(*d*).

The seam forming machine according to this embodiment constructed above is capable of forming the plate member of the cornerplate-less duct or the like as described below. Hereinbelow, an example of a forming process of the plate member 11 (11A or 11B) of the duct comprising the female seam joint portions at both ends and having a button punch type seam joint structure will be described.

Figure 44:
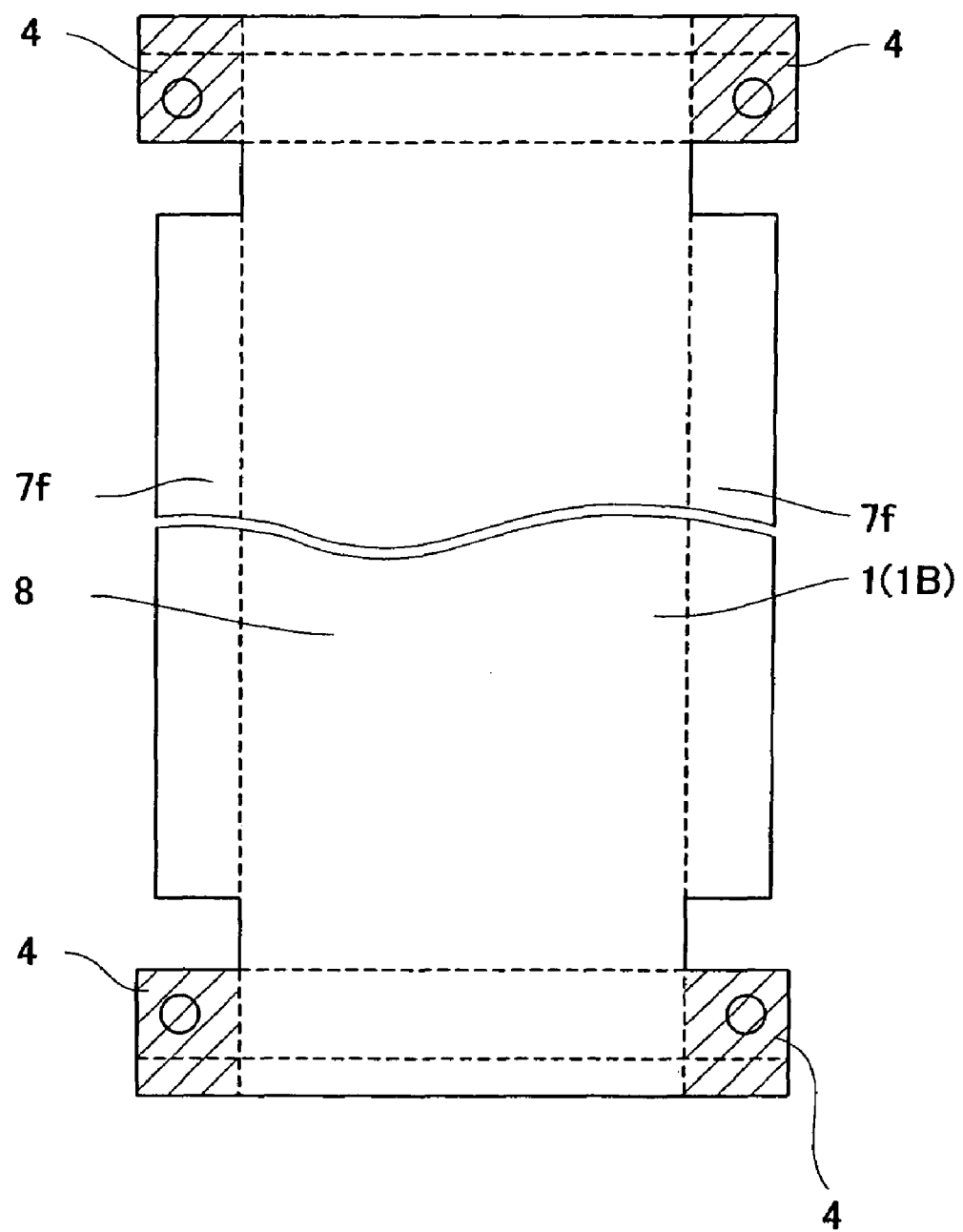
FIG. 44 is a view showing a planar shape of the plate to be formed into the plate member having the female seam joint portions at the side end portions of FIGS. 42 and 43.

As shown in FIG. 44, the plate 1 formed by superposing plural plates (two plates in this embodiment) and cutting them to form a predetermined shape and dimension using a plasma cutter is inserted from an insertion end of the seam forming apparatus of FIG. 22, i.e., left end of FIG. 22 such that the seam forming portion 7 and the corner forming portion 4 are located on the forming roll pairs 41 side as indicated by an arrow R. When the plate 1 is formed into the plate member for the cornerplate-less duct, the corner forming portions 4 (see FIGS. 44 and 46) are bent upward by a predetermined angle in advance (see reference numeral "32" of FIG. 46(*b*)). Specifically, in this embodiment, the corner forming portions 4 are bent by approximately 30 to 40 degrees.

Under this condition, the seam forming apparatus is, as shown in FIGS. 25 and 26, configured such that the seam forming portion 7 of the plate 1 which is to be processed is sandwiched from right and left to be processed by the forming roll pair 41A, sandwiched in the vertical direction between an end face (upper end face) 41*f* (see FIG. 28) of the forming roll 41Ab of the forming roll pair with which the wall forming portion 8 of the duct 10 makes contact and the press roll 42 substantially in contact with the end face 41*f*, and sandwiched in the vertical direction between the pair of feed rolls 43 (upper and lower feed rolls 43A and 43B) which are spaced apart from the press rolls 42 in the direction from the portion of the plate 1 which is being processed (seam forming portion 7) toward the wall forming portion 8 of the duct 10 (to the right in FIG. 28). In this manner, the plate 1 is fed to an inside of the apparatus.

In this manner, since the plate 1 is sandwiched between the pair of rolls at three different positions and from different directions, and is fed by the rotation of the rolls at the same circumferential speed, it is stably fed into an inside of the seam forming apparatus along the process line (the direction in which the plate 1 is traveled). Since the plate 1 is pressed elastically by the springs 45 and 46 with the plate 1 sandwiched between the rolls, it is surely and properly sandwiched, regardless of the plate thickness of the plate 1.

Thus, the plate 1 is sequentially formed as shown in FIGS. 28 to 39 while being fed to the forming roll pairs 41B, 41C, 41D, . . . , 41L provided on far side of the seam forming apparatus.

During this forming process, the corner forming portions 4 smoothly pass through the non-forming process region 25 (see FIG. 28) which is a continuous space toward the inside along the process line above the forming rolls (41Ab, 41Bb, 41Cb, . . . ) which are opposite to the forming rolls (41Aa, 41Ba, 41Ca, . . . ) with which the wall forming portions 8 make contact.

Figure 41:
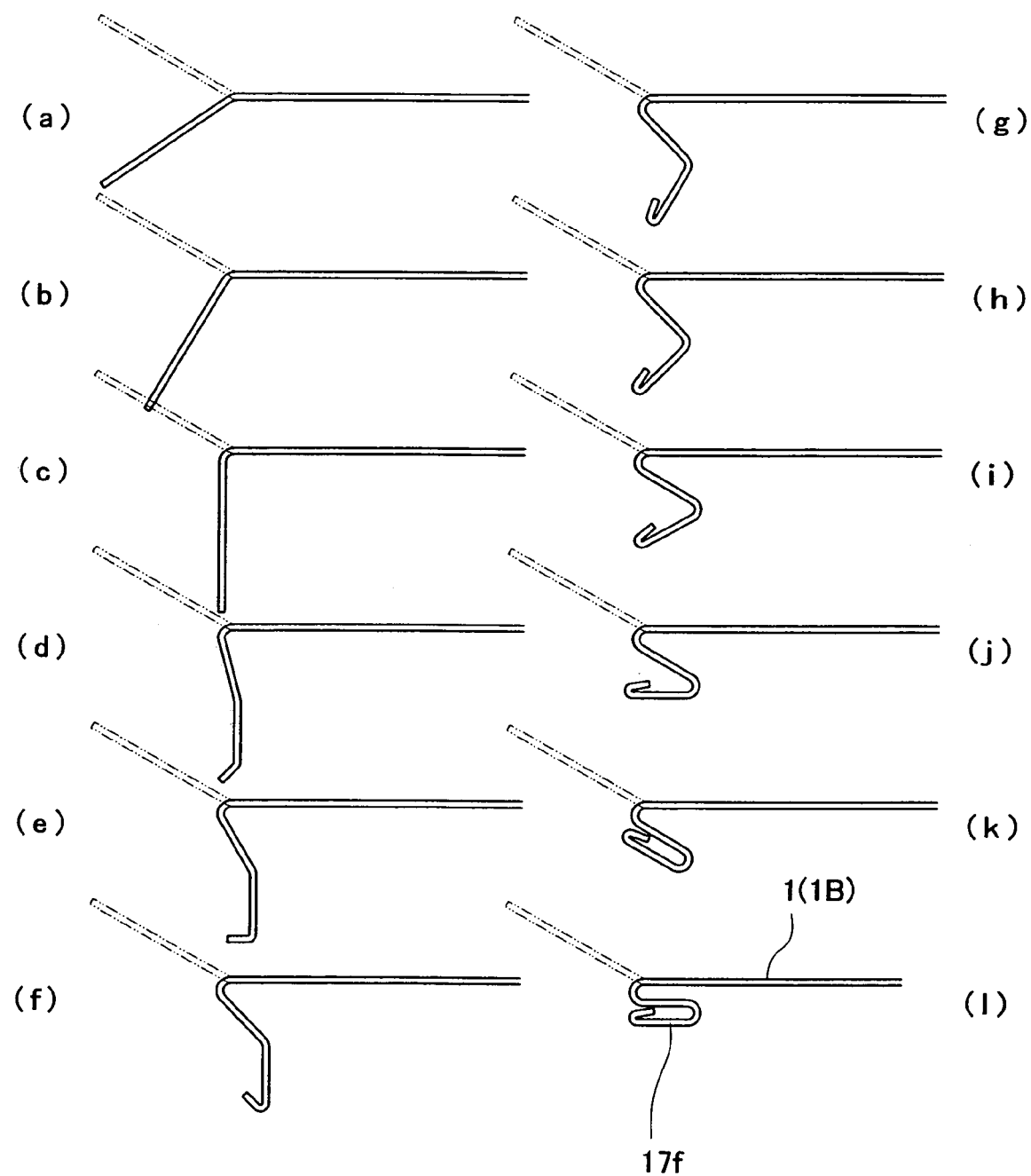
FIGS. 41(a) to 41(l) are views showing a forming process to form the male seam joint portion at one side end portion so as to correspond to the forming roll pairs.

When the plate 1 have passed through the forming roll pairs 41A to 41L shown in FIGS. 28 to 39, a female seam joint portion 17*f* having grooves is formed on one side end portion of the plate 1 (1B) as shown in FIG. 41(*l*). The plate 1 is entirely formed into the shape shown in FIG. 46(*c*).

In the same manner, a seam forming portion 7*f* located on a side end portion on the opposite side of the plate 1 is formed into the female seam joint portion 17*f*. The plate 1 is entirely formed into the shape of shown in FIG. 46(*d*).

Figure 46:
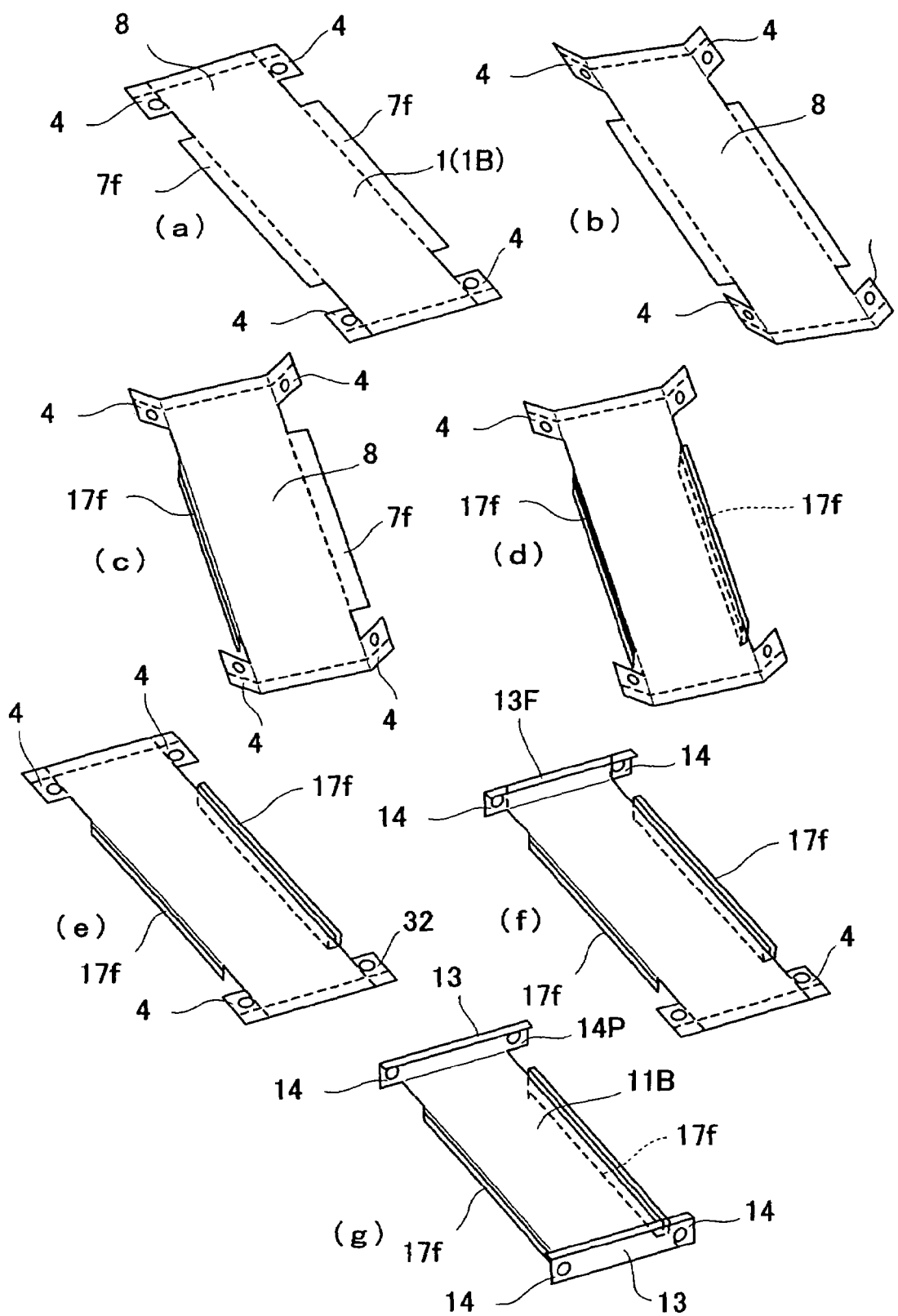
FIGS. 46(a) to 46(g) are perspective views showing time-series forming steps to form the plate in FIG. 44 into the plate member having the female seam joint portions at the side end portions and the corner forming portions and flange portions at the starting and terminal ends.

After the seam forming portions 17*f* have been formed on both side ends of the plate 1 as described above, the corner forming portions 4 are returned from the bent state to original state (flat state) as shown in FIG. 46(*d*) and FIG. 46(*e*).

With the corner forming portions 4 being flat, flange portions 13 having corner portions 14 are formed on front and rear end portions of the plate 1 (see FIGS. 46(*f*) and (*g*)).

Figure 42:
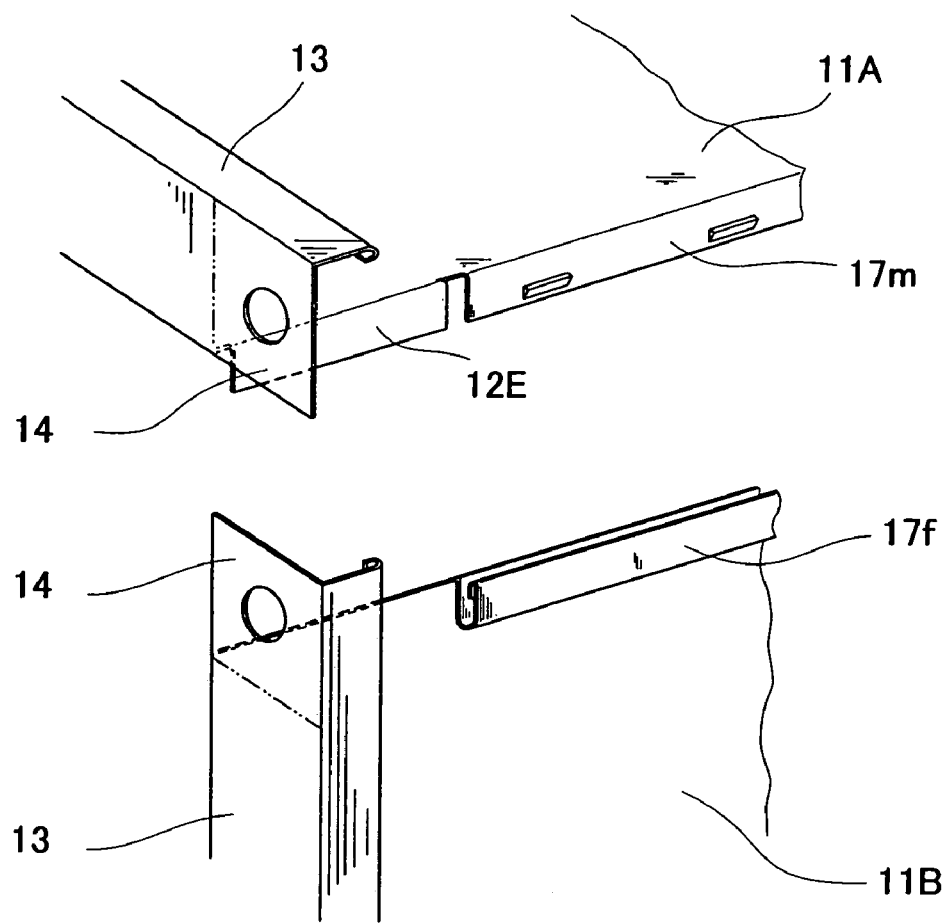
FIG. 42 is a perspective view showing a state just before the male seam joint portion of the plate member having the corner portions at starting and terminal ends and the male seam joint portions at both side ends is joined to the female seam joint portion of the plate member having the corner portions at the starting and terminal ends and the female seam joint portions at both side ends.
Figure 43:
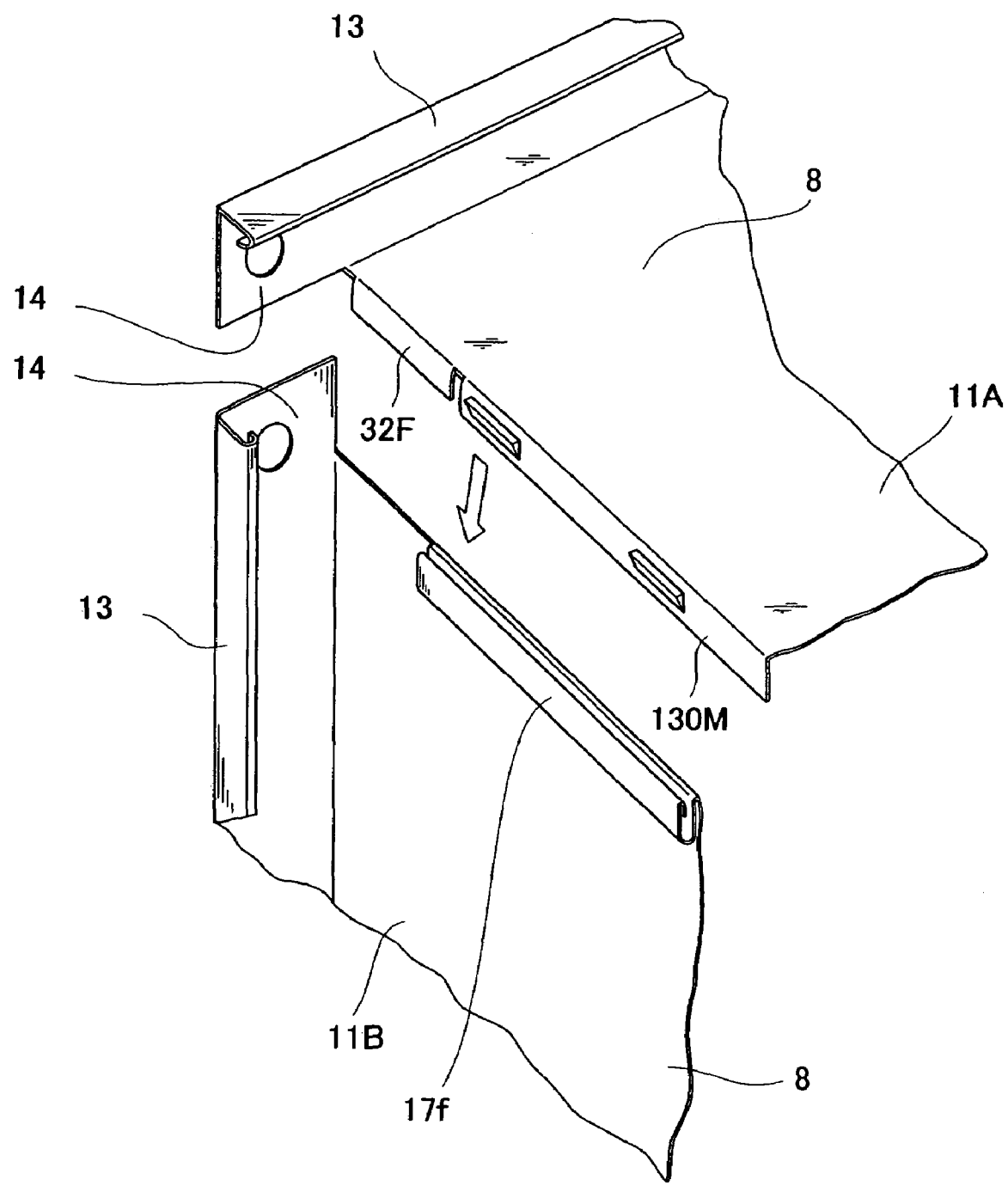
FIG. 43 is a perspective view showing a state in which the male seam joint portion of one plate member is going to be joined to the female seam joint portion of another plate member, as seen from a perspective different from that of FIG. 42.

As a result, as shown in FIG. 46(*g*) or as shown in FIG. 42 or 43 showing enlarged main parts, the plate member 11B which is provided with the female seam joint portions 17*f* on both side ends thereof and the flange portions 13 having the corner portions 14 on front and rear ends thereof is completed.

Figure 47:
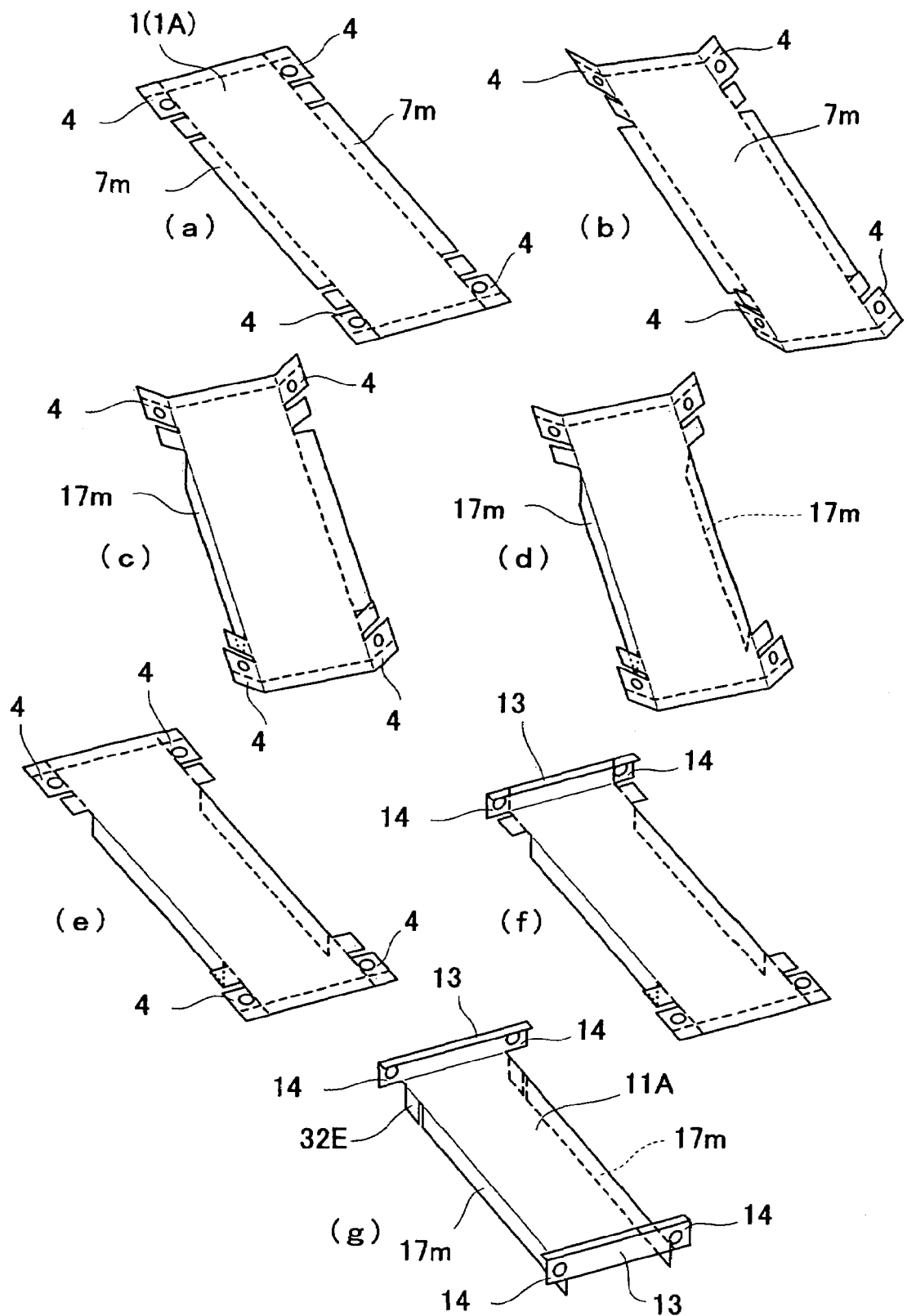
FIGS. 47(a) to 47(g) are perspective views showing time-series forming steps to form the plate in FIG. 45 into the plate member having the female seam joint portions at the side end portions and the corner forming portions and the flange portions at the starting and terminal ends.

Using another seam forming apparatus comprising a group of forming rolls with a different shape, another plate member 11A (see FIG. 47(*g*)) is formed in such a manner that male seam joint portions 17*m* are formed on both side end portions by bending, by approximately 90 degrees, seam forming portions 7*m* at both side end portions of the plate 1(1A) shown in FIG. 47(*a*).

This seam forming apparatus may comprise only the forming roll pairs 41A to 41C, among the forming roll pairs 41A to 41L of the seam forming apparatus shown in FIGS. 22 to 40, and a pair of right and left punch forming rolls 41M (see FIG. 49) which punch the male seam joint portions 17*m*.

In this seam forming apparatus, the forming roll pairs 41A to 41C are driven such that the rotation shafts are oriented in X-direction, drive press rolls are disposed substantially in contact with end faces of the forming rolls in contact with the wall forming portion 8 of the duct 10 of the plate 1 so as to form a crossing angle (90 degrees in this embodiment) with respect to the direction in which the plate 1 is traveled (see the direction indicated by an arrow Z of FIG. 22) and with respect to X-axis direction, and drive feed rolls are disposed to be apart from the drive press rolls and are configured to feed the plate 1 along the process line with the plate 1 sandwiched from both sides between the rolls. This construction is identical to that of the seam forming apparatus shown in FIGS. 22 to 40, and therefore will not be further described.

Figure 49:
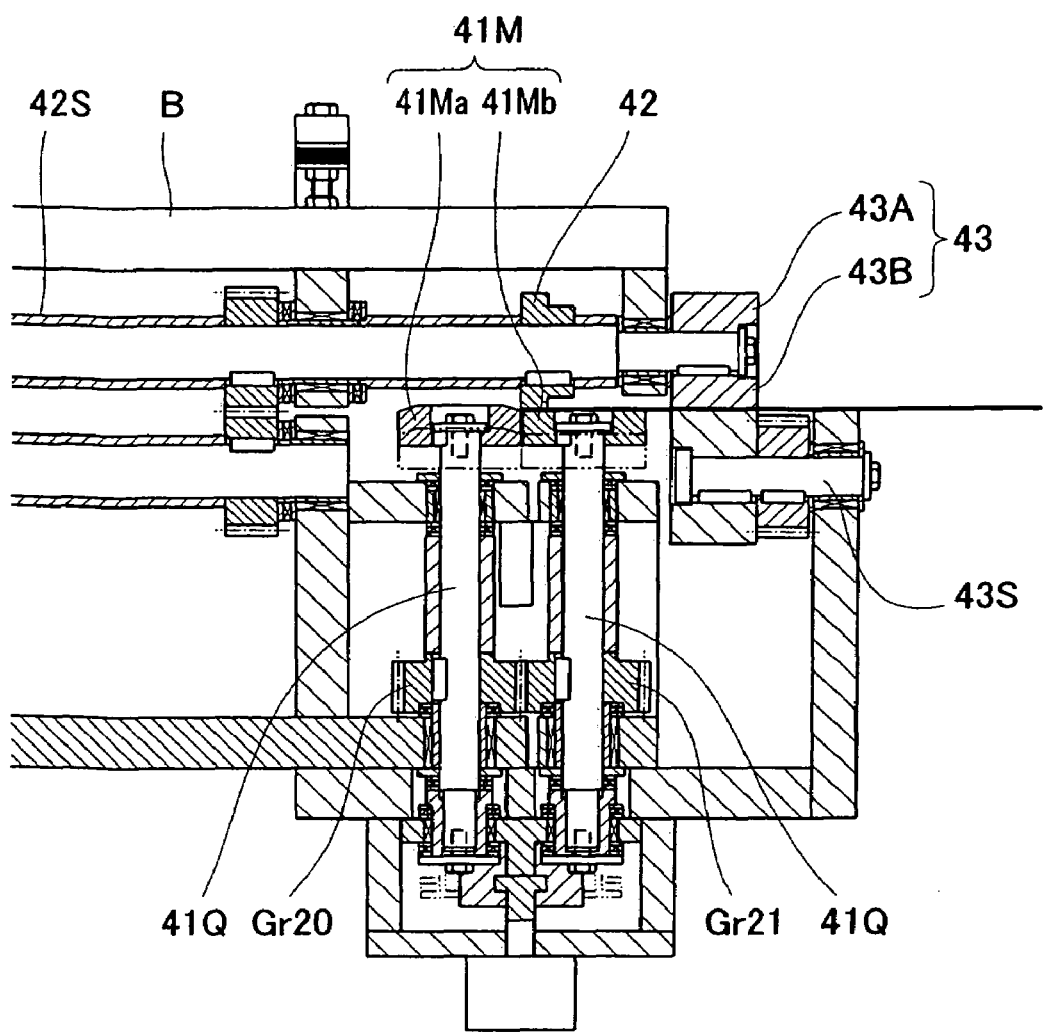
FIG. 49 is a partially enlarged view showing a construction of a punching roll pair for forming an engagement protrusion in the male seam joint portion.

The pair of right and left punch forming rolls 41M will be described with reference to FIG. 49. The pair of punch forming rolls 41M have rotation shafts 41Q which are included in the rotation shafts 41S (or on its extended line in the direction in which the plate 1 is traveled) of the arranged forming roll pairs 41 and are driven by a gear mechanism as in the rotation shafts 41S (see FIG. 22) or the rotation shafts 43S (see FIG. 22). Herein, therefore, a drive mechanism will not be further described.

The rotation shaft 41Q is spline-coupled to a gear Gr20 (or gear Gr21) for driving the rotation shafts 41Q such that the rotation shaft 41Q is movable in the axial direction (vertical direction) of the rotation shaft 41Q and is rotatable integrally with the gear Gr20.

The rotation shafts 41Q of the punch forming roll pair 41M are coupled through a bracket 21 to a cylinder rod 22*a* of a pneumatic cylinder 22, and are set at predetermined forming positions by an extension operation of the cylinder rod 22*a*. The predetermined forming positions are determined such that rolls 41Ma and 41Mb of the roll pair 41M are at the same positions in the vertical direction as the forming rolls of the forming roll pairs 41A to 41K. At the predetermined positions, the roll pair 41M can perform a punch process to form engagement protrusions 101e (see FIG. 48) in the male seam joint portion 17m of the plate member 11A.

When the pneumatic cylinder 22 contracts, the rolls 41Ma and 41Mb move downward to be lower than the predetermined forming positions. At this position, the roll pairs 41M are positioned (retracted) under the location along which the male seam joint portion 17m is traveled, and hence does not perform the punch process.

In this embodiment, the contraction of the cylinder rod 22a of the pneumatic cylinder 22 is easily completed by operating a setting button (not shown) for the punch process.

Figure 45:
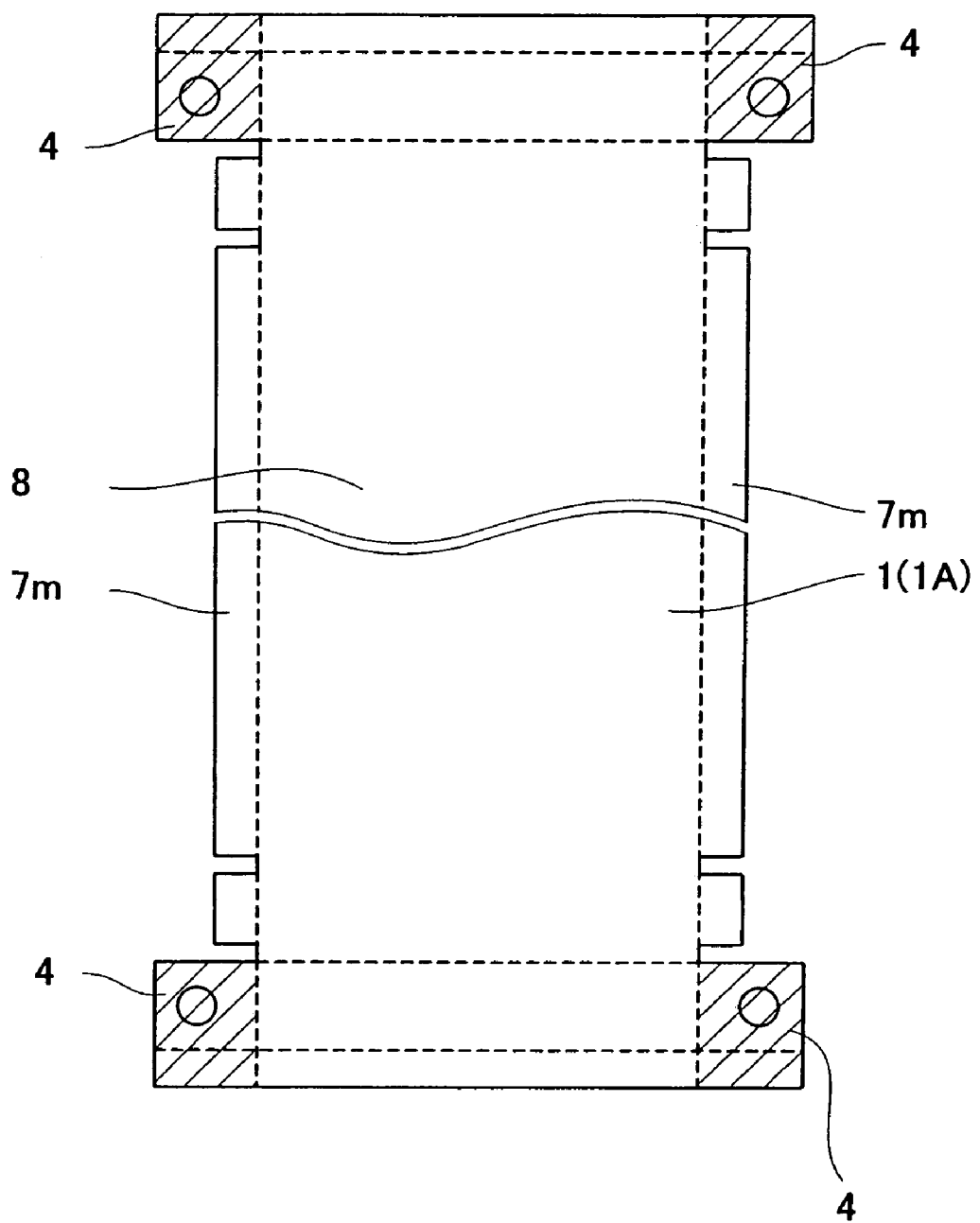
FIG. 45 is a view showing a planar shape of the plate to be formed into the plate member having the male seam joint portions at the side end portions of FIGS. 42 and 43.
Figure 48:
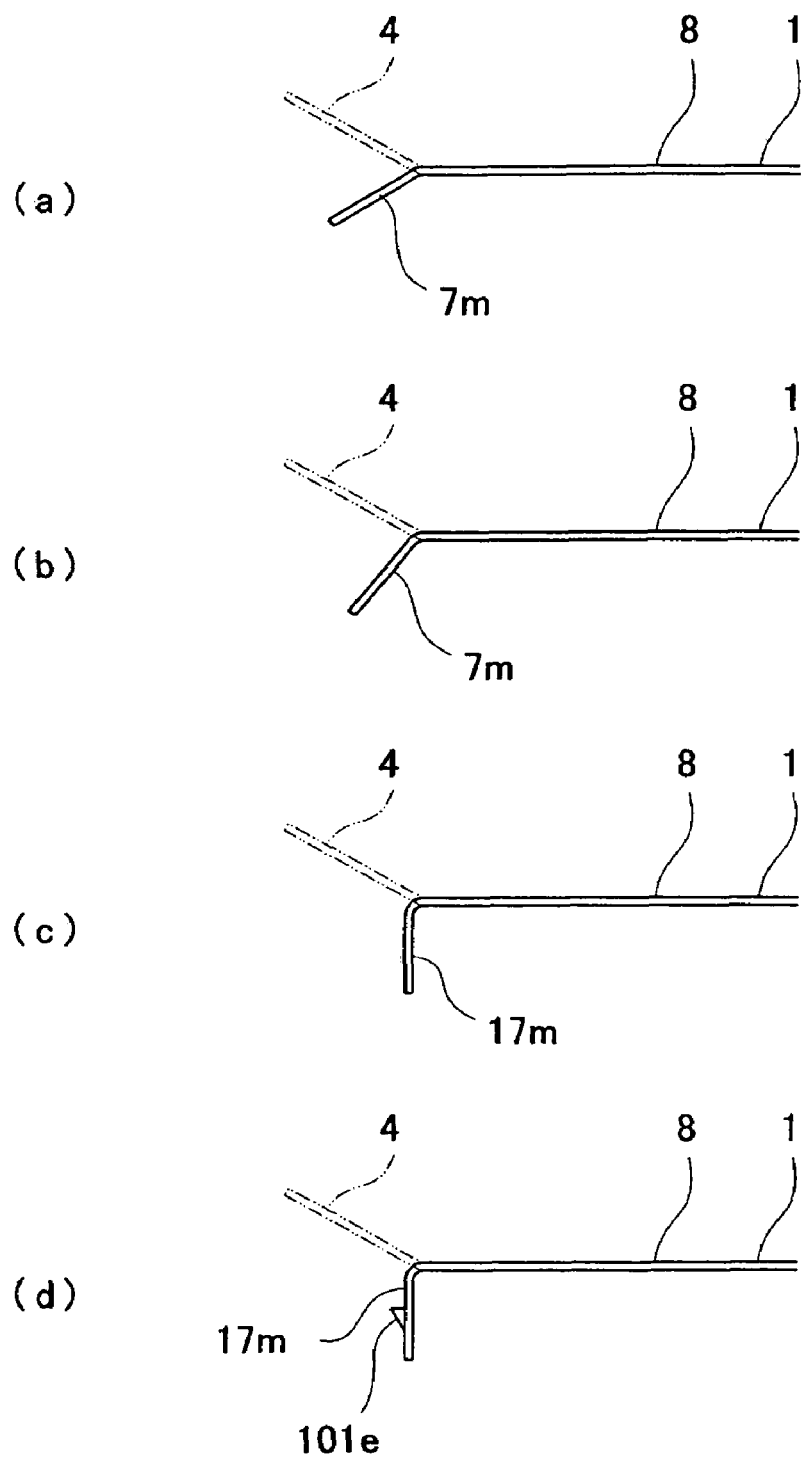
FIGS. 48(a) to 48(d) are views showing the forming process for forming the male seam joint portion at one side end portion so as to correspond to the forming roll pairs.

In accordance with the seam forming apparatus constructed as described above, the plate member 11A of FIG. 47(g), which has the male seam joint portions 17m on both side ends and the flange portions 13 at the starting end 1s and the terminal end 1e is formed from the plate 1 shown in FIGS. 45 and 47(a), and is stably fed along the process line and is subjected to a series of forming processes as in the seam forming apparatus of FIGS. 22 to 40. The process performed using the forming roll pairs 41 and the roll pair 41M is as shown in FIGS. 48(a) to 48(d). In FIG. 48, 7m denotes the male seam forming portion. This seam forming apparatus is capable of forming the plate member 11A connected to (engaging with) the plate member 11B shown in FIGS. 42 and 43.

FIGS. 47(g), 42, and 43 are perspective views of the plate member 11A having the male seam joint portions 17m at both side ends. In these Figures, 14 denotes corner portions, G denotes a press portion for pressing an end portion of the male seam joint portion 17f from outside.

The plate 1(1B) having the female seam forming portions 7f is, as shown in FIG. 44, flat, in this embodiment. In FIG. 44, reference designator 8 denotes the wall forming portion of the duct, 7f denotes the female seam forming portions, and 4 denotes the corner forming portions.

The plate 1(1A) having the male seam forming portions 7m is, as shown in FIG. 45, flat, in this embodiment. In FIG. 45, reference numeral 8 denotes the wall forming portion of the duct, 7m denotes the male seam forming portions, and 4 denotes the corner forming portions.

FIG. 46 is a perspective view of the schematic forming process for forming the plate 1B having the female seam forming portion 7f into the plate member 11B.

FIG. 47 is a perspective view of the schematic forming process for forming the plate 1A having the male seam forming portions 7m into the plate member 11A.

In this embodiment, when the plate 1 is inserted into an insertion end of the seam forming apparatus shown in FIG. 22, an operator bends the corner forming portion 4 upward by a predetermined angle so that the seam forming portion 4 passes through the non-forming process region 25 (see FIG. 28). Another configuration of the seam forming apparatus, which is capable of mechanically separating the corner forming portions 4 from the seam forming portion 7 can be achieved as described below.

Figure 50:
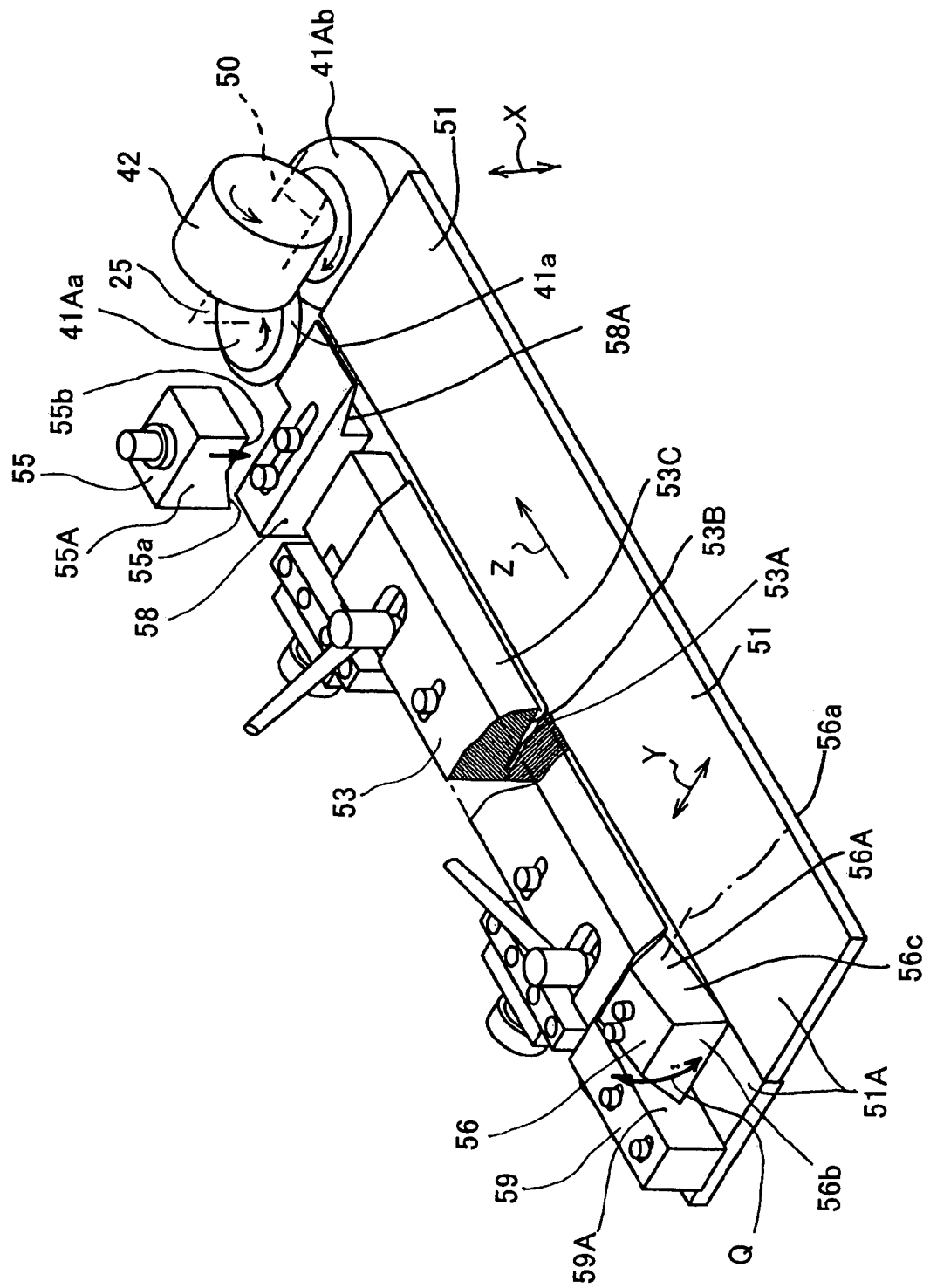
FIG. 50 is a perspective view showing a construction of components of another seam forming apparatus.

As shown in FIG. 50, at the insertion end portion (upstream end portion) of the seam forming apparatus, i.e., at the forming roll pair 41A (41Aa, 41b) on the upstream side of the seam forming apparatus and on upstream side of the forming roll pair 41A, a plate support face 51A formed such that its imaginary plane includes a boundary face (to be precise, a boundary (contact line)) between the forming roll (forming roll 41Ab in this embodiment) forming the forming roll pair 41A and the press roll 42. In this embodiment, the plate support face 51A is formed by a flat upper surface of the support base 51 which supports the plate 1 (see FIG. 53) from below. A guide member 53 is mounted above the support base 51 and configured to guide the seam forming portions 7 at the side end portions 1E of the plate 1. In this embodiment, the guide member 53 has a side face guide face 53A which guides the side end face of the plate 1 (see FIG. 53) along the direction in which the plate 1 is traveled, an upper face guide face 53B which guides the upper face of the plate 1 along the direction in which the plate 1 is traveled, and a cut guide portion 53e which guides an end 1k of a cut portion 2A. The side end portion 1E of the plate 1 is configured to pass through a space between the upper face guide face 53B and the plate support face 51A. An end portion of the guide member 53, which is closer to the center of the plate 1 (see FIG. 53) has an inclined face 53C which allows the corner forming portion 4 of the plate 1 in FIG. 53 to be positioned on the opposite side (upper side of the guide member 53) with respect to the guide member 53 and to be supported from below. The inclined face 53C and the upper face guide face 53B form an edge-shaped end portion of the guide member 53 on the plate 1 side and the guide portion 53e is formed on the edge-shaped end.

Figure 52:
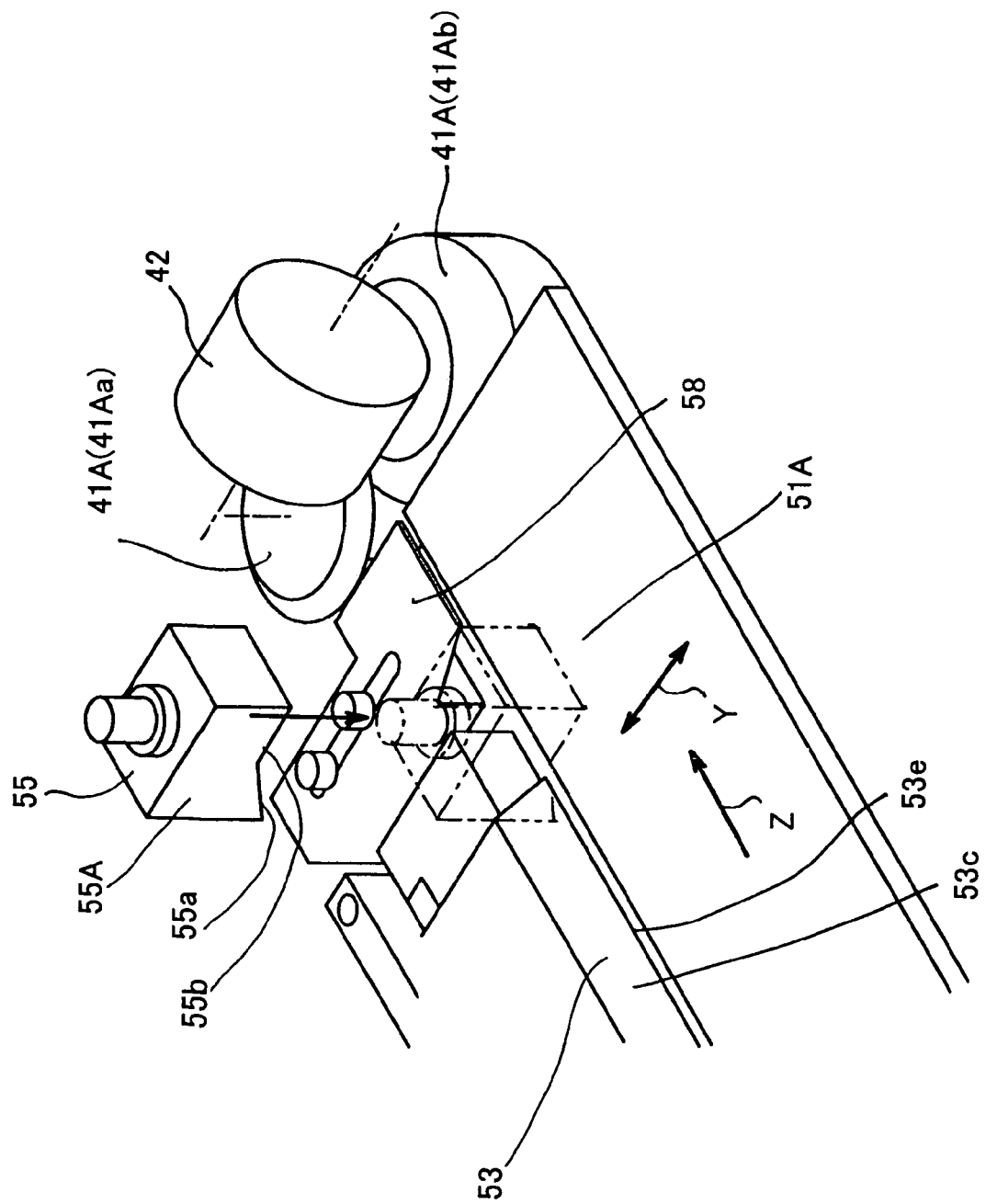
FIG. 52 is a partially enlarged perspective view showing a construction of a bending device in FIG. 50.

In order to allow the seam forming portion 7 of the plate 1 to be inserted into a space between the forming roll pair 41A (41Aa, 41Ab), a bending device 55 for bending the seam forming portion 7 downward is mounted between the guide member 53 and the forming roll pair 41A (41Aa, 41Ab) located at the upstream end as shown in FIGS. 50 and 52 which is an enlarged view of FIG. 50. The bending device 55 is configured like so-called "press device", and includes a movable member 55A movable downward with respect to the plate support face 51A of the support base 51 located below. The seam forming portion 7 is sandwiched between the plate support face 51A and the movable member 55A and is bent downward. An inclined face 55a which is inclined downward toward the end side of the plate 1 having the seam forming portions 7 is formed on a bottom face of the movable member 55A. A retaining portion 55b is formed at a location (on the opposite side of the processed end) which is closer to the center of the plate 1 and is configured to make surface contact with the plate support face 51A. The movable member 55A is attached to a tip end of the cylinder rod of the reciprocal pneumatic cylinder (not shown) and is vertically movable between the location (see two-dotted line of FIG. 52) at which the retaining portion 55b contacts the plate support face 51A and the location above (see the location indicated by a solid line of FIG. 52). In this embodiment, the pneumatic cylinder of the bending device 55 moves downward by the operator's pressing a foot-operated press switch (not shown) and moves upward by releasing the press switch. As a matter of course, the plate 1 may alternatively be automatically fed, a position sensor or the like may be configured to detect a predetermined position of the plate 1 to enable the stop of the feed, and the pneumatic cylinder may be automatically movable downward and upward.

In this embodiment, a second guide member 58 is mounted at a location adjacent to the forming roll 41A, which is downstream of the bending device 55 (on the right side in FIG. 50). A guide face 58A of the guide member 58 forms an inclined flat face which is inclined upward toward the opposite side of the processed end of the plate 1 in the direction (Y direction) perpendicular to the direction in which the plate 1 is traveled (Z direction), and is capable of smoothly feeding the seam forming portions 7 bent by the bending device 55 into the space between the pair 41A with the seam forming portions 7 bent downward.

Figure 51:
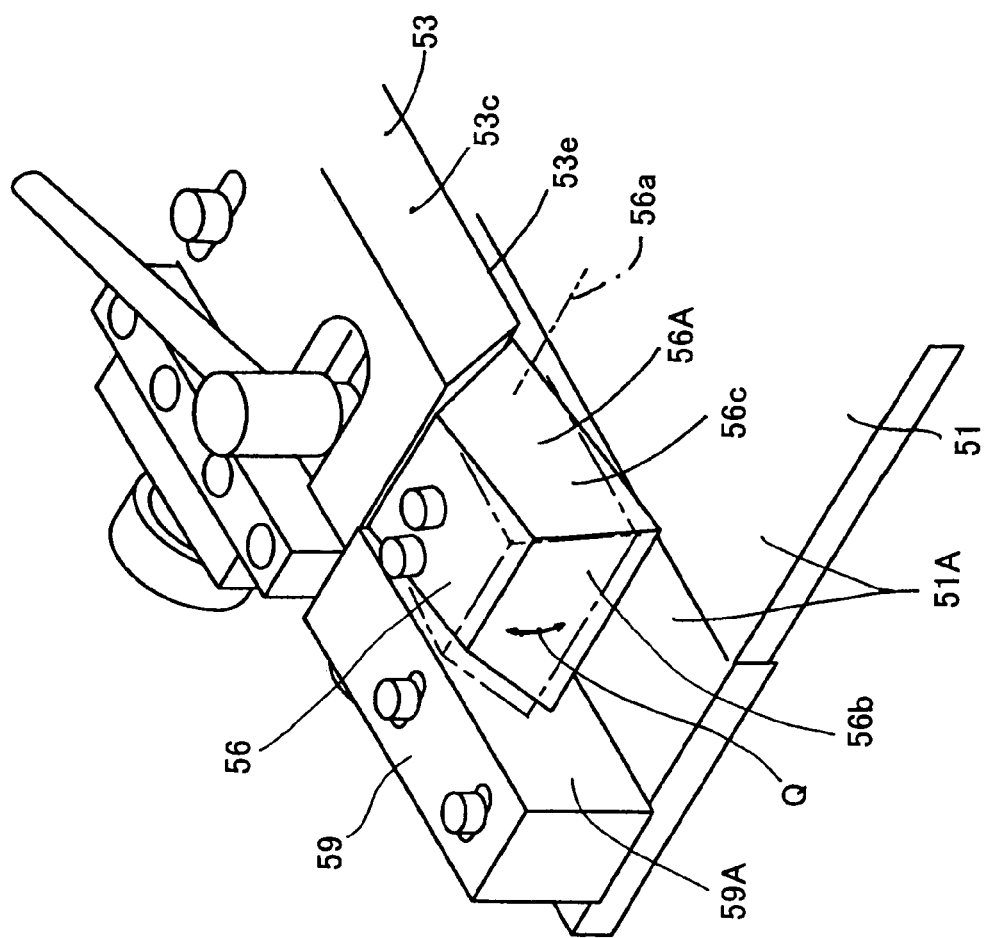
FIG. 51 is a partially enlarged perspective view showing a construction of a corner forming portion separating device in FIG. 50.

As shown in FIG. 50 and FIG. 51 which is partially enlarged view of FIG. 50, a corner forming portion separating device 56 is mounted at a location upstream (left side in FIG. 50) of the guide member 53. The corner forming portion 56 has a separating block 56A which is mounted on a third guide member 59 to be pivotable around a pivot 56a extending along the Y direction perpendicular to the direction in which the plate 1 is traveled (see Z direction), as indicated by an arrow Q. A width Wd (see FIG. 54) of the separating block 56A is smaller than a cutting depth d of the cut 2A formed between the corner forming portion 4 and the seam forming portion 7. The end of the cutting depth d of the cut portion 2A conforms to the side end 8e of the wall forming portion 8 of the duct 1.

The separating block 56A has a weight larger on upstream side (left side in FIG. 50) with respect to the pivot 56a. Therefore, the separating block 56A is in a state shown in FIG. 50 with no external force applied thereto. The separating block 56A has a forward-inclined face 56b which is edge-shaped to be inclined upward from the upstream end to the downstream end, and has a side-inclined face 56c which conforms to the inclined face 53C of the guide member 53 with the upstream end of the separating block 56A lifted upward. As a matter of course, the side-inclined surface 56c may alternatively be configured to be slightly higher than the inclined face 53C of the guide member 53. The side end portion of the bottom surface of the separating block 56A forms an inclined surface which is inclined upward toward the third guide member 59. Therefore, a joint portion between the side-inclined face 56c and the bottom surface is positioned above the plate support face 51A and hence allows the plate 1 to be inserted from lateral side.

The forward-inclined face 56b allows the corner forming portion 4 to be lifted upward and the side-inclined face 56c allows the corner forming portion 4 to be fed rearward. In this state, the inclined face 53C of the guide member 53 smoothly supports the corner forming portion 4 from below so that the corner forming portion 4 and the seam forming portion 7 are positioned apart from each other in the vertical direction. The corner forming portion separating device 56 is configured to operate by a weight balance forward and backward of the separating block 56A and an external force applied to lift up the sandwiched plate 1, without a need for a power.

Further, in this embodiment, a third guide member 59 is mounted at a location adjacent to the corner forming portion separating device 56 to range from the upstream side (left side in FIG. 50) of the corner forming portion separating device 56 to a lateral side. A guide face 59A of the guide member 59 is vertically provided and configured to guide the side end 1e of the plate 1 to smoothly guide the guide member 53.

In accordance with the seam forming apparatus constructed above, the corner forming portion 4 is bent upward by the predetermined angle to be separated mechanically from the seam forming portion 7.

Figure 53:
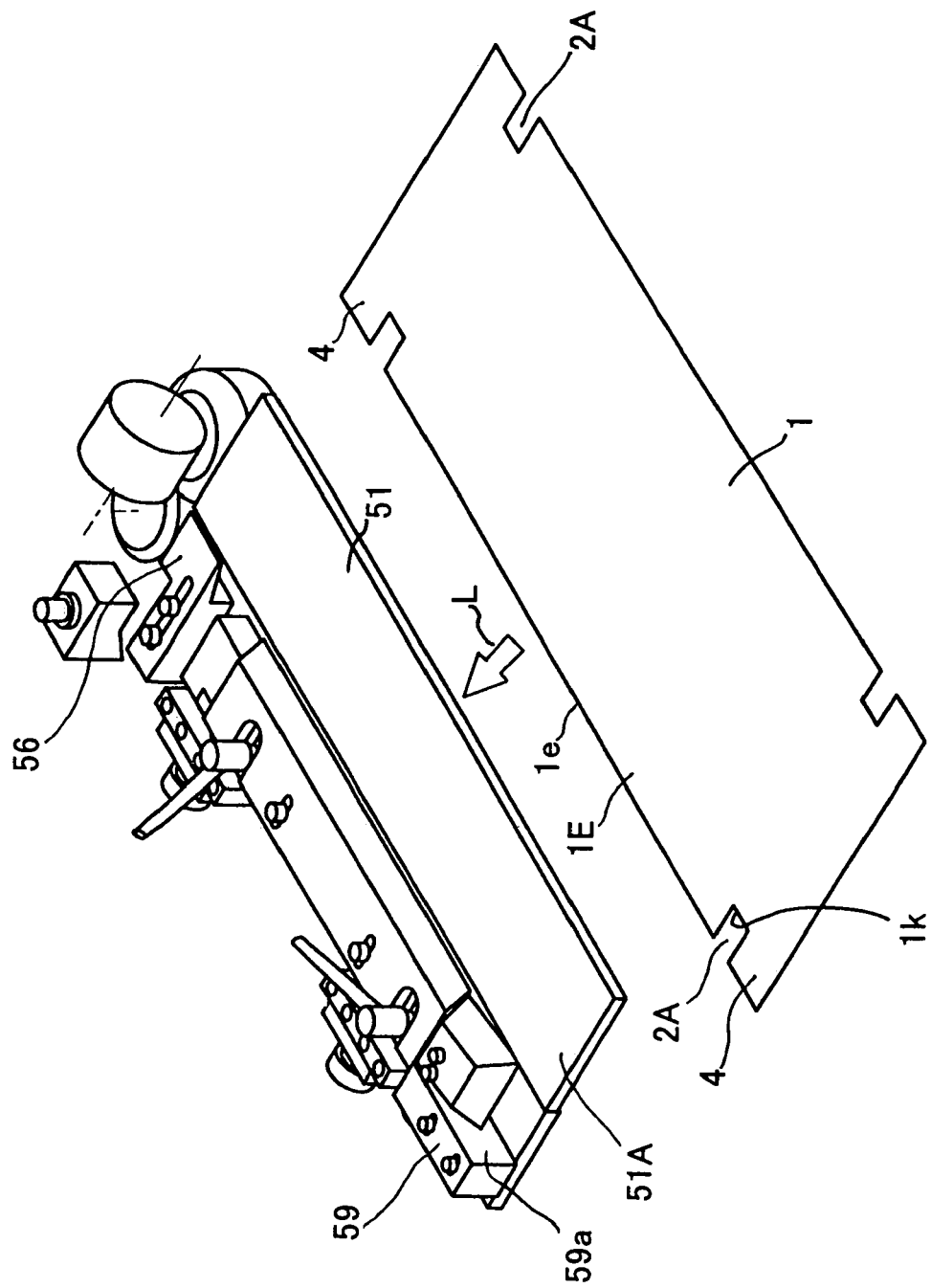
FIG. 53 is a perspective view showing a state in which the plate is going to be fed to the seam forming apparatus in FIG. 50.
Figure 54:
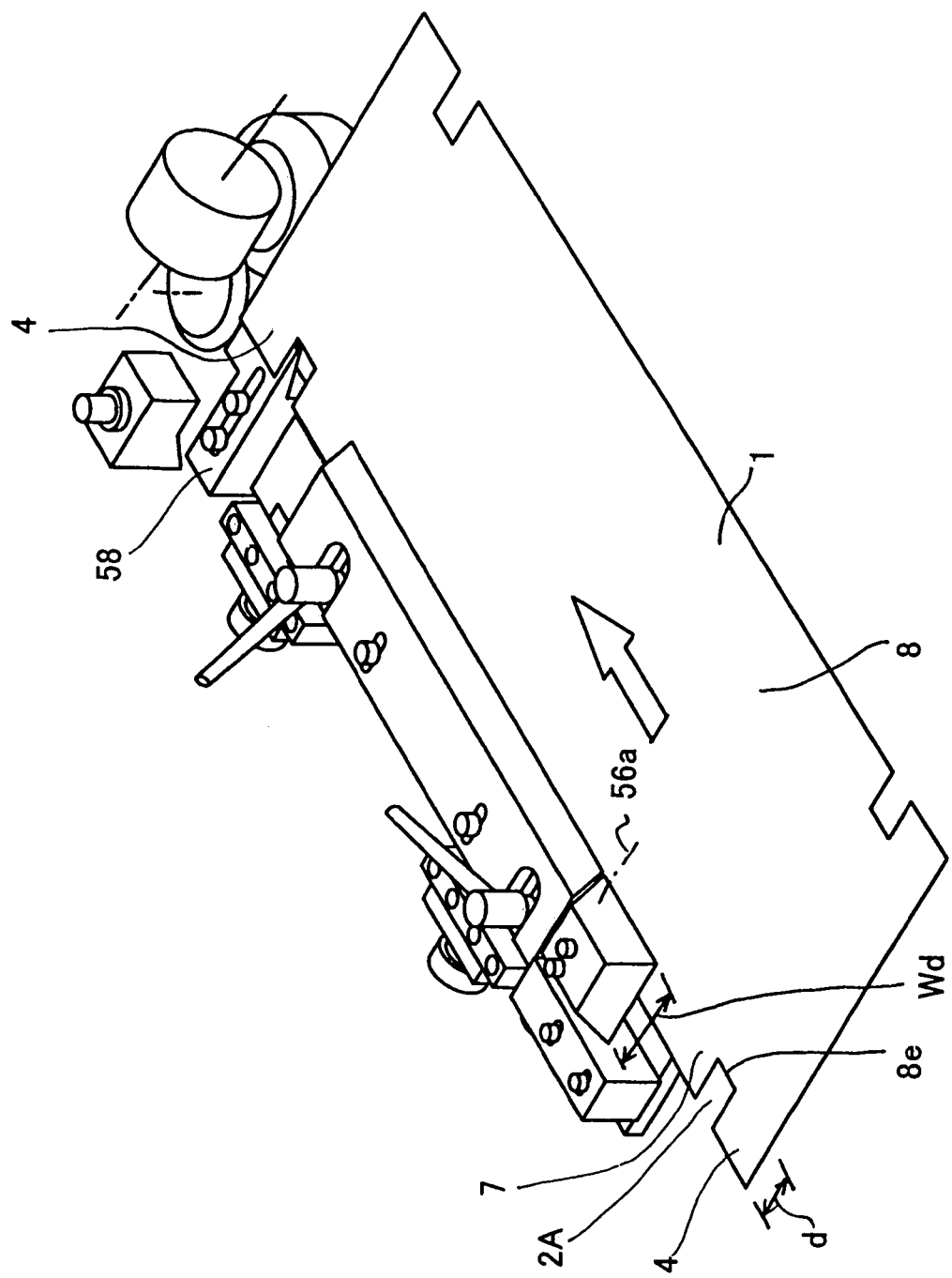
FIG. 54 is a perspective view showing a state in which the plate fed to the seam forming apparatus in FIG. 50 is going to be bent by the bending device.

Specifically, the operator inserts the plate 1 cut to have predetermined shape and dimension shown in FIG. 44 (or 45) from the lateral side of the support base 51 located at the upstream end of the seam forming apparatus of FIG. 53 as indicated by an arrow L (in Y direction) to place the plate 1 on the plate support face 51A with the side end 1e of the terminal end portion of the plate 1 substantially in contact with the guide face 59A of the third guide member 59. At this time, since the side end portion of the bottom surface of the separating block 56A of the corner forming portion separating device 56 is located above the plate support face 51A, the side end 1e of the plate 1 can be easily inserted under the separating block 56A. FIG. 54 shows a condition in which insertion of the plate 1 has been completed. At this time, the corner forming portion 4 located forward in the direction in which the plate 1 is inserted is positioned above the second guide member 58

Figure 55:
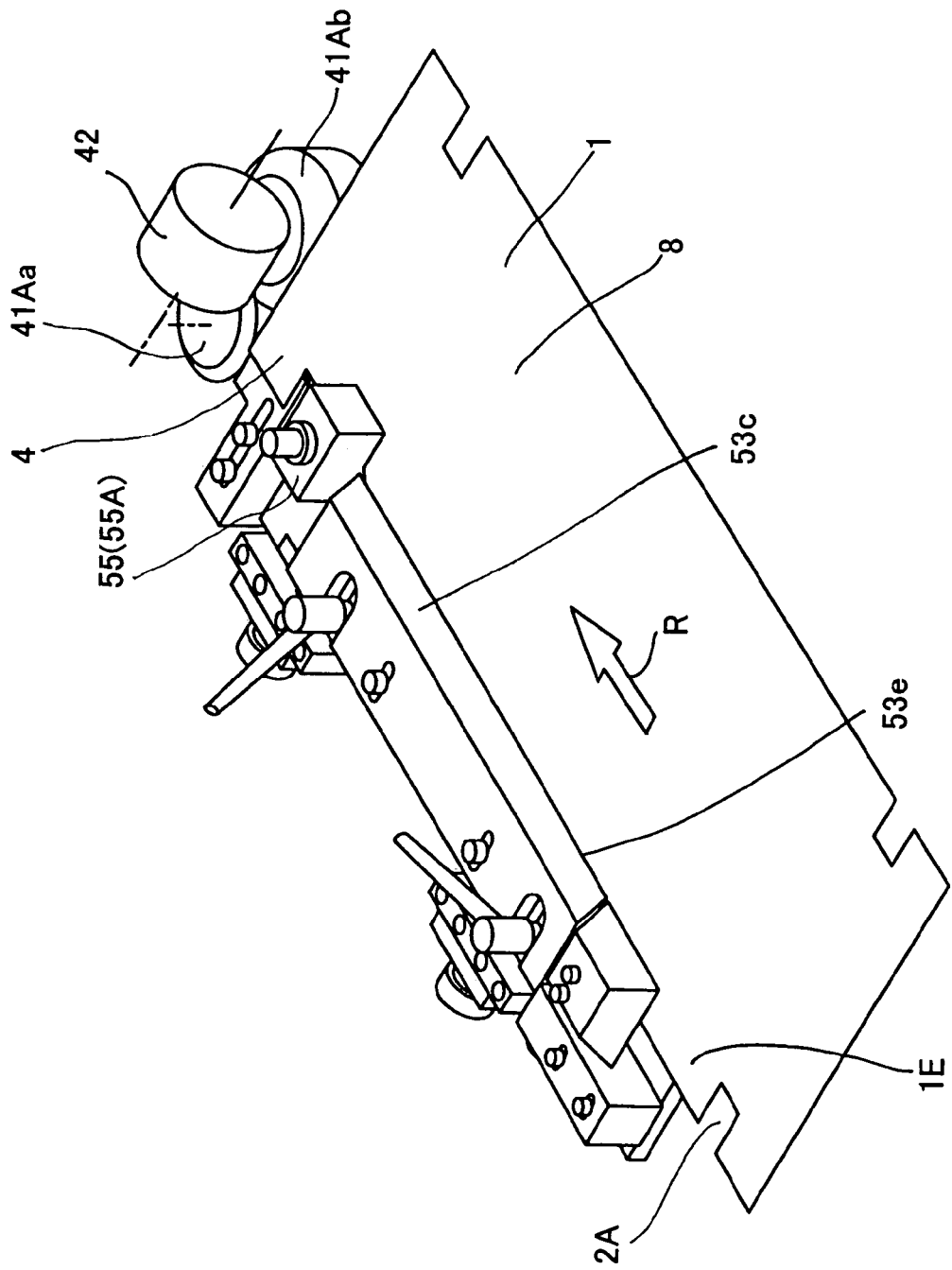
FIG. 55 is a perspective view showing a state in which the plate fed to the seam forming apparatus in FIG. 50 is being bent by the bending device.
Figure 56:
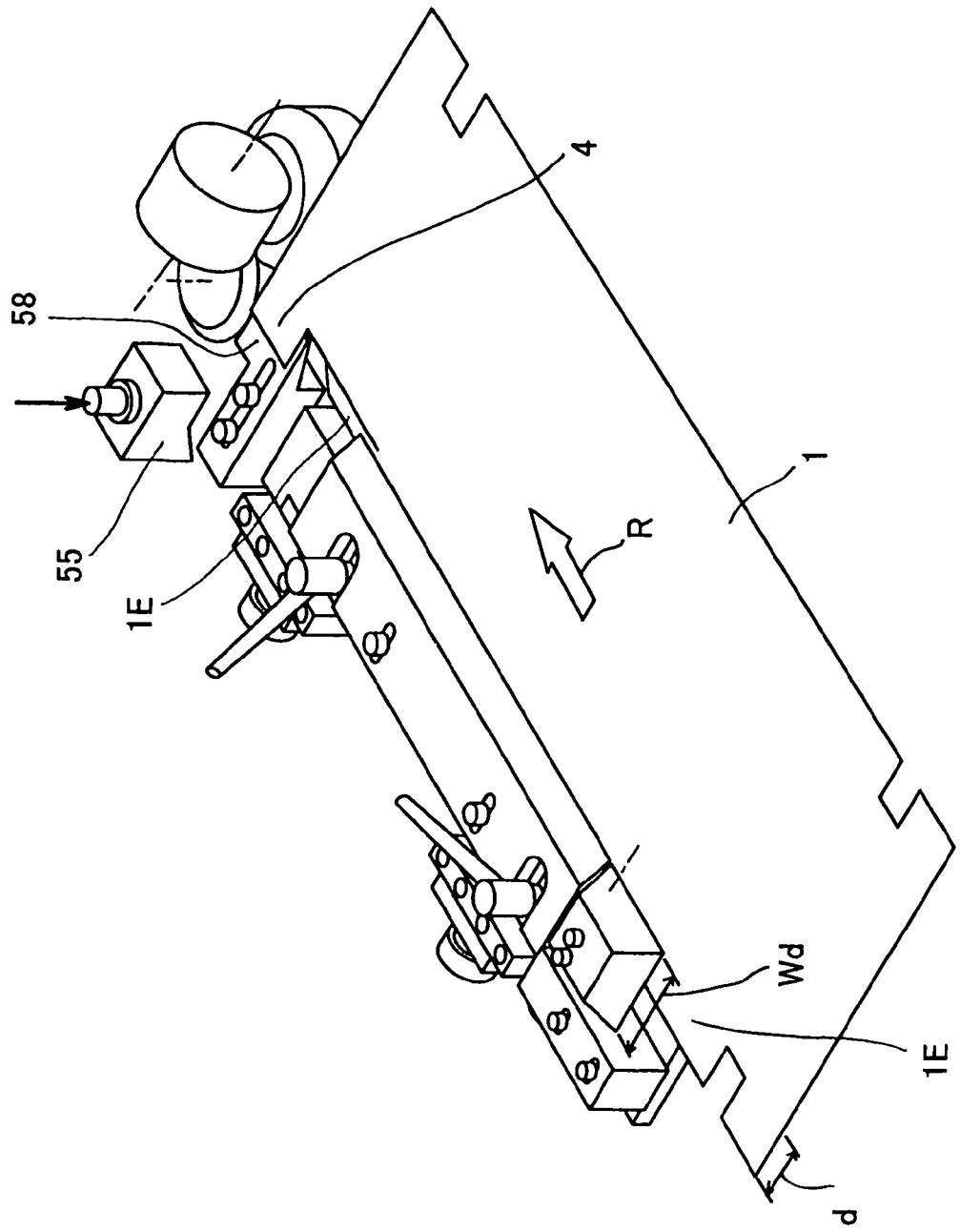
FIG. 56 is a perspective view showing a state in which the plate fed to the seam forming apparatus in FIG. 50 has been bent by the bending device.

In the state in FIG. 54, the operator operates a switch for operating the pneumatic cylinder to cause the movable member 55A of the bending device 55 to move downward as shown in FIG. 55, thereby causing the seam forming portion 7 (portion provided under the movable member 55A) located on upstream side (left side in FIG. 55) in the direction in which the plate 1 is traveled to be bent downward with respect to the wall forming portion 8 (see FIG. 56). As a result, the seam forming portion 7 of the plate 1 can pass under the guide face 58A of the second guide member 58. As described above, the corner forming portion 4 (see FIGS. 44 and 56) at the starting end is located above the second guide member 58. The movable member 55A move downward and quickly retunes to its original position.

Under this condition, the operator turns on a drive switch of the seam forming apparatus to rotate the forming rolls 41 so that the plate 1 is sandwiched by the forming roll pair 41A, and is fed by the forming roll pair 41A and the press rolls 42 to an inside of the forming roll pairs 41 in the direction indicated by an arrow R (the direction in which the plate 1 is traveled).

While the plate 1 is guided, the forming roll pair 41A and the press rolls 42 in contact with the forming roll pair 41A, and forming roll pairs (not shown: see FIG. 22) located downstream and the press rolls 42 in contact with the forming roll pairs, the seam forming portion 7 is formed into the seam joint portion 17 (7f and 17m) (see FIGS. 41 and 48). While the seam joint portion 17 is formed, the corner forming portion 4 (see FIGS. 44 and 46) is guided upward by the taper face 41a (see FIG. 50) of the forming roll 41Aa, and passes through a space (non-forming process region 25) above the forming roll 41Aa without being processed. In addition, the corner forming portion 4 (see FIGS. 44 and 46) does not interfere with the forming process of the seam forming portion 7 which is being performed by the forming roll pairs 41. And, the forming roll pair group downstream of the forming roll pair 41A performs the forming process shown in FIG. 41 or 48.

Figure 57:
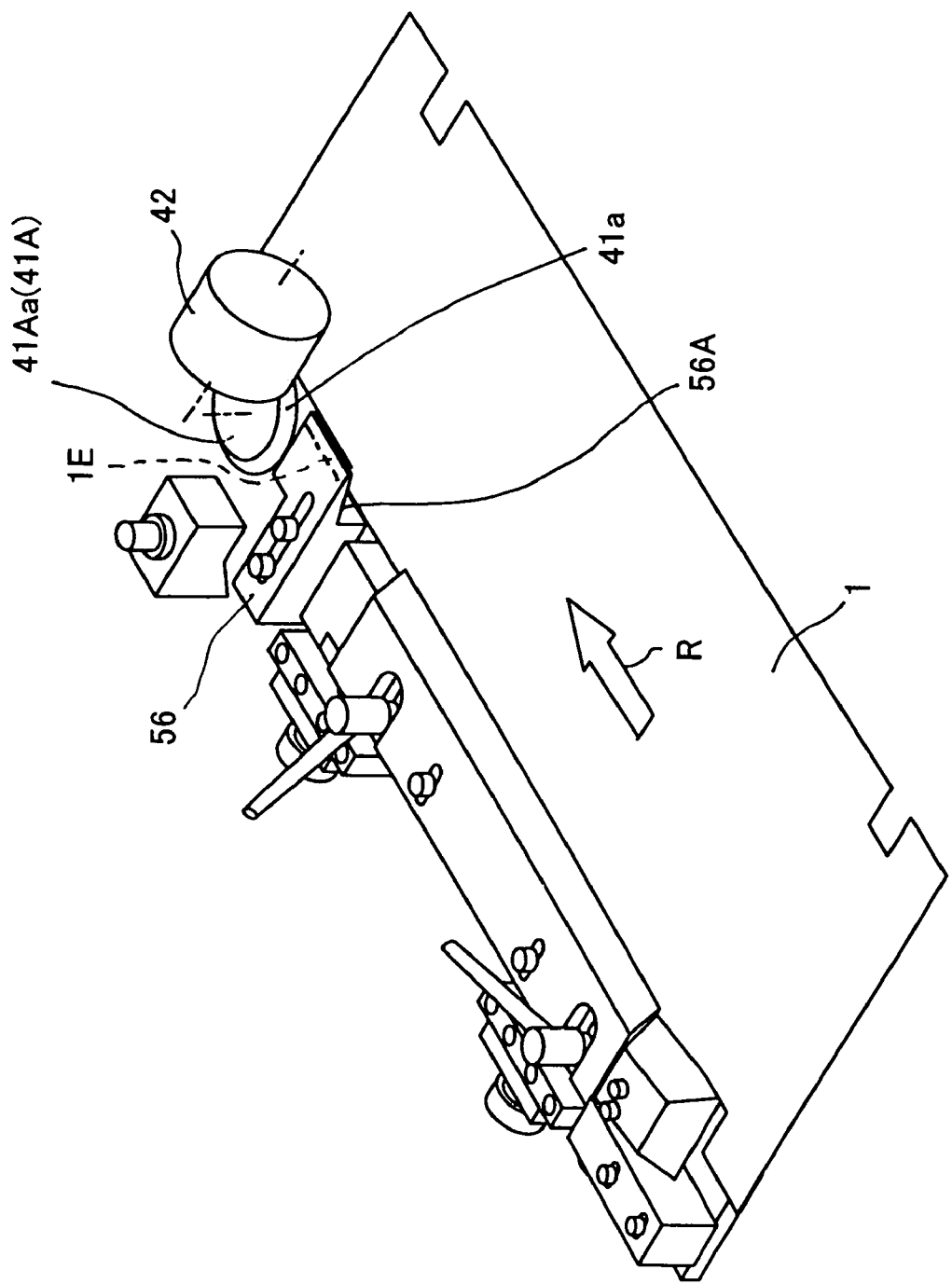
FIG. 57 is a perspective view showing a state in which the plate is fed to the forming roll pair of the seam forming apparatus of FIG. 50.
Figure 58:
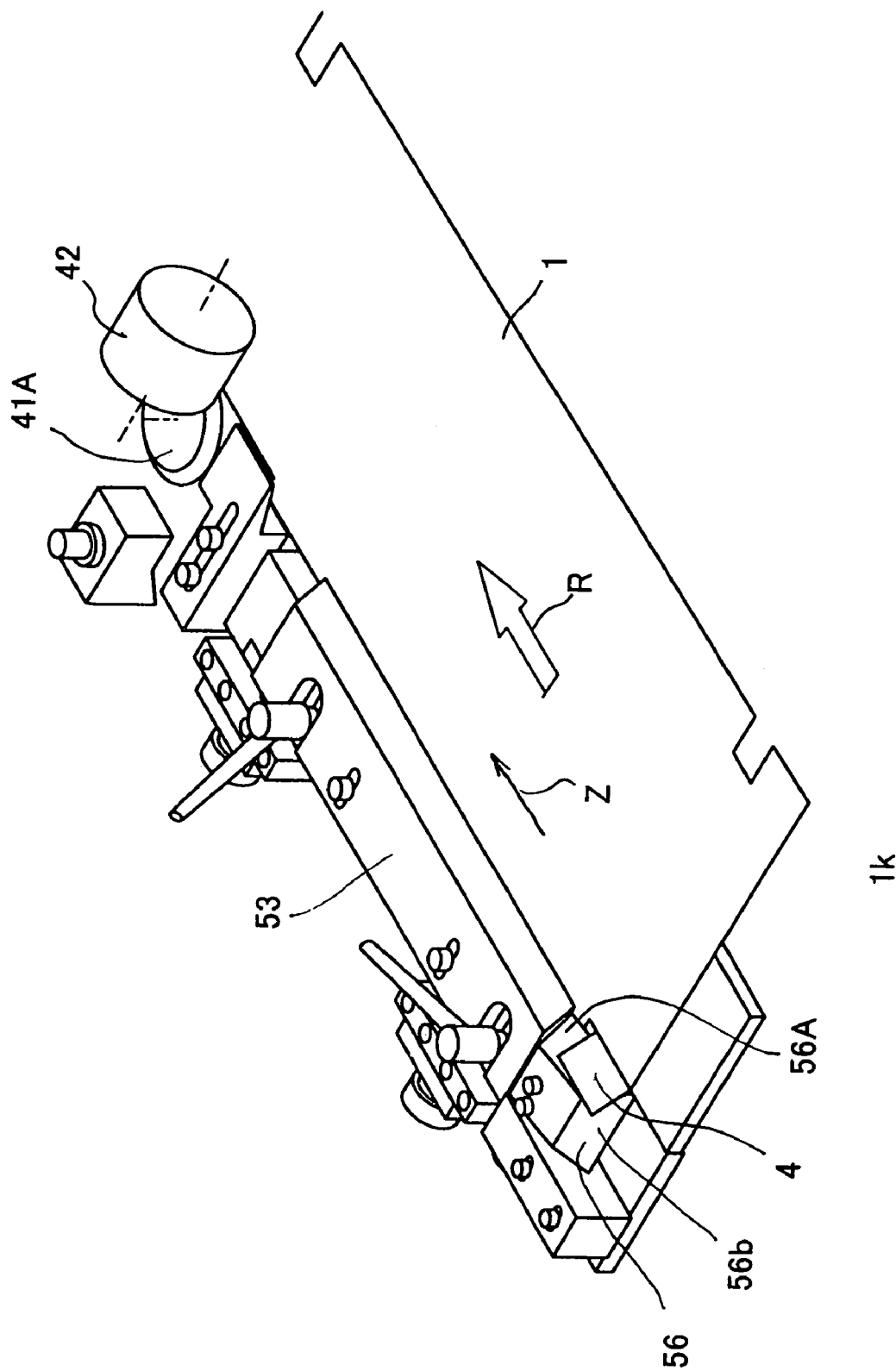
FIG. 58 is a perspective view showing a state in which the corner forming portion at a downstream end in the direction in which the plate is traveled is separated by the corner forming portion separating device in FIG. 50.
Figure 59:
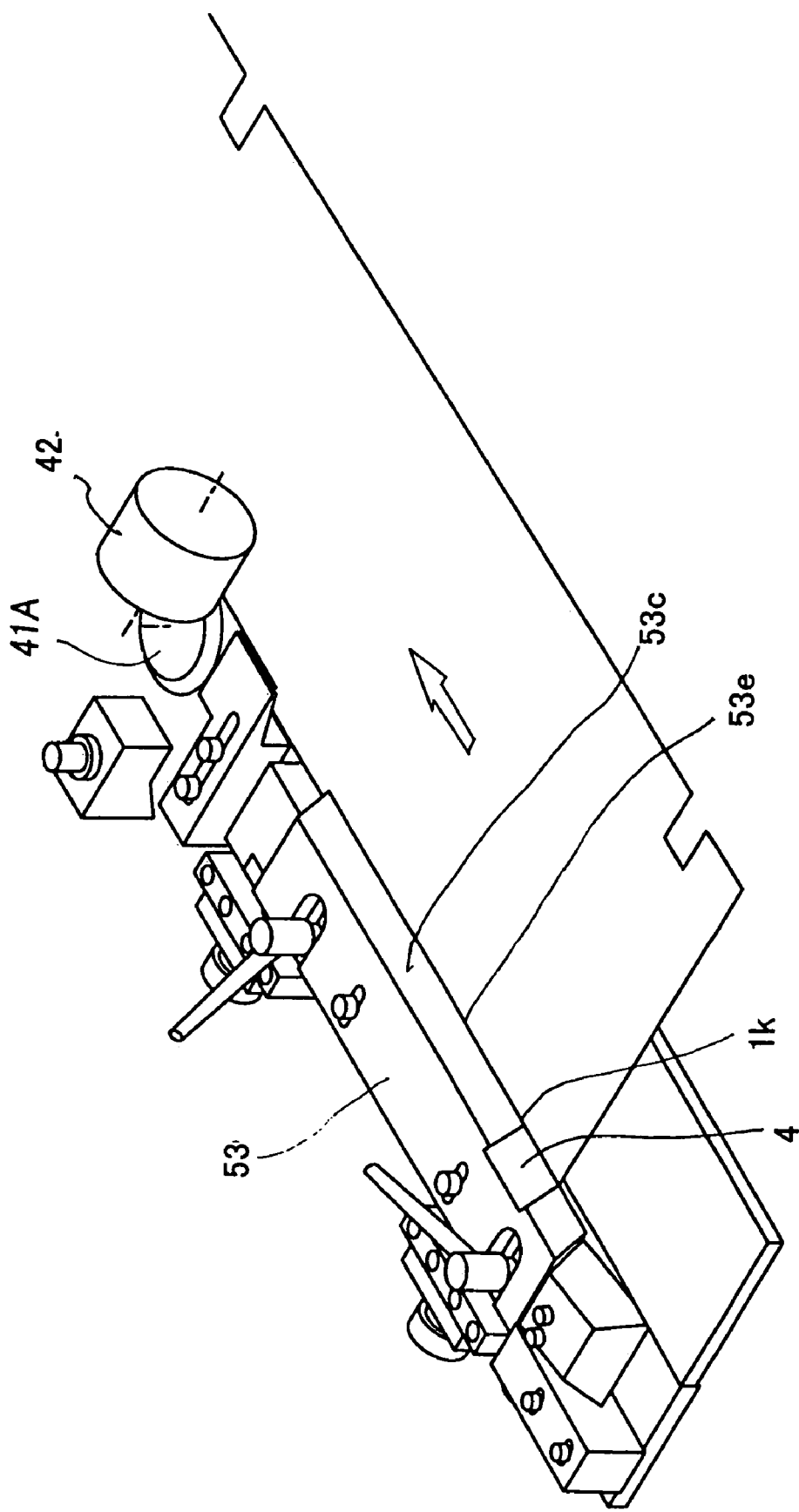
FIG. 59 is a perspective view showing a state in which the corner forming portion at the downstream end in the direction in which the plate is traveled, which has been separated by the corner forming portion separating device is guided by a guide member of the corner forming portion separating device in FIG. 50.

As shown in FIG. 58, the corner forming portion 4 (see FIGS. 44 and 46) located at the terminal end of the direction (Z direction) in which the plate 1 is traveled is guided by the forward-inclined face 56b of the separating block 56A of the corner forming portion separating device 56 as shown in FIG. 58 from the state of FIG. 57 so as to be lifted above the separating block 56A and bent. Further, as shown in FIG. 59, the plate 1 is guided to the guide member 53 located downstream and passes through the non-forming process region 25 above the forming roll pair 41A.

While being fed, the plate 1 is guided by the guide face 53A of the guide member 53 such that the side end 1e of the plate 1 is guided in the direction in which the plate 1 is traveled, the upper face and the bottom face of the side end portion 1E of the plate 1 are guided by the upper face guide face 53B and the plate support face 51A, and the end 1k of the cut portion 2A of the plate 1 is guided by the cut guide portion 53e along the direction in which the plate 1 is traveled.

In the seam forming apparatus of FIG. 50, the plate 1 is fed in the direction in which the plate 1 is traveled while being surely guided by the guide member 53 and the like, the feed roll pairs 43 shown in FIG. 22 may be omitted.

In accordance with the seam forming apparatus according to this embodiment, the seam joint portion is formed in such a manner that the seam forming portions 4 are automatically (or mechanically) positioned in the non-forming process region of the forming roll pairs 41 without a need for the operator to bend the corner forming portions 4.

In accordance with the cornerplate-less duct of the present invention, it is possible to attain a duct which are formed by fewer components, and are manufactured at significantly reduced assembly steps.

In accordance with a method of manufacturing the cornerplate-less duct of the present invention, the cornerplate-less duct can be manufactured efficiently and using the apparatus.

In accordance with the seam forming apparatus of the present invention, plate members having various configurations, including the cornerplate-less duct, can be mass-formed stably. In addition, the plate members of the cornerplate-less duct having a novel configuration can be mass-formed stably and easily.

INDUSTRIAL APPLICABILITY

The cornerplate-less duct of the present invention is employed as a duct for use in air-conditioning, ventilation, or smoke emission in the case of fire which are one type of construction equipment. The method of manufacturing the cornerplate-less duct and the seam forming apparatus of the present invention is applicable to manufacture of the duct or the like.

The invention claimed is:

1. A cornerplate-less duct which has a tubular shape with a rectangular cross-section, the duct comprising:
   a plurality of plate members joined to each other at side end portions thereof by seam joints, in which flange portions which are connecting faces adapted to connect adjacent ducts are formed integrally at a starting end portion and a terminal end portion of a plate formed into each plate member by bending the plate in a direction substantially perpendicular to a longitudinal direction of the plate, corner forming portions are formed to protrude outward from side ends of the flange portions in a width direction of the plate, and the corner forming portions of adjacent plate members are overlapped with each other to form corner portions of the flange portions of the duct in an assembled state;
   wherein the plate is structured such that a first cut portion is formed in a portion which is closer to a center in the longitudinal direction of the plate than a starting end or a terminal end of the plate such that the first cut portion extends in the width direction of the plate and has a depth substantially equal to an overlapping portion of the corner portion.

2. The cornerplate-less duct according to claim 1, wherein a dimension in a width direction of a portion of the plate which is closer to the center than the first cut portion is substantially equal to a sum of a dimension of a wall forming portion of the duct and a dimension of seam forming portions on both sides of the wall forming portion, and a dimension in a width direction of a portion of the plate which is closer to the starting end or the terminal end than the first cut portion is substantially equal to a sum of a dimension in a width direction of a flange forming portion formed into the flange portion and a protruding dimension of the corner forming portions.

3. The cornerplate-less duct according to claim 2, wherein the protruding dimension of the corner forming portions is substantially equal to a width of the connecting faces of the flange portions of the adjacent plate members in an assembled state of the duct.

4. The cornerplate-less duct according to claim 2, wherein the corner forming portions of plates are provided with fixing holes at a location where the corner portions of adjacent plate members overlap with each other to allow the fixing holes to conform to each other in an assembled state of the duct.

5. The cornerplate-less duct according to claim 2, wherein the plate has a second cut portion which is closer to the center in the longitudinal direction than the first cut portion.

6. The cornerplate-less duct according to claim 1, wherein the protruding dimension of the corner forming portions is substantially equal to a width of the connecting faces of the flange portions of the adjacent plate members in an assembled state of the duct.

7. The cornerplate-less duct according to claim 6, wherein the corner forming portions of plates are provided with fixing holes at a location where the corner portions of adjacent plate members overlap with each other to allow the fixing holes to conform to each other in an assembled state of the duct.

8. The cornerplate-less duct according to claim 6, wherein the plate has a second cut portion which is closer to the center in the longitudinal direction than the first cut portion.

9. The cornerplate-less duct according to claim 1, wherein the corner forming portions of plates are provided with fixing holes at a location where the corner portions of adjacent plate members overlap with each other to allow the fixing holes to conform to each other in an assembled state of the duct.

10. The cornerplate-less duct according to claim 9, wherein an engagement portion which is bendable is provided integrally with the fixing hole.

11. The cornerplate-less duct according to claim 10, wherein the plate has a second cut portion which is closer to the center in the longitudinal direction than the first cut portion.

12. The cornerplate-less duct according to claim 9, wherein the plate has a second cut portion which is closer to the center in the longitudinal direction than the first cut portion.

13. The cornerplate-less duct according to claim 1, wherein the plate has a second cut portion which is closer to the center in the longitudinal direction than the first cut portion.

* * * * *